May 13, 1958     D. WERTMAN     2,834,256
RAPID FIRE GUN SLIDE HYDRAULIC CONTROL SYSTEM
Filed April 19, 1955     48 Sheets-Sheet 1

INVENTOR
DAVID WERTMAN
BY
ATTORNEYS

May 13, 1958 D. WERTMAN 2,834,256
RAPID FIRE GUN SLIDE HYDRAULIC CONTROL SYSTEM
Filed April 19, 1955 48 Sheets-Sheet 2

*INVENTOR*
DAVID WERTMAN
BY
*ATTORNEYS*

May 13, 1958 D. WERTMAN 2,834,256
RAPID FIRE GUN SLIDE HYDRAULIC CONTROL SYSTEM
Filed April 19, 1955 48 Sheets-Sheet 3
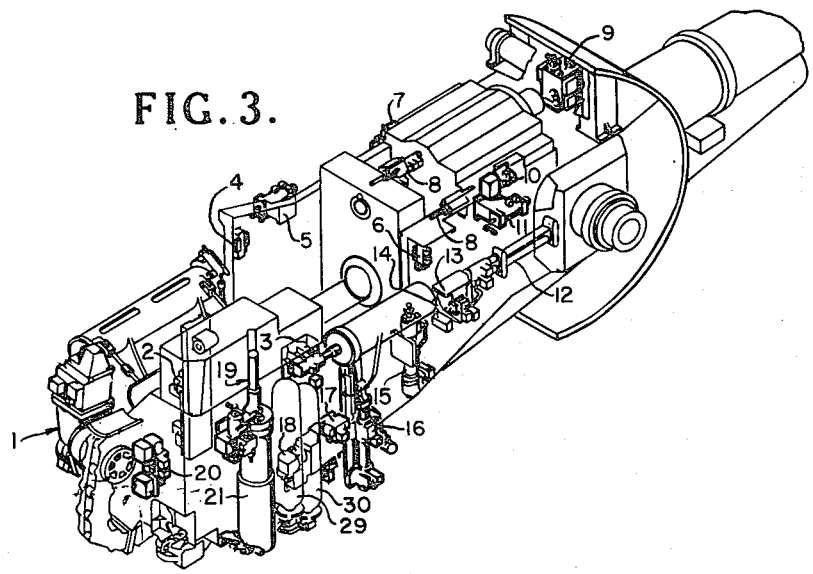
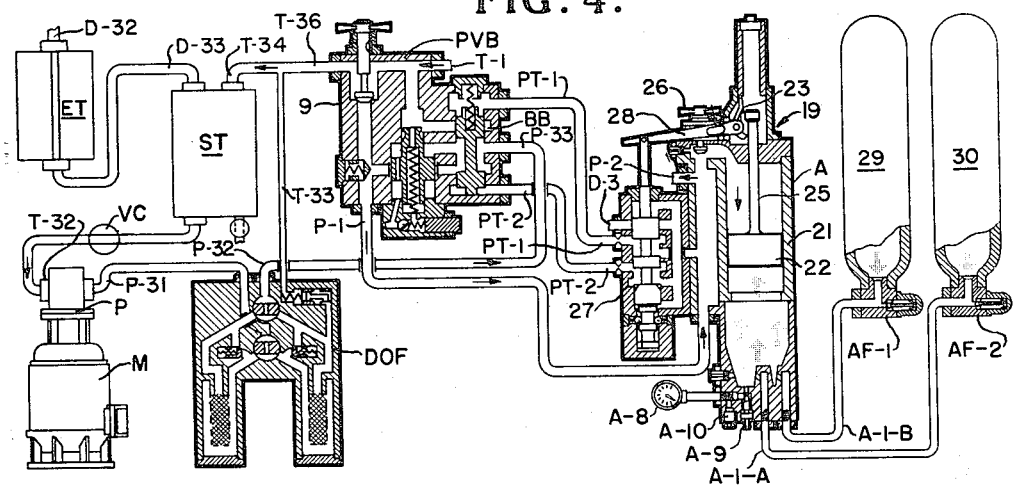
INVENTOR
DAVID WERTMAN
BY
ATTORNEYS

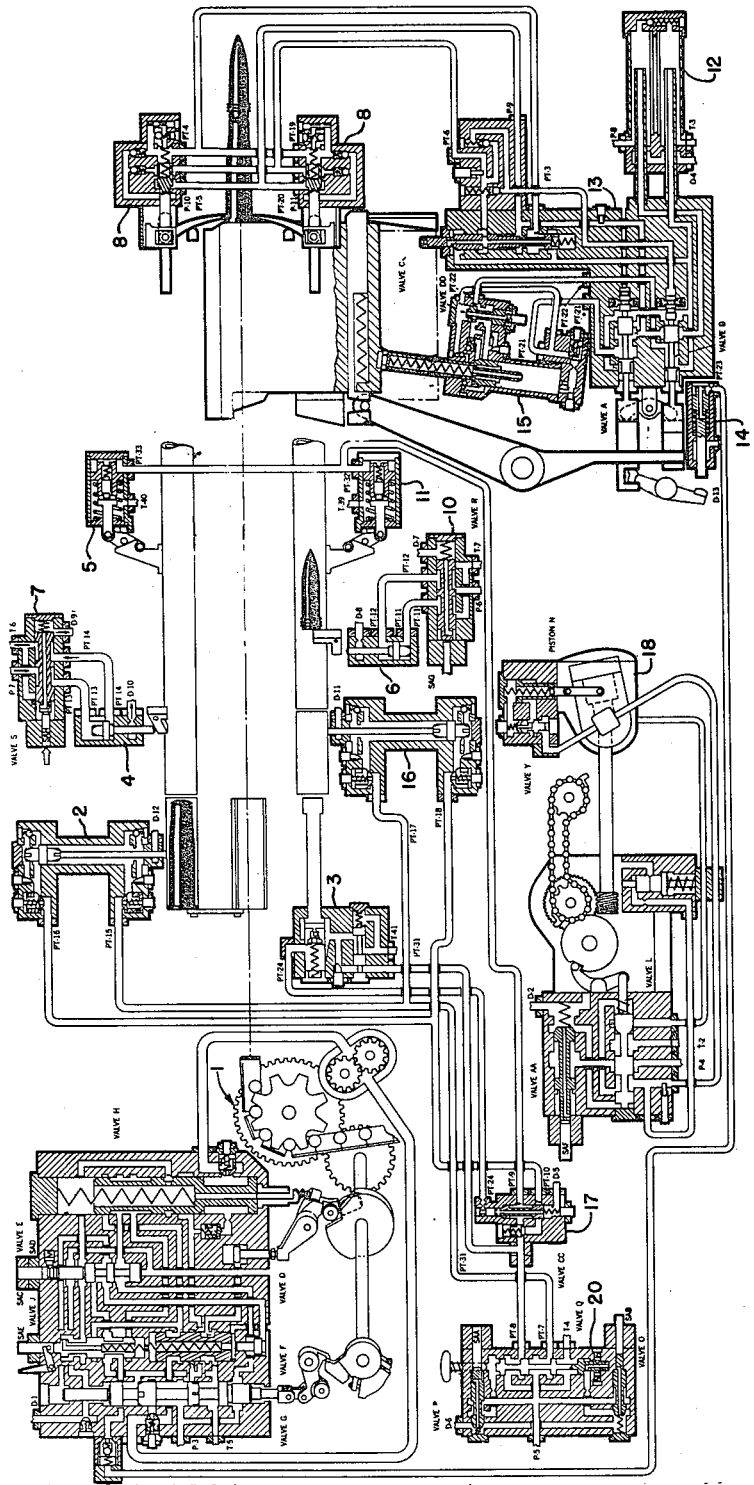

May 13, 1958 D. WERTMAN 2,834,256
RAPID FIRE GUN SLIDE HYDRAULIC CONTROL SYSTEM
Filed April 19, 1955 48 Sheets-Sheet 11

INVENTOR
DAVID WERTMAN

ATTORNEYS

May 13, 1958     D. WERTMAN     2,834,256
RAPID FIRE GUN SLIDE HYDRAULIC CONTROL SYSTEM
Filed April 19, 1955     48 Sheets-Sheet 13

INVENTOR
DAVID WERTMAN
BY
ATTORNEYS

May 13, 1958 D. WERTMAN 2,834,256
RAPID FIRE GUN SLIDE HYDRAULIC CONTROL SYSTEM
Filed April 19, 1955 48 Sheets-Sheet 14

INVENTOR.
DAVID WERTMAN
BY
ATTORNEYS

INVENTOR
DAVID WERTMAN

May 13, 1958 D. WERTMAN 2,834,256
RAPID FIRE GUN SLIDE HYDRAULIC CONTROL SYSTEM
Filed April 19, 1955 48 Sheets-Sheet 16

INVENTOR
DAVID WERTMAN

BY

ATTORNEYS

INVENTOR
DAVID WERTMAN

May 13, 1958 D. WERTMAN 2,834,256
RAPID FIRE GUN SLIDE HYDRAULIC CONTROL SYSTEM
Filed April 19, 1955 48 Sheets-Sheet 22

INVENTOR
DAVID WERTMAN

BY
ATTORNEYS

May 13, 1958 D. WERTMAN 2,834,256
RAPID FIRE GUN SLIDE HYDRAULIC CONTROL SYSTEM
Filed April 19, 1955 48 Sheets-Sheet 24

INVENTOR
DAVID WERTMAN
BY
ATTORNEYS

May 13, 1958   D. WERTMAN   2,834,256
RAPID FIRE GUN SLIDE HYDRAULIC CONTROL SYSTEM
Filed April 19, 1955   48 Sheets-Sheet 25

INVENTOR
DAVID WERTMAN
BY
ATTORNEYS

May 13, 1958 D. WERTMAN 2,834,256
RAPID FIRE GUN SLIDE HYDRAULIC CONTROL SYSTEM
Filed April 19, 1955 48 Sheets-Sheet 27

INVENTOR
DAVID WERTMAN

BY

ATTORNEYS

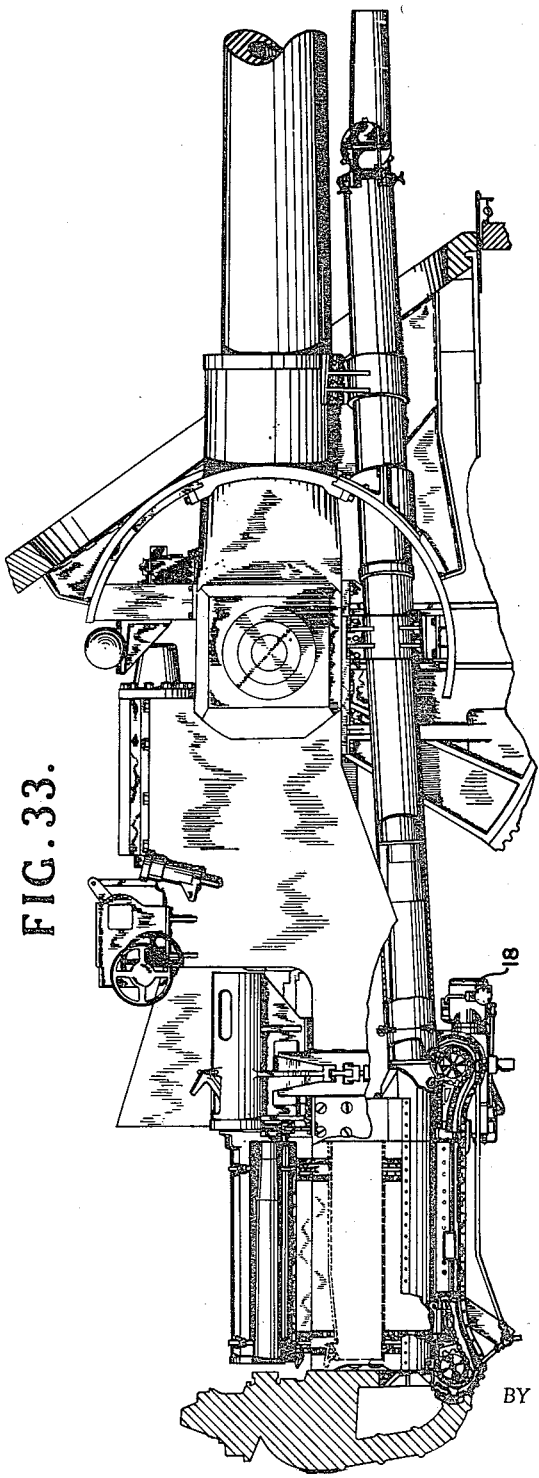
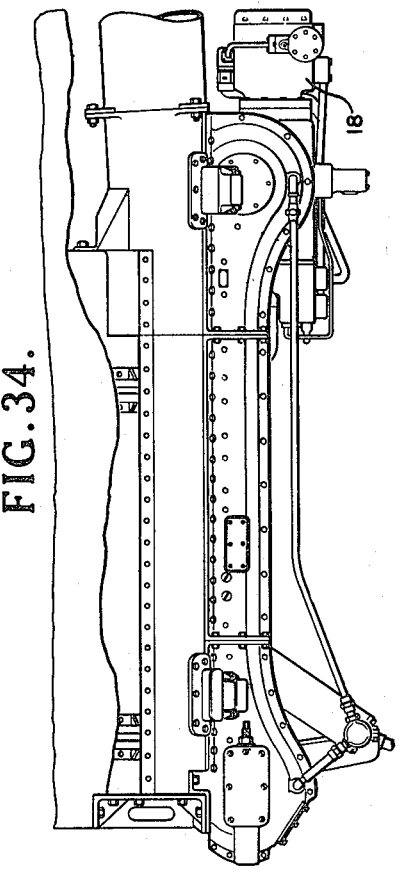
FIG. 33.
FIG. 34.
INVENTOR
DAVID WERTMAN
BY
ATTORNEYS

May 13, 1958 D. WERTMAN 2,834,256
RAPID FIRE GUN SLIDE HYDRAULIC CONTROL SYSTEM
Filed April 19, 1955 48 Sheets-Sheet 40

INVENTOR
DAVID WERTMAN
BY
ATTORNEYS

DAVID WERTMAN
INVENTOR

May 13, 1958 — D. WERTMAN — 2,834,256
RAPID FIRE GUN SLIDE HYDRAULIC CONTROL SYSTEM
Filed April 19, 1955 — 48 Sheets-Sheet 44

INVENTOR
DAVID WERTMAN
BY
ATTORNEY

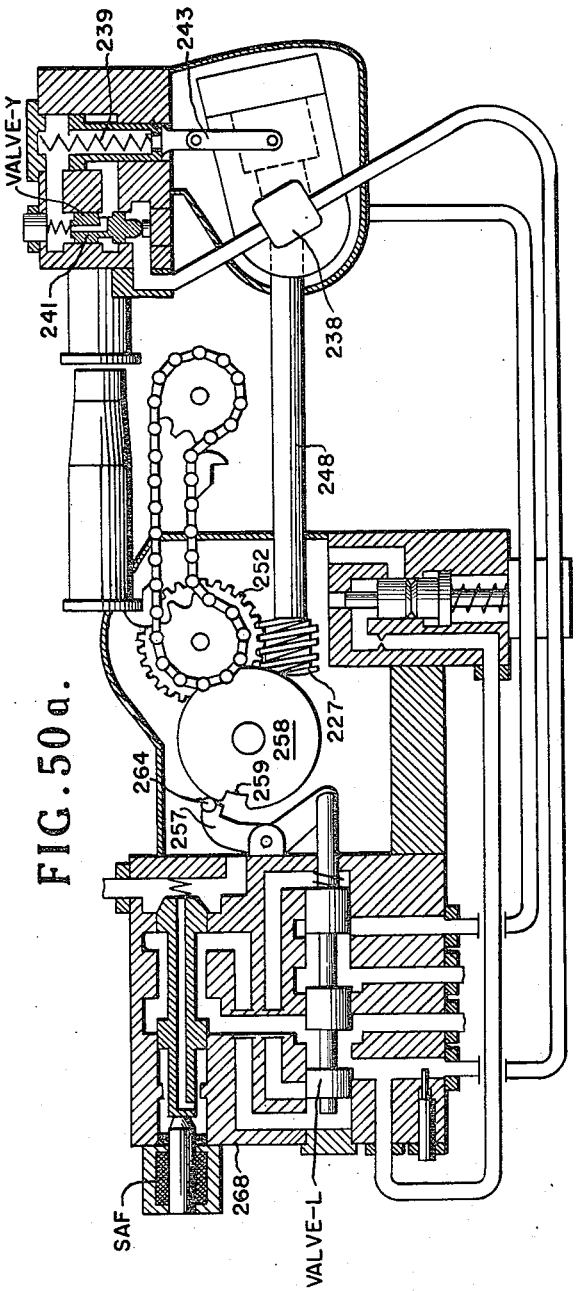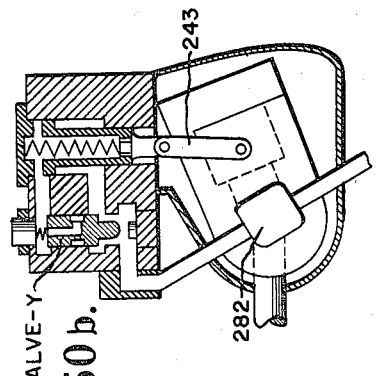

May 13, 1958 D. WERTMAN 2,834,256
RAPID FIRE GUN SLIDE HYDRAULIC CONTROL SYSTEM
Filed April 19, 1955 48 Sheets-Sheet 47

INVENTOR
DAVID WERTMAN
BY
ATTORNEY

United States Patent Office 2,834,256
Patented May 13, 1958

2,834,256

RAPID FIRE GUN SLIDE HYDRAULIC CONTROL SYSTEM

David Wertman, Kensington, Md.

Application April 19, 1955, Serial No. 502,536

12 Claims. (Cl. 89—45)

(Granted under Title 35, U. S. Code (1952), sec. 266)

The invention described herein may be manufactured and used by or for the Government of the United States of America for governmental purposes without the payment of any royalties thereon or therefor.

This invention pertains to a naval type gun turret and more specifically to a new and novel hydraulic control system and the novel structure and arrangement of parts thereof whereby the ammunition handling is fully automatic in operation and which system permits more rapid handling and firing of large bore guns than that of large bore guns of similar size heretofore in use.

The ammunition increment handling and control equipment of this invention is well adapted for use with a rapid fire gun and turret arrangement, of a type as shown, for example, in the copending application to Philias H. Girouard et al., Serial No. 153,262 filed March 31, 1950. The subject matter of this invention is shown and partially described but not claimed in the abovementioned copending application to Girouard et al. of which this sole application is a continuation-in-part by one of the inventors of the parent case.

The prior art naval turrets mounting large bore guns have heretofore incorporated in their apparatus and method of operation the usage of a bag type powder charge for the propulsion of the projectile from the gun. In the operation of such a gun it is necessary to return the gun to a loading position after the firing of each round of ammunition. With a large bore rapid first gun system of the type with which this invention is adapted for usage, this return to loading position cycle is eliminated and the gun loading and firing rate is greatly increased. With rapid fire gun handling apparatus it is necessary that all loading cycle functions occur in a predetermined and interrelated sequence.

The guns incorporated in the mounts of the turret with which the present invention is associated are well adapted for use with semi-fixed ammunition rather than the powder bag type of ammunition previously used in guns of similar large bore. The incorporation of the semi-fixed ammunition as handled by the structural embodiment of this type of turret makes provision for the reception of two load increments, namely, a projectile, and a powder case at positions, respectively, on each side of the gun slide assembly. Ammunition increments received at each side of the gun slide are loaded into transfer trays of the gun loading system and are thereafter transferred to a firing position in the gun barrel. Throughout this transfer movement they must follow a predetermined sequence of travel in order that the position of each increment with respect to the other increment be at all times correlated and be such that ramming action applied to the powder case will also produce ramming movement of the projectile forwardly thereof into the gun breech. The hydraulic system with which this invention is concerned is adapted, in addition to providing the power actuation for such transfer movement, to control the operation cycle in a predetermined order and to provide power and control over the empty powder case as it is extracted from the gun barrel and ejected from the gun handling system following gun firing.

The power drive instrumentalities are normally semi-automatic in their operation and when so operated are hydraulically actuated. Suitable interlocks are provided in the system to insure the proper sequence of operation and to prevent improper firing of the gun. With the inclusion of the interlock assembly, the gun system is substantially automatic and requires only the operation of a rammer control circuit switch to place the system in operation or to suspend operation as may be desired. The assembly of the gun and slide with which the hydraulic system of the instant invention is concerned includes a system, for the actuation of the sliding breech-lock through transverse movement thereof, a second system for extraction movement imparted to the empty case in removing it from the gun breech and additionally a system for movement of the empty case to a rearward part of the gun assembly. It also includes a rammer drive assembly adapted and arranged to move, simultaneously a powder case and a projectile from a position axially rearward of the gun breech to a firing position in the gun barrel, and a pair of hydraulic cylinder assemblies adapted to impart movement to the powder transfer tray and the projectile transfer tray, respectively. In addition to the hydraulic elements which provide these major assembly movements the system includes a projectile buffing device for the purpose of buffing and subsequently positioning the projectile in the rearward part of the projectile tray after reception from the cradle and prior to transfer movement to the ramming position. The detailed description of this projectile buffer appears in the copending application to Frank Warlick, Serial No. 187,340, filed September 28, 1950, which matured into U. S. Patent No. 2,790,358 on April 30, 1957.

This system further includes hydraulic control elements which function to operate or coact with elements of the cradle system of a gun turret loading assembly to control the loading of the projectile transfer tray and powder case transfer tray from the load increment transfer cradles. The assembly is an accumulator type pressure system in which the hydraulic fluid drive energy is provided by an electric motor-driven pump assembly.

The hydraulic recoil assembly of the gun system and the air chamber type counter recoil assembly are generally of conventional design and are not operatively associated with the hydraulic system of the instant invention.

A preferred embodiment of the instant hydraulic system of this invention also includes a drive and control system therefor, which is connected to operate a case ejecting assembly to impart movement to move an extracted empty case from a transfer position in alignment with the gun bore, downwardly to a position below the gun, thence forwardly of and external to the gun turret.

The power drive assembly for the case ejection system provides controlled power actuation for the mechanical assemblies thereof. This is the apparatus which moves the received empty case forwardly of the gun slide to a position external of the front gun port. With the exception of the breechblock hydraulic unit the major portion of the hydraulic actuating assemblies are mounted on the slide for the gun. The breechblock unit, however, is mounted on the gun housing and is adapted for movement with the gun in recoil and counterrecoil.

In a preferred embodiment of this invention the electric motor driven power plant, or other source for supplying the necessary hydraulic energy to these units, is securely affixed to a platform which forms a part of the gun turret structure. Fluid supply from the hydraulic energy source is delivered to a manifold system thence through suitable swing joint structure to a second manifolding system on the gun slide. Such an arrangement permits the mounting of all control and power drive assemblies on the gun slide and limits the number of structural connections required to only those which are necessary to allow for gun movement about its trunnion axis.

The fully controlled handling of all gun loading and empty case removal operations may be controlled by structure at or near the point of desired function accomplishment. The necessity for complicated mechanical drive arrangements to provide these functions is thereby eliminated. The necessary energy for operational movement is applied by the hydraulic fluid of the system to the hydraulically operated system components. In the case of the breech block operating mechanism, which is for reasons of convenience, mounted on the housing rather than on the slide assembly proper, a suitable coupling means is provided for transfer of fluid energy from a fixed position on the slide to a cylinder arrangement on the housing. The structural elements thereof are adapted for movement in recoil and counterrecoil. The fluid flow function is accomplished by a sliding joint which provides constant energy as needed, at the hydraulic cylinder and at the same time permits longitudinal movement of the gun and housing without interference or interruption of this control fluid flow.

The arrangement of the hydraulic assemblies on the gun slide proper permits the movement of all of these assemblies with the gun in its movement about its trunnion axis. The mechanical system for ammunition handling and gun loading, with which this invention is intended to be used, permits continuous gun loading and empty case disposal without it being necessary to move the gun back to the loading cycle position of conventional large bore gun systems.

The power plant or hydraulic energy source comprises a storage tank containing a hydraulic medium, the above mentioned manifold connected to the various hydraulic units of the gun and the above mentioned accumulator which is connected in series relation with the manifold and tank. The pump assembly forces the hydraulic medium from the tank to the manifold thence to the accumulator for charging the latter. A valve unit is provided in the accumulator for automatically by-passing the pump to the tank when the accumulator has been fully charged. The supply of the medium to the manifold is automatically reestablished after the accumulator has been partially discharged. The power plant thus supplies a variable amount of energy which increases with the simultaneous operation of certain of the hydraulic units in the gun cycle. This is an important advantage of the present invention. This accumulator arrangement is such that the motor operates continuously and drives the pump so that at idling condition a small flow is produced through the accumulator and at any time when greater demand is placed upon the accumulator than that available by reason of the air charge placed thereon, the accumulator automatically charges by means of valve shifting to a condition to recharge or restore the charge to a maximum value.

The details of the hydraulic unit which operates the breechblock is claimed in U. S. Patent 2,789,472 to Frank Warlick, dated April 23, 1957 and includes a cylinder assembly having a piston therein with its piston rod connected to the breechlock. The assembly is supported by the gun housing in a manner whereby the piston rod is attached to the breechblock and the piston attached thereto is received in the cylinder and adapted for longitudinal movement therein. A directional control unit is interposed between the cylinder and the hydraulic energy source to provide bi-directional operation of the piston within the cylinder during closing and opening cycles of breechblock operation. This control unit includes a valve assembly which is shiftable to alter the path of flow to an upper or lower operating surface of the piston within the cylinder. The breechblock control system conventionally includes a valve assembly which is shiftable by the linkage assemblies associated with the breechblock bolt and serves to admit hydraulic fluid from the source to the directional control unit of the power cylinder. In addition to the pair of valves which serve to control the direction of flow of the hydraulic fluid within the cylinder, the system includes a valve, actuable by the breechblock in opening action, to cause one of the pair of valves to terminate the flow of hydraulic fluid from the source through the first mentioned valve to the cylinder.

The breechblock is arranged to move to a position somewhat beyond its loading position below the gun bore to operate the control device for the empty case extractor. Thereafter the extractor ejects the empty powder case rearwardly from the gun barrel into the mechanical transfer assembly of the empty case ejecting system.

In the preferred embodiment of this system an additional manual-mechanical actuation means is provided for operating the empty case extractor. The mechanical device is in an arrangement which moves the piston assembly of the extractor, as well as the case engaging spade elements thereof. This piston movement necessitates resetting of the automatic control valve of the extractor system. This resetting is provided by a manual lever arrangement which merely resets the valve to permit actuation of the extractor cylinders and the spades thereof by subsequent breechblock dropping action.

The present invention according to a preferred embodiment thereof is well adapted for use with a large bore gun such, for example, as an 8 in. rapid fire turret type unit. A gun having a rapid rate mechanical handling system, including hoisting and cradle transfer assemblies of a type adapted to load the transfer trays of the gun slide system at any angle of gun elevation, when combined with the improved electrically controlled hydraulic-control-and actuation system of the present invention has been found to permit satisfactory high rate projectile firing at a more rapid rate than that heretofore obtainable in large bore guns.

In light of the foregoing, it is a feature of the present invention to provide power actuation for ammunition loading and for empty case disposal for major caliber guns of a type which are adjustable in elevation and in which the loading of a round of ammunition accompanied by empty case disposal is initiated at a position adjacent the gun trunnion and in which the empty case is ejected to a position forward of the gun house shield and externally of the turret.

One object of the present invention is the provision of fully automatic hydraulic control and power actuation for a gun loading and firing system in which many of the foregoing disadvantages are obviated and which is adapted to perform satisfactorily all of the essential functions of the systems heretofore or now in general use and in which the possibility of apparatus malfunction or failure is reduced to a minimum and where personnel malfunction is reduced to zero.

An additional object of this invention lies in the provision of a rapid fire gun actuating system and mechanisms therefor for use with gun mounts of a turret, and which are adapted to be electrically interlocked to provide automatic predetermined sequential operation of the gun loading and handling system of the turret.

Another object of this invention is the attainment of new and improved automatic gun loading control of both the projectile and powder charge without manual intervention and in a time sequence relationship one with the other.

An additional object of this invention lies in the provision of a control and actuation system adapted for use with a mechanical handling system for semi-fixed ammunition.

Another object of the invention lies in the accomplishment by improved means of a projectile transfer actuation and powder case transfer actuation from a position adjacent and external to the gun slide to a position for ramming in alignment with the gun bore at any angle of gun elevation.

Additionally, it is an object of this invention to provide power actuation means for the mechanical system of a gun turret and control means for said hydraulic energy means to permit rapid gun loading of projectile and power case ammunition increments simultaneously or selectively from increment receiving positions adjacent the gun trunnions.

In correlation with the immediately preceding object regarding simultaneous or selective loading of projectiles from handling positions adjacent the gun trunnion it is also an object of this invention to provide control means whereby this loading may be in a synchronized timed relationship; the projectile increment and the powder case increment handling being coordinated and wherein, additionally, projectile increment transfer may be detained as desired to permit projectile fuze setting in the turret gun cradle at the last possible instant before transfer into the projectile transfer tray of the mechanical system and whereby powder case transfer from the cradle to the transfer tray may proceed to the action of reception of the increment in the powder transfer tray. This powder case handling may be carried out irrespective of the holding of the projectile in the projectile cradle.

Another object of the present invention is to provide a hydraulically actuated automatic drive system apparatus of the character stated which, by use of suitable electric interlocks therein, provides the proper sequence of operation between the component parts thereof and in which the source of hydraulic energy for the operation of the apparatus is variable to accommodate the peak loads occasioned by the joint movements of certain elements of the apparatus.

Still another object of the instant invention lies in the application of hydraulic power and hydraulic control apparatus to a new and novel disposal system for discharged powder cases wherein the cases are ejected at the front of the gun turret.

An additional object of the invention lies in the provision of an automatic hydraulic control and drive system by means of an improved control and drive mechanism for the simultaneous ramming of both the powder case and the projectile into the gun breech and the correlation with electric interlock means for the activation and return of the ramming means following the completion of the ramming stroke.

A still further object of the present invention lies in the provision of a hydraulically actuated automatic apparatus for gun turret slide operation of the character stated in which suitable hydraulic interlock devices insure the proper sequence of operation between the component parts of the mechanical loading system of the type for which use the invention is intended and in which the source of hydraulic energy for the apparatus is constantly available at sufficient pressure to accommodate peak loads occasioned by joint movement or excessive loading encountered in service operation thereof.

Additionally, and in correlation with the preceding object, it is a further object to provide an available idling flow of fluid which is automatically varied and increased in a manner to maintain the system at a required or fully charged condition.

It is among other and still further objects of the present invention to provide novel hydraulic drive units for use in the automatic gun loading apparatus of a turret; to provide a novel manual or semi-automatic hydraulic unit for operating and closing the breechblock; to provide novel mechanisms for actuating certain of the electrical and certain of the hydraulic interlocks and to provide novel loading and handling controls correlated with firing pin and breechblock interlock mechanisms.

Additional objects and advantages of this invention will be apparent from the following description of a preferred embodiment and the same will be readily appreciated as they become better understood by reference to the following detailed description of the said preferred embodiment and the accompanying drawings wherein:

Fig. 3 is a pictorial illustration of the gun and slide assembly and illustrates the assembled arrangement of the major components of such a system with a mechanical gun loading and ammunication increment handling system;

Fig. 4 is a schematic diagram of the hydraulic accumulator power source and charging system and shows the accumulator at a condition near the completion of its charging cycle;

Fig. 5 is an operational view of the hydraulic power system associated with the accumulator of Fig. 4 and shows the control system relationships and valve actions when the gun slide mechanical units are at firing position.

Fig. 33 is a fragmentary view in elevation of a gun and slide assembly with parts thereof broken away to show details of the empty case ejection system;

Fig. 34 is a view of the empty case drive unit of Fig. 33;

Figure 37:
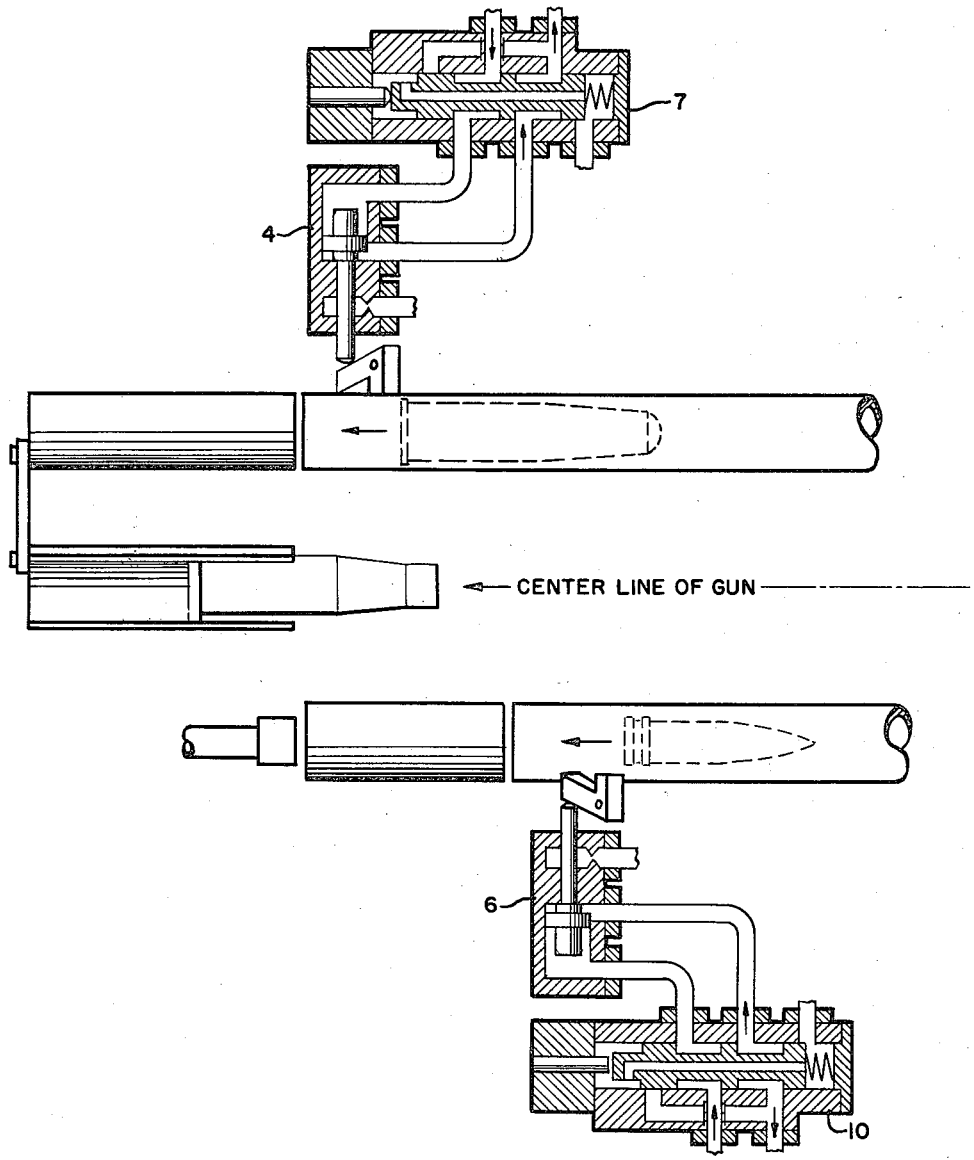
Figure 38:
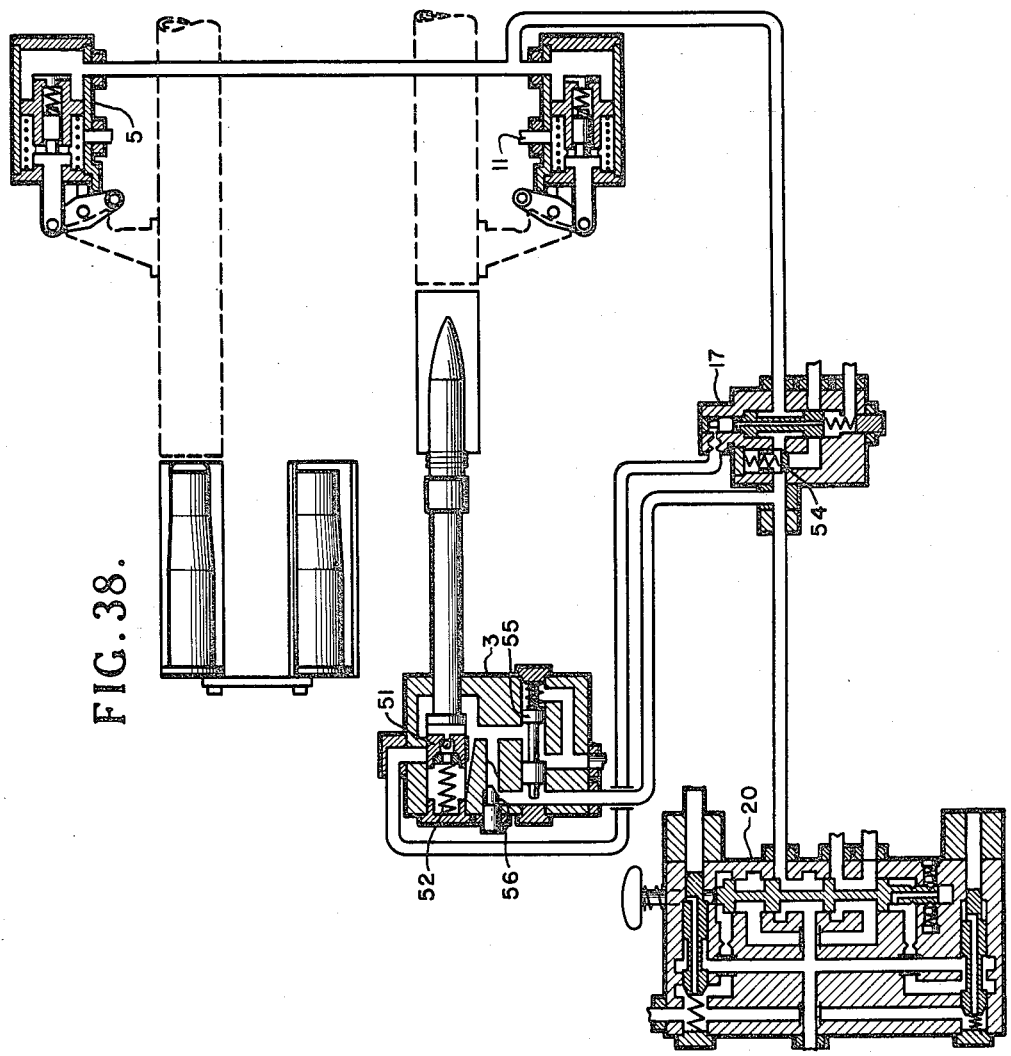
Figure 39:
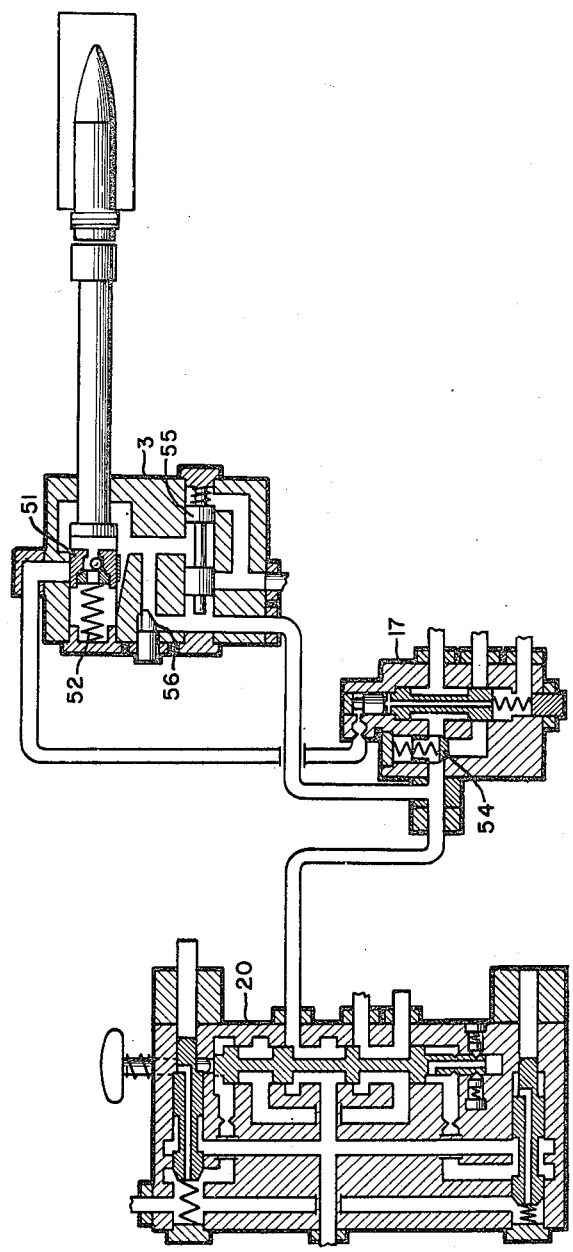
Figure 40:
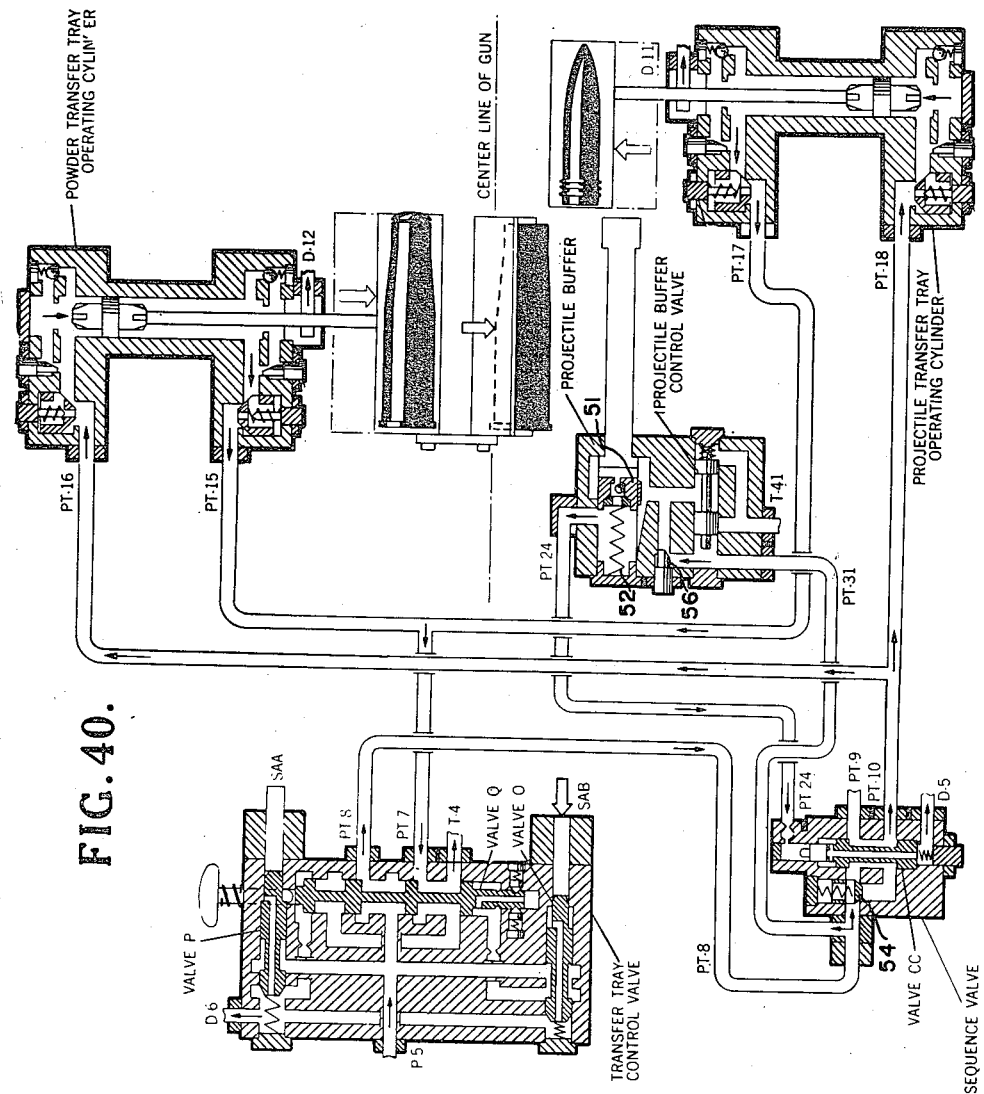
Figure 41:
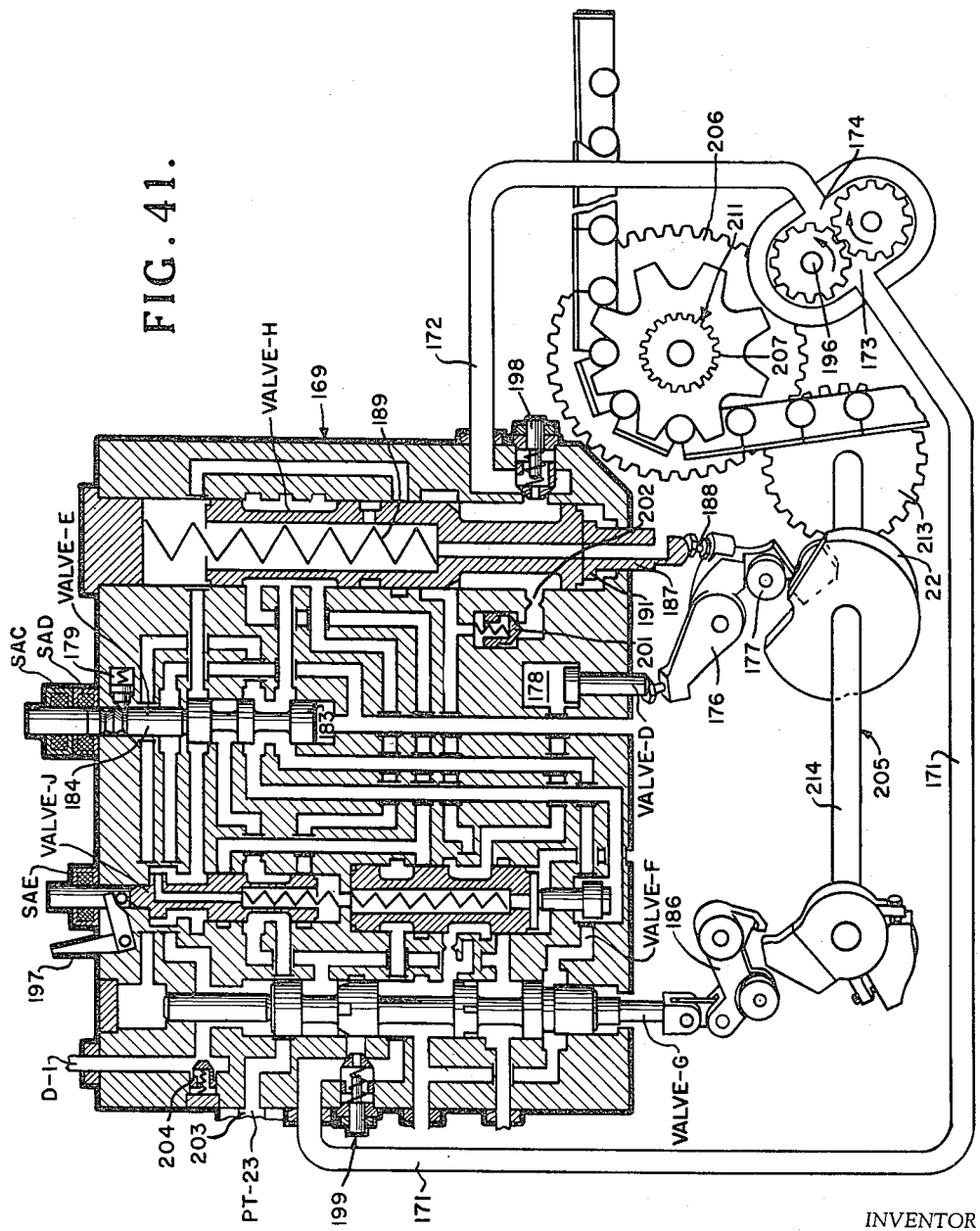
Figure 42:
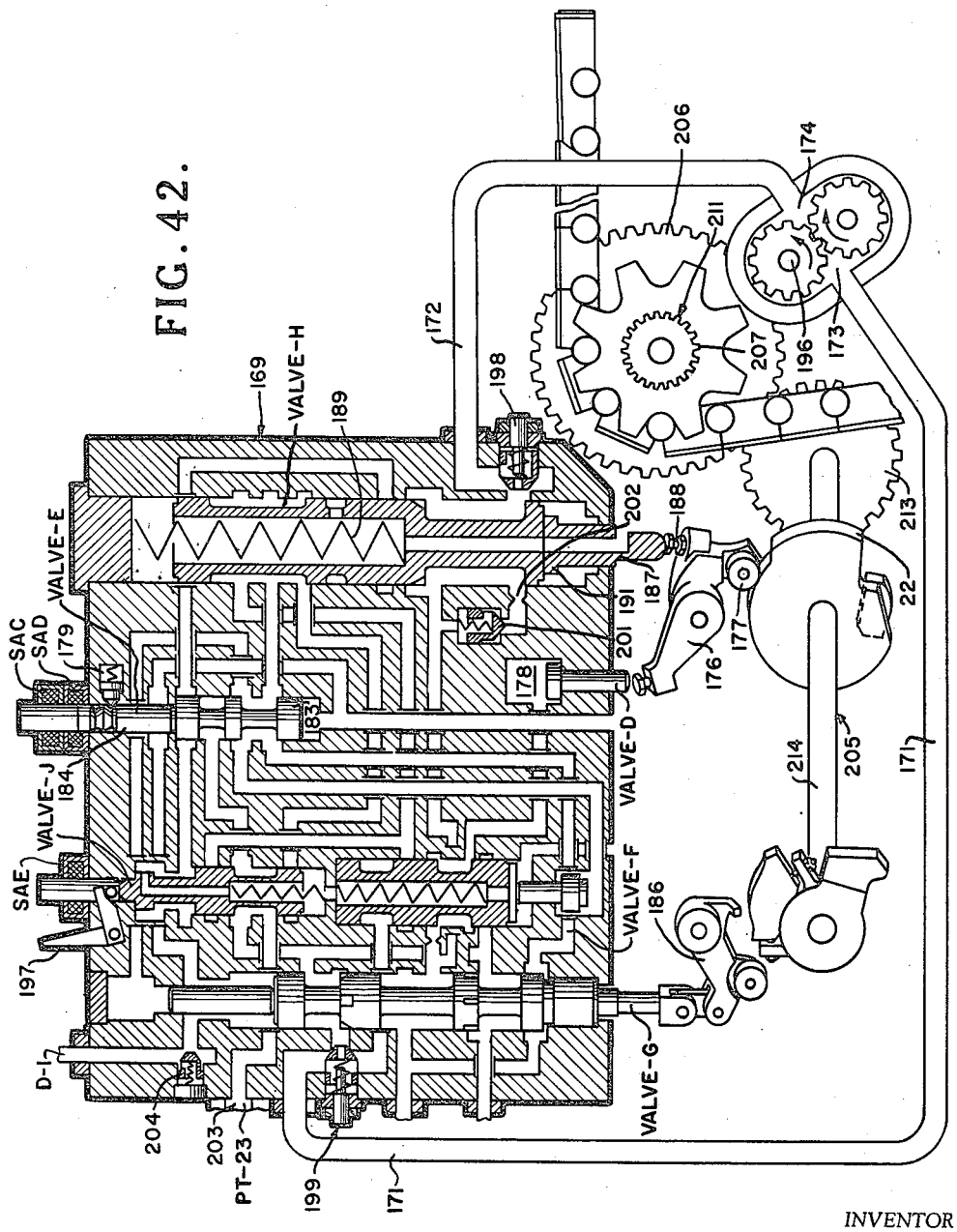
Figure 43:
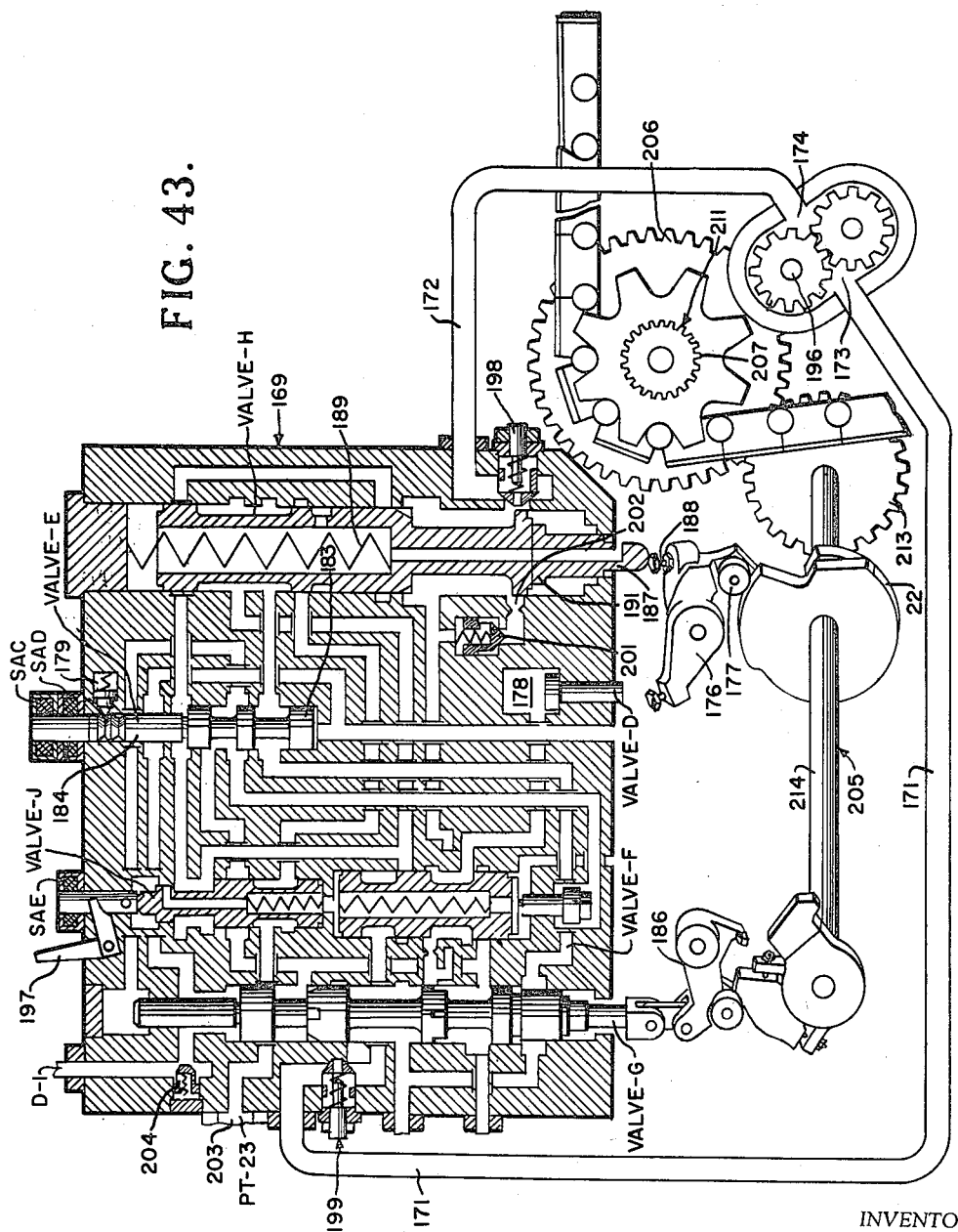
Figure 44:
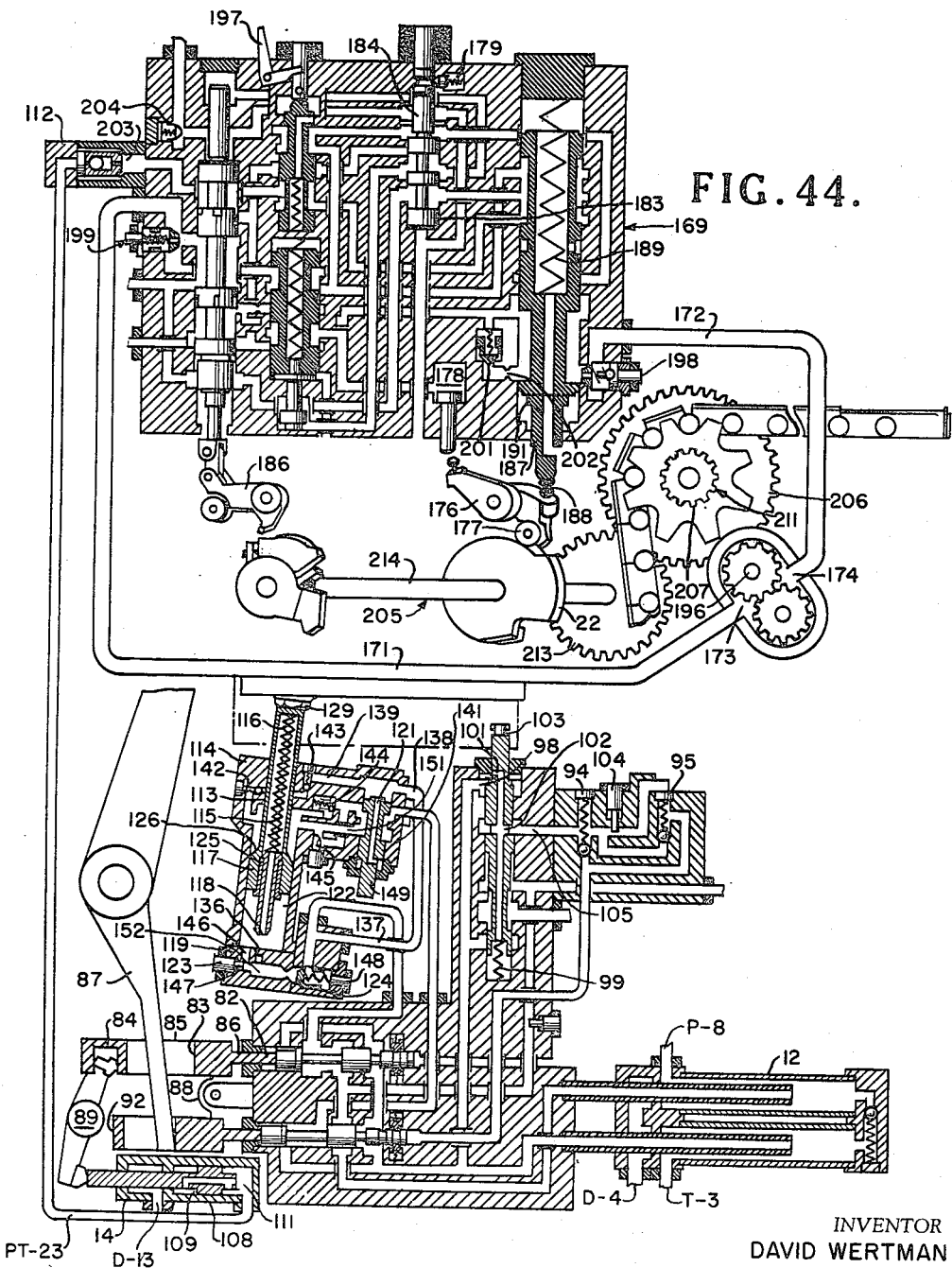
Figure 45:
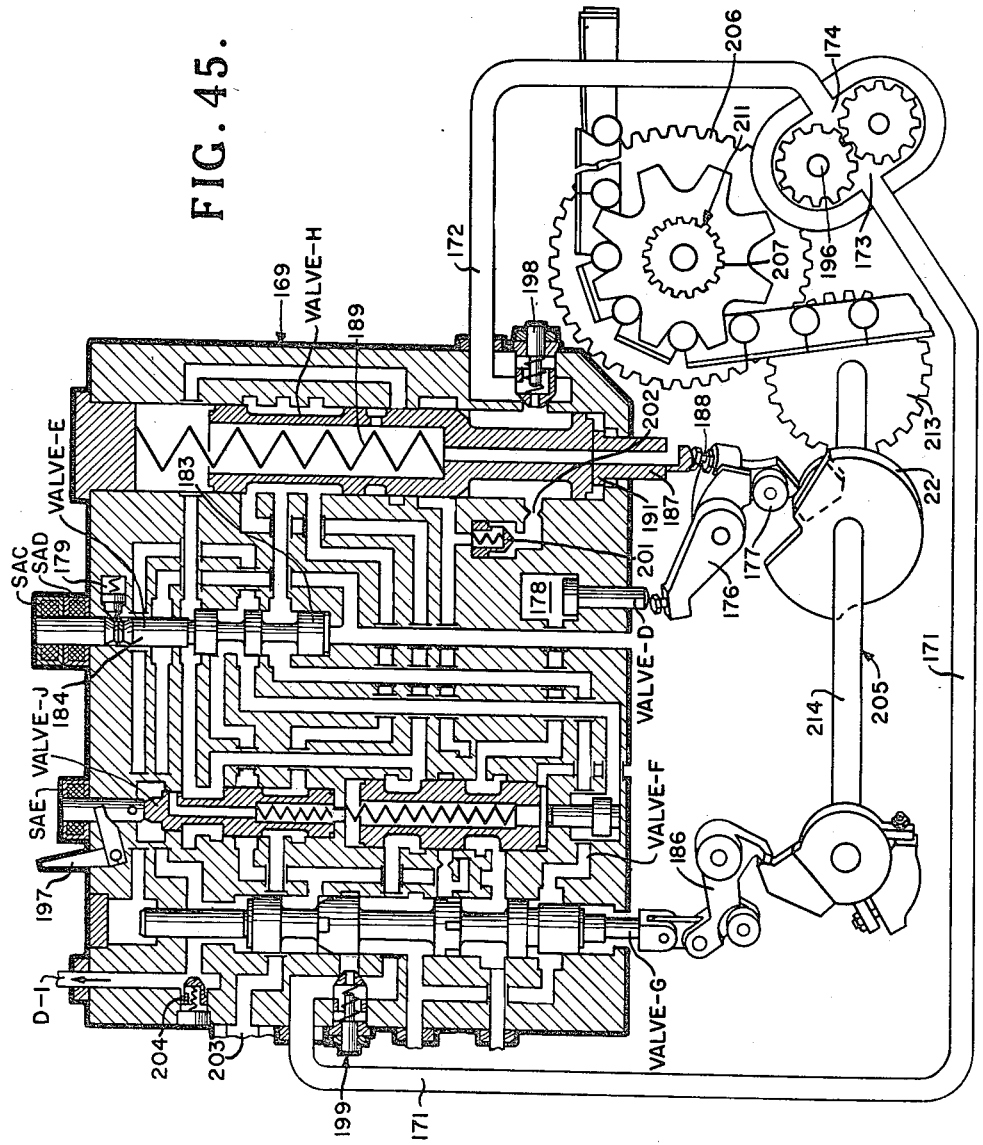
Figure 46:
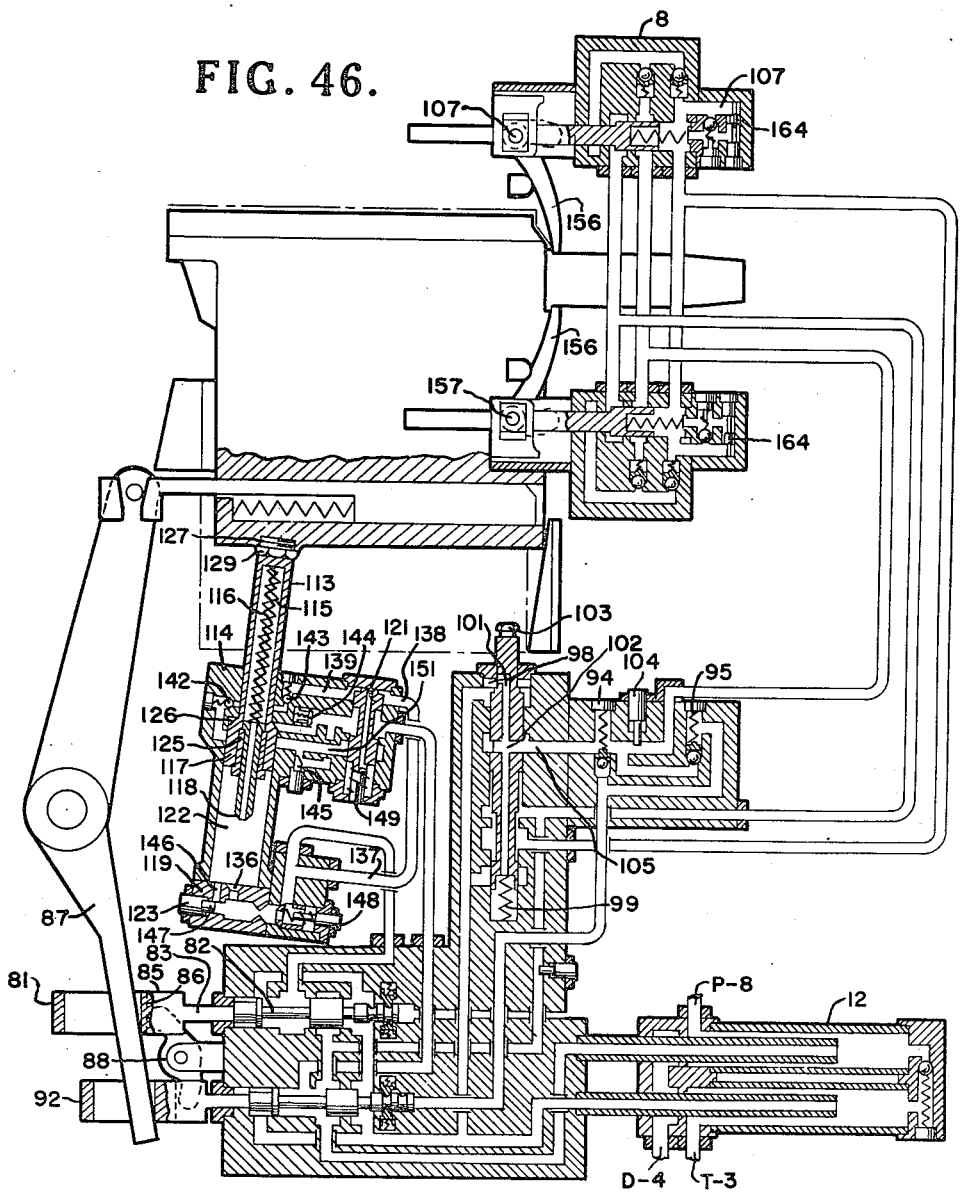
Figure 47:
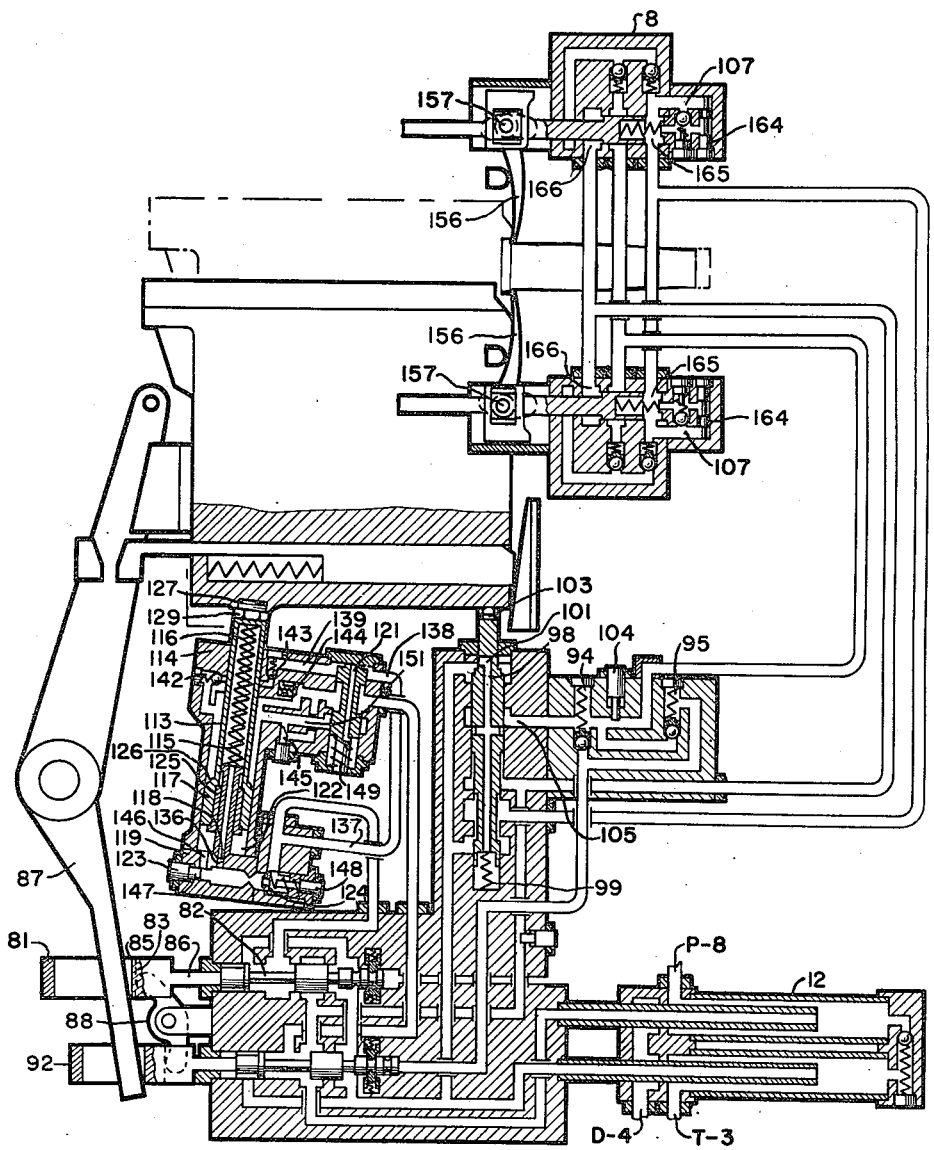
Figure 48:
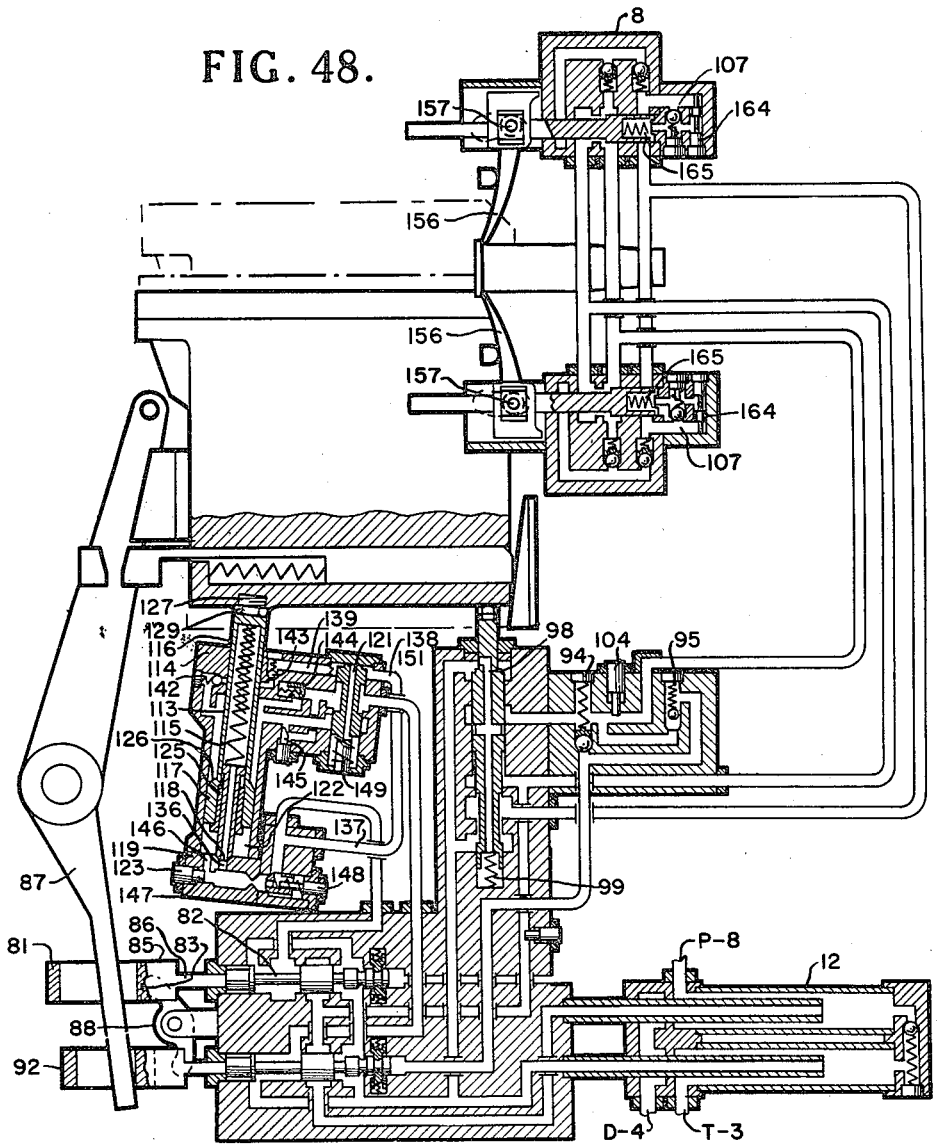
Figure 49:
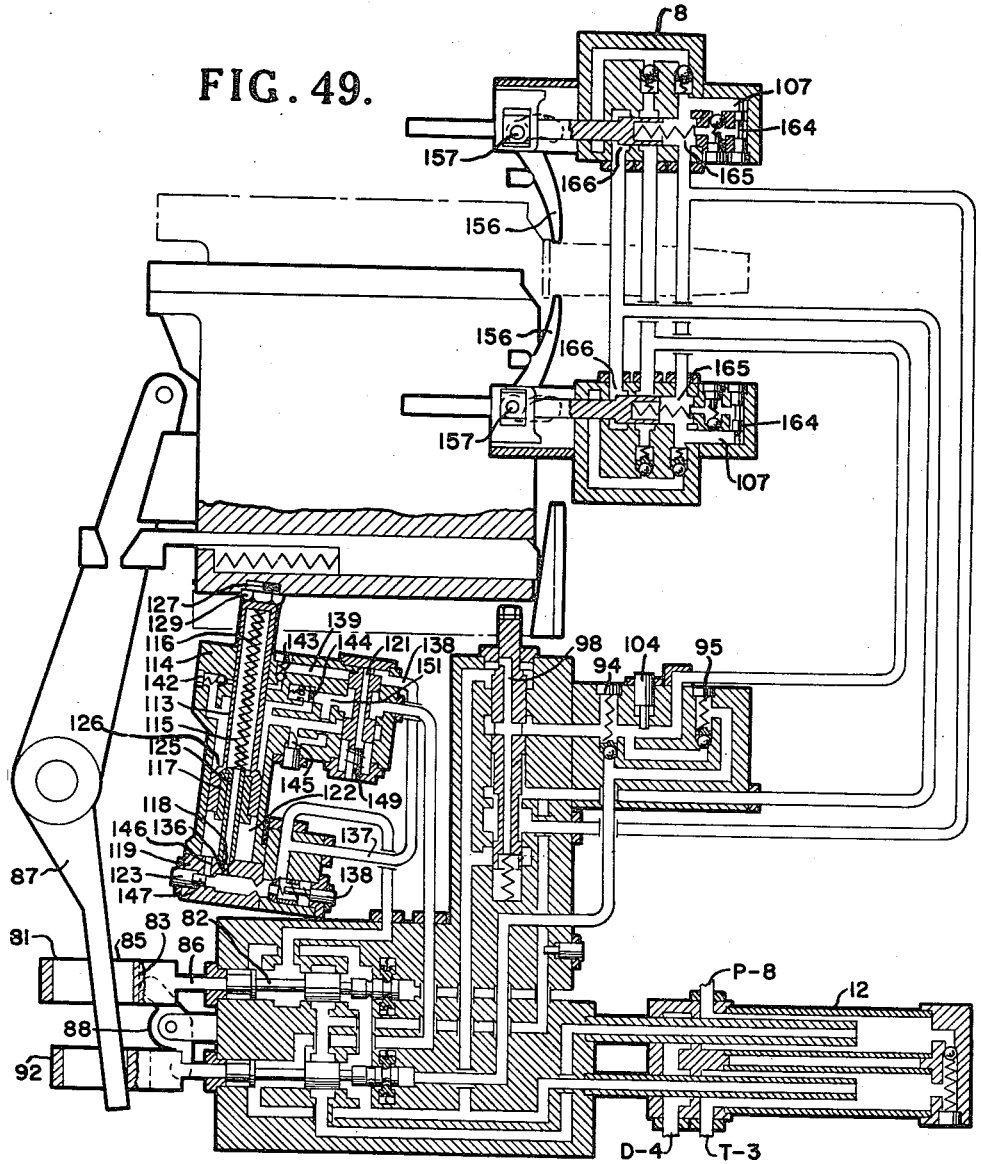
Figure 51:
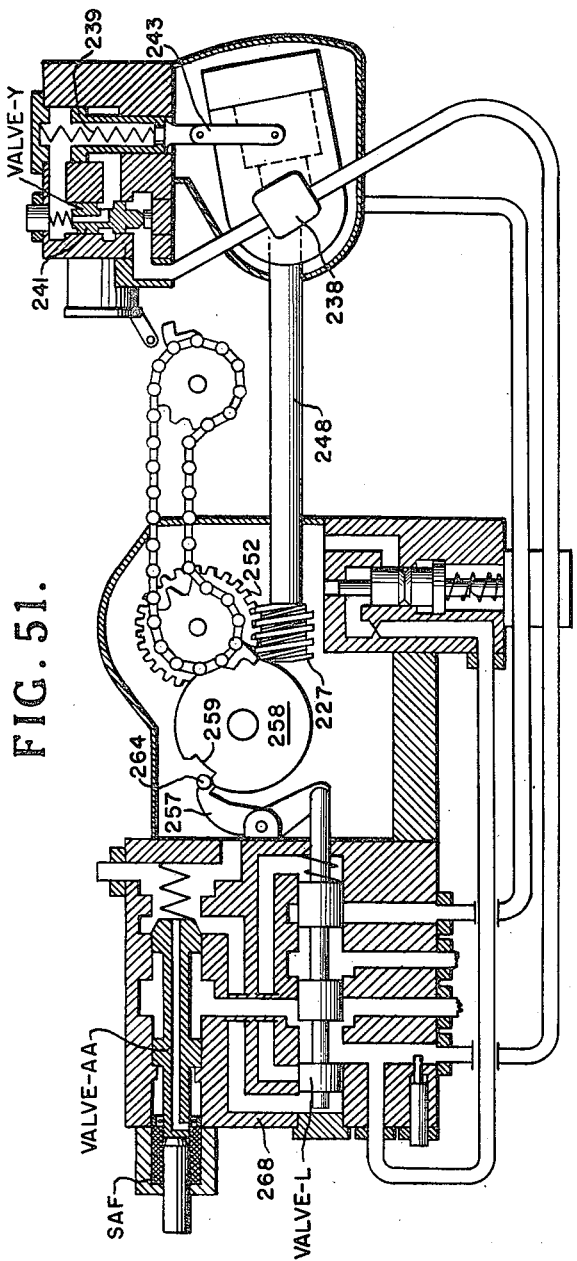
Figure 52:
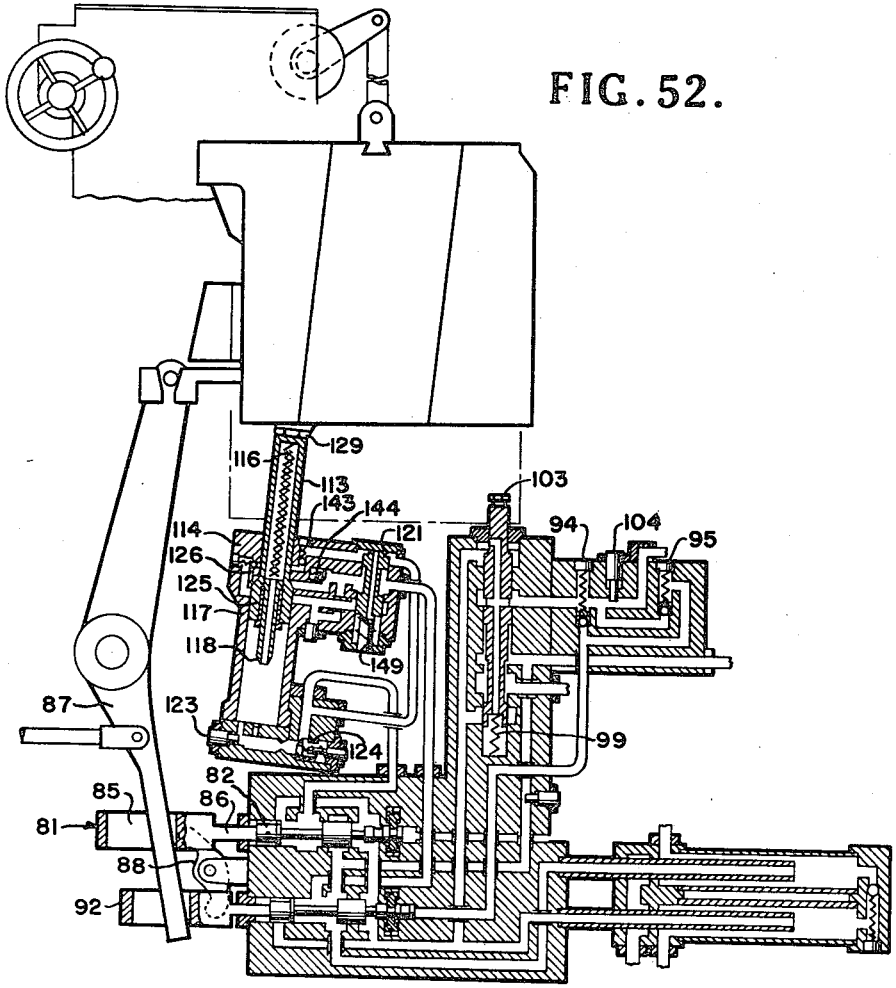
Figure 53:
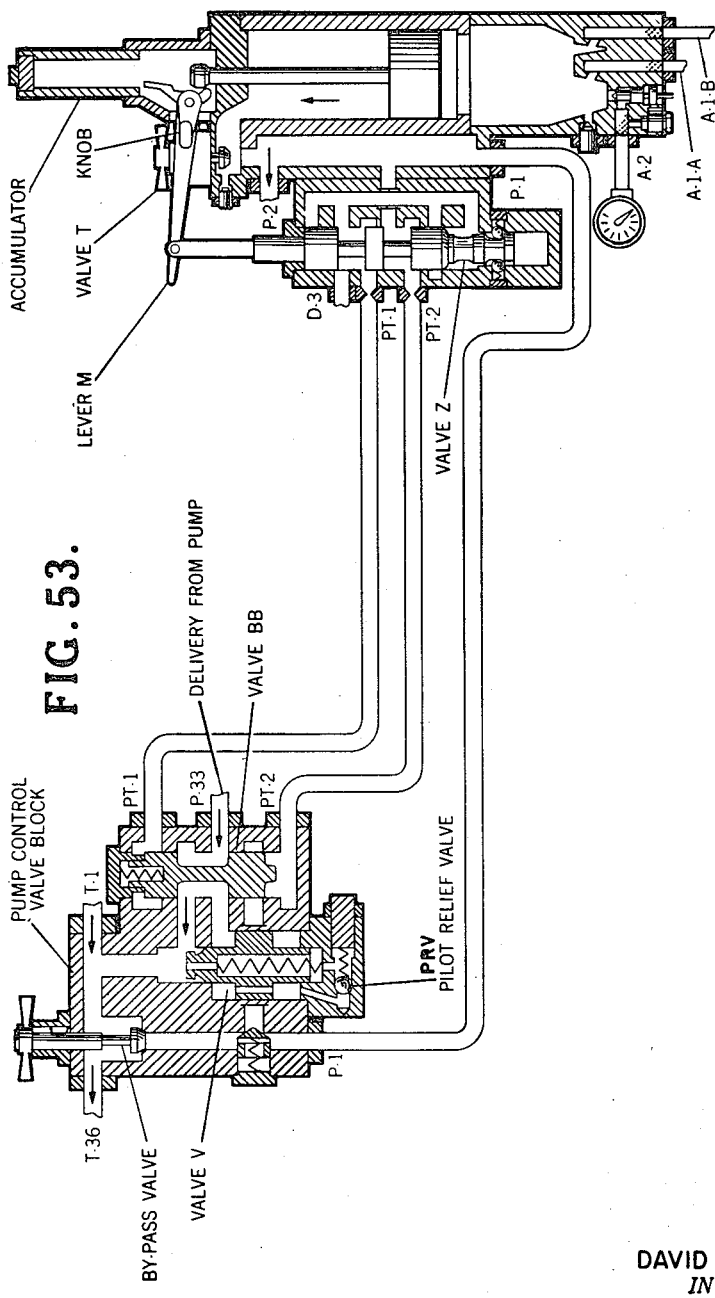

Fig. 37 is an operation schematic diagram of the hydraulic power system showing the normal automatic gun loading actions at initial movement of the system elements for ammunition delivery reception from a hoist loading system cradle to the transfer trays of the system for which the instant hydraulic arrangement is intended, the illustration being of the cradle pawl tripping actions, the breech at open condition, and the extracted empty case tray relationship therewith when the empty case is entering the empty case tray;

Fig. 38 is an operational hydraulic schematic diagram of the normal automatic gun loading actions for a second sequence of movement with the projectile buffing action being shown as completed, the buffer control valve action as it is starting to move and the actions of the cradle latch units at their unlatching position;

Fig. 39 is an operational hydraulic diagram of the power system showing subsequent normal automatic gun loading actions during a third movement thereof, when the buffer is in return stroke action and the buffer control valve is in the cut-off position thereof;

Fig. 40 is an operational schematic diagram of normal automatic gun loading actions during the forth movement of the sequence, when the buffer is at the end of the return stroke thereof, the showing also includes the actions of sequence valve control, transfer tray movement to ramming position, and the empty case delivery to the case ejector;

Fig. 41 is an operational hydraulic schematic diagram of normal automatic gun loading action during a fifth movement portion of the cycle thereof wherein the showing is of the position of valve and cam elements of the rammer drive unit at the start or ram creeping movement;

Fig. 42 is an operational diagram similar to Fig. 41 during the sixth sequence of movement, showing the position of the rammer drive unit valve elements during ramming action;

Fig. 43 is an additional operational illustration of the rammer drive unit showing normal automatic gun loading action during a seventh movement which occurs at the end of ramming action, the showing thereof being of valve porting action to reverse the hydraulic fluid flow to the rammer drive motor;

Fig. 44 is an operational showing of the hydraulic power system during normal automatic gun loading action wherein showing is of the eighth movement of the system operational cycle when the breech block is undergoing hydraulic closing action and the ram chain is under retraction;

Fig. 45 is an operational drawing of the hydraulic power system rammer drive unit under normal automatic gun loading action during the ninth of a series of operational movements, wherein the showing of rammer retraction is conditioned to decelerating action of the system associated therewith;

Fig. 46 is an operational hydraulic power system schematic showing normal automatic breech action, at the start of breech opening movement;

Fig. 47 is an operational schematic of the hydraulic power system showing the automatic breech action during breech opening movement thereof and showing valve porting action to lower the breechblock and start case extraction; and additionally it shows the breechblock undergoing buffing action;

Fig. 48 is an operational schematic of the hydraulic power system showing normal automatic breech action, case extraction action and action of a valve thereof in controlling cut-off movement and breechblock movement to ramming position;

Fig. 49 similarly is an operational illustration of the breech system in normal automatic action wherein the further showing is of the breechblock at its ramming position, and a second valve thereof in porting action for the return of the extractors to their normal position;

Fig. 50a is an operational schematic of the chain drive unit for the empty case ejector assembly in its normal automatic case ejecting action, the showing thereof being of the case ejector drive in the empty case advancing cycle thereof;

Fig. 50b is a fragmentary diagrammatic view of the compensator for the hydraulic motor, and under overload conditions;

Fig. 51 is an operational view similar to the showing of Fig. 50 with the exception that the case ejector drive unit is in cut-off action, the showing thereof being of the cam lever movement to shift a control valve thereof;

Fig. 52 is an operational illustration of the manual operation of the breech assembly when the hydraulic system is operated by fluid flow through the by-pass of the manual level controlled valve on the transfer tray control block; and Fig. 53 is an operational view of the pump control valve and the accumulator, when the accumulator is discharging.

Figure 1:
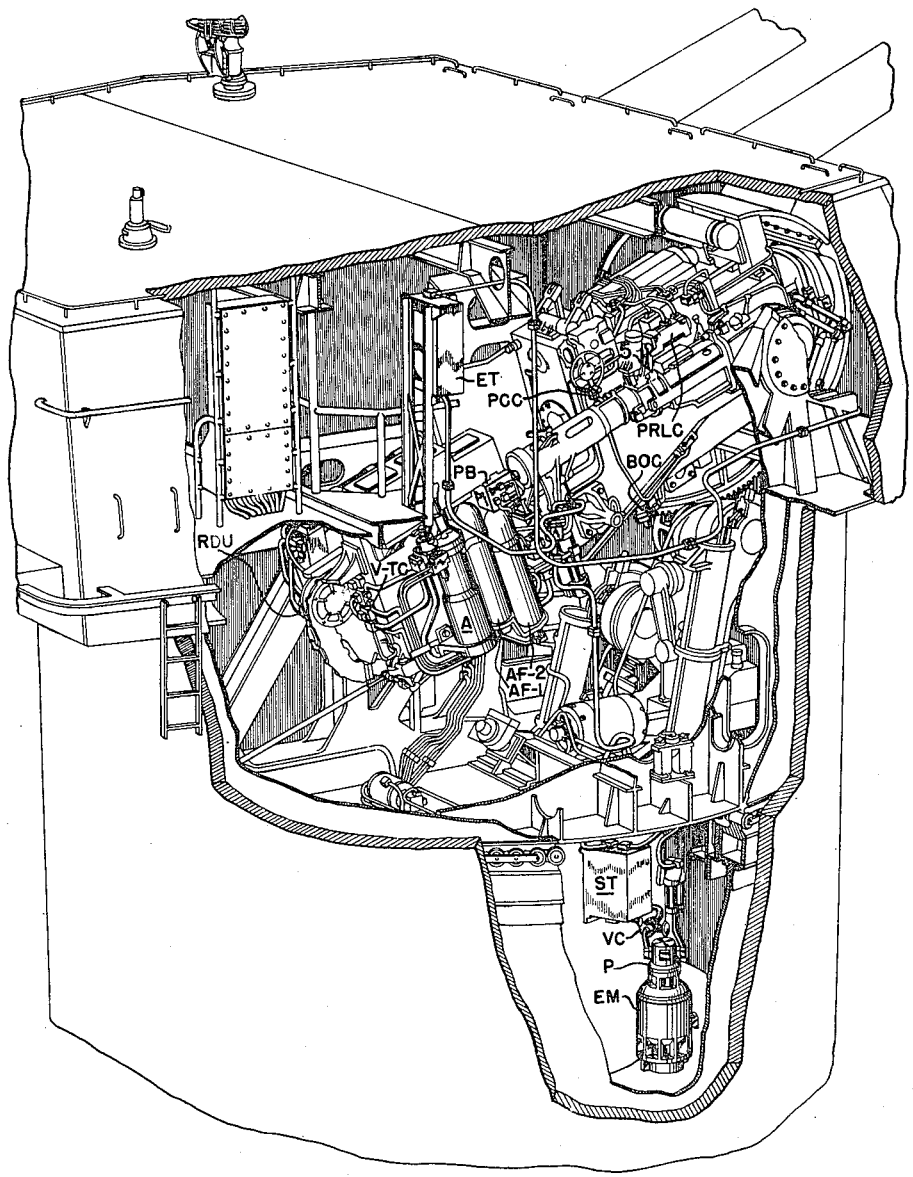
Fig. 1 is a pictorial view partly in section of a right hand turret gun equipment arrangement showing a preferred assemblage of the hydraulic equipment on a turret of the type for which use a preferred embodiment of this invention is adapted.
Figure 2:
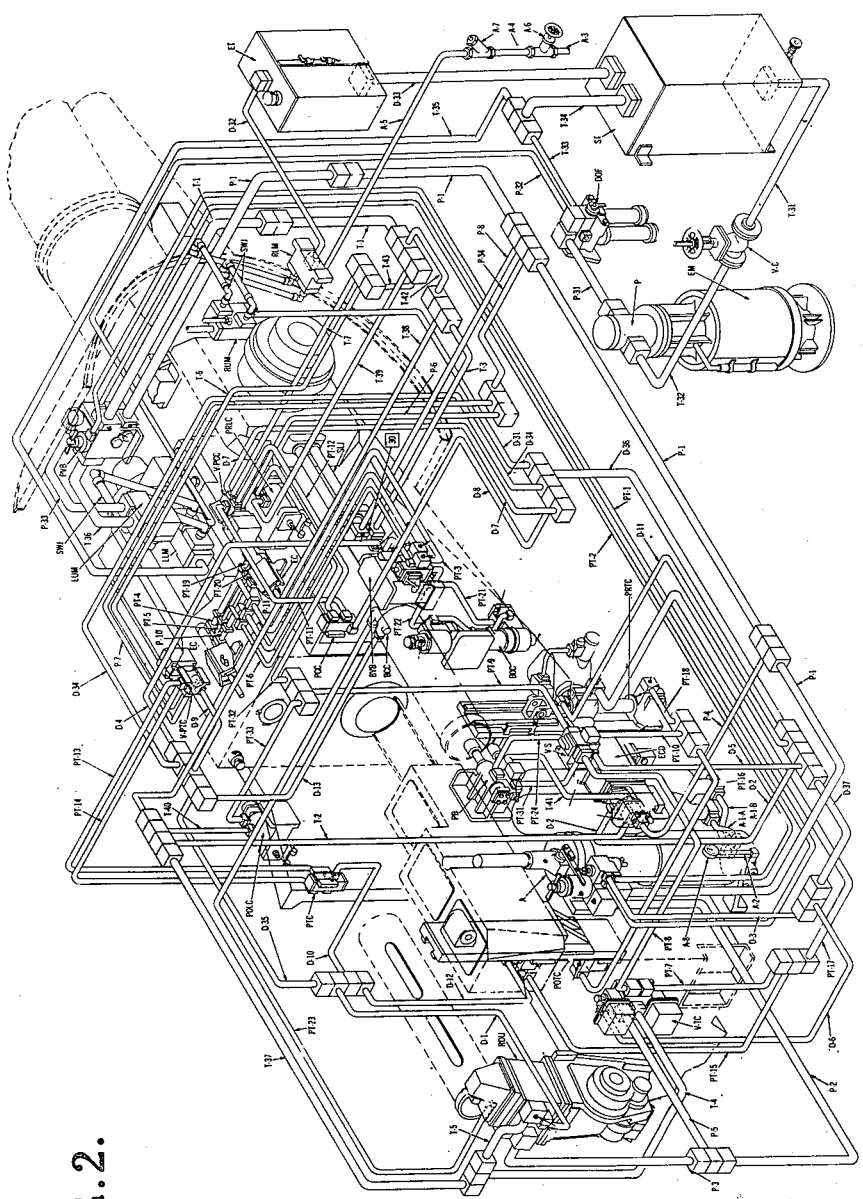
Fig. 2 is a three dimensional schematic illustration of the piping system of the hydraulic power drive and control equipment and the association of such equipment with a rapid fire gun and slide assembly.

Referring now to Figs. 1, 2 and 3 of the drawings, the assemblies of a right hand gun are shown from the right hand side thereof in their assembled positions and with the principal hydraulic system units shown shaded in Fig. 1 and in bold outline in Fig. 3. The alphabetical reference characters utilized in Figs. 1, 2 and 3 provide descriptive abbreviations of the function or character of the particular hydraulic system device to aid in familiarizing the device with the mechanical functioning of the gun system with which it is adapted for use. These assemblies include the electric motor unit EM which is directly coupled to the hydraulic pump P, and is preferably located on a lower deck of the turret. This assembly functions as the source of pressure for the operation of the hydraulic energy units of the entire system. This pump P receives fluid from a storage tank ST, the flow from which is controlled by a gate valve V–C. The output of the pump P is connected through a dual oil filter DOF, wherein the outlets thereof are connected to supply pressure energy to the system through the left lower manifold LLM. This manifold unit is fixedly mounted on the gun mount assemblies adjacent the gun slide trunnion, and is similar to the manifold RLM shown in Fig. 1 at a position forwardly of the gun trunnion on the right hand side of the gun slide. The position of LLM is shown generally in Fig. 2. Fluid is also by-passed from the line running to the left lower manifold LLM and from the outlet of the dual oil filter DOF, to flow through pipe connections hereinafter described in greater detail and designated generally by the P prefixed reference characters into the upper portion of the storage tank ST. A return line system indicated by D prefixed reference characters receives fluid from the right upper manifold RUM and provides for flow from this manifold through the swing joints SWJ to the right lower manifold RLM thence to the expansion tank ET, where it is returned to the storage tank ST. The swing joints between the right upper manifold RUM of the gun slide assembly and the right lower manifold RLM of the slide mount are shown in Figs. 1 to 3 as SWJ.

A suitable arrangement of the hydraulic assemblies for mounting on a gun and slide assembly is shown in heavy outline in Fig. 3 and indicated by numerical reference numerals which are carried through the balance of this description, wherein the rammer hydraulic drive unit RDU motor is shown at 1, the powder case drive cylinder POTC at 2, a projectile buffer PB at 3, a powder cradle latch pawl release PTC at 4 and a powder cradle-to-slide latch assembly POLC at 5. The projectile cradle pawl tripping cylinder PCC is shown at 6, the powder cradle pawl tripping cylinder control valve V–PTC at 7, a pair of extractor cylinders EC for driving the case extractor spades are shown at 8, and the pump control valve block PVB at 9. The projectile cradle pawl tripping cylinder control valve V–PCC indicated at 10 is generally similar to that for the powder case cradle pawl tripping cylinder V–PTC shown at 7. The projectile cradle latching cylinder PRLC at 11 is of similar design to that for the powder cradle-to-slide latch POLC shown at 5. The sliding joints SLJ which serve to transfer fluid flow from the slide to the movable housing are shown at 12 and provide fluid flow to the breech operating valve block BVB at 13 which is associated with a closing valve operating cylinder BCC at 14. These units control the breech operating cylinder BOC which is shown at 15. The projectile transfer tray operating cylinder PRTC shown at 16 is similar in design to that of POTC shown at 2 for the powder transfer tray and is positioned on the opposite side of the gun slide from the powder case handling and transfer equipment. A sequence valve V–S is shown at 17, while immediately therebelow a portion of the empty case drive unit ECD is shown at 18 which is an assembly under the gun slide and operates to drive the case ejection system in ejecting empty cases from the front of the gun shield. The accumulator A is shown at 19 and the transfer tray control valve V–TC at 20.

The above designations as used in Fig. 3 for these parts are for the purposes of clarity in setting forth the location of the structural assemblies and for a better understanding of the invention. The hydraulic piping of the schematic diagrams and all the structure of Fig. 2 is, for purposes of clarity and simplicity in the understanding of the drawings, referred to by alphabetical reference designations corresponding to an abbreviation of the functions thereof rather than the numerical designations.

The additional major assemblies mounted on the gun slide assembly proper, as illustrated in heavy outline in Fig. 3 and in pictorial block diagram form in Fig. 2, are the accumulator A, the air flasks AF–1 at 29 and AF–2 at 30 associated therewith, the rammer drive assembly RDU, the breechblock operating cylinder BOC, the powder case tray operating cylinder POTC and the projectile tray cylinder PRTC. Fluid supply and return connections to and from the operating cylinder BOC are through the sliding joint assembly SLJ which is adapted to receive fluid from a fixed point on the slide and to supply fluid to the operating cylinder BOC mounted on the gun housing. The breechblock is mounted in the housing for movement with the gun in counterrecoil and recoil and must therefore move with this assembly. This is advantageously accomplished by means of the hereinabove recited sliding joint element SLJ in the fluid supply system for this cylinder unit. An additional device incorporated in the fluid control and drive system is the projectile buffer PB not shown in the system of Fig. 6 which serves to receive the impact of the ramming action of the projectile cradle as it rams a projectile into the projectile transfer tray and additionally serves to position the projectile in the tray for subsequent transfer movement to gun ramming position.

The empty case drive unit system EDC is included in the slide system and mounted on a lower rear portion of the gun slide to drive the empty case ejecting chain drive assembly which assembly serves to expel empty cases from the gun slide assembly.

An additional major function of the hydraulic system assembly includes the operation of a pair of case ejector drive cylinders EC which are mounted in a manner to actuate the extractor spades for ejecting an empty cartridge rearwardly from the firing chamber of the gun breech.

Fluid supply to the units of the slide assembly is controlled by the pump valve block assembly PVB as shown in the pictorial diagram of Fig. 2. Hydraulically actuated auxiliary assemblies of this drive and control system for the sun slide include the powder cradle latching cylinder POLC, the projectile cradle latching cylinder PRLC, the powder cradle pawl release cylinder PTC and the projectile cradle pawl release cylinder PCC. These units serve to cooperate with a projectile cradle and powder cradle loading means system for the trays of the gun slide. The latch elements serve to latch and hold the powder and projectile cradles in a latch-to-slide position at their upward limit of travel. The latch elements serve a dual function in that they are part of both the cradle mechanical system and the slide hydraulic system. Upon completion of the latching of the cradles at the slide the units PTC and PCC, respectively, operate to release the cradle pawl which retains the load increment in the cradle. This permits the ram units of the two cradles to eject or transfer the load increments therein, longitudinally into the respective transfer trays of the gun loading system. The control of these two units is coupled with the control and actuation of the latch assemblies. As in the case of the latches, the hydraulic units PTC and PCC operate in a dual capacity since they function as the release means for cradle ram action. The two latch units PRLC and POLC are also adapted to release the engagement of the mechanical latch elements and permit each of the cradles to be moved downwardly to a position for the reception of the next load increment.

The control valve assemblies of this system include in addition to the pump valve block PVB, a transfer tray control valve V–TC, a sequence valve V–S, a powder cradle tripping cylinder control valve V–PTC and a projectile cradle pawl tripping cylinder control valve V–PCC. The valve unit which is associated with the breech operating cylinder is the breech operating valve block BVB, while the breech closing valve operating cylinder is BCC. All of these elements and assemblies with the inclusion of the empty case drive unit ECD are connected into the correlated pipe system shown in Fig. 2 and all cooperate to provide automatic control and hydraulic operation of the turret guns as hereinbefore recited.

The pipe system of the pump and accumulator constant pressure system includes the main delivery line P–1, which runs from the pump control valve block PVB to the accumulator A, and the line P–2 which is a line running from the accumulator to a flange joint of the lines P–3 and P–5. The rammer drive unit RDU is connected by line P–3 at this flange to this joint. Line P–4 connects the empty case drive unit line to the previously recited flange of line P–1. The connection of the transfer tray control valve unit is by line P–5 which runs to the flange connection for line P–2.

The line P–6 connects the projectile cradle pawl tripping cylinder control valve line to a flange of the lines P–7 and P–34. The powder cradle pawl tripping cylinder control valve line P–7 also runs to this same flange. The line connecting the sliding joint associated with the gun breechblock actuating cylinder connects to the flange of P–1 and is designated as line P–8. Line P–9 connects the breechblock operating valve block line to the gun housing and to the lines P–10 and P–11. Line P–10 connects the gun housing to the left extractor cylinder EC while the line P–11 connects the gun housing to the right extractor cylinder also shown as EC. The line P–31 connects the pump to the dual oil filter DOF. Line P–32 is a line from the dual oil filter DOF to the left lower manifold LLM. Line P–33 runs from the left upper manifold LUM to the pump control valve block PVB. Line P–34 is a connection between the flanges of line P–6 and P–7 and the flanges of P–1 and line P–8.

The supply tank return pipe system elements are indicated by the prefix T and include the line T–1 which is a line from the pump control valve block to a flange connection with lines T–39, T–42 and T–43. The line T–2 runs from the empty case drive unit to a flange joint of lines T–37, T–38 and T–40. The line from the sliding joint SJ to flanges of T–38 and T–42 is shown at T–3. Line T–4 is a transfer tray control valve line and runs to flanges of T–5 and T–37. The line T–5 connects the rammer drive unit with this same flange. Powder cradle pawl tripping cylinder control valve connections to the flange of T–7 and T–43 are by the line T–6. Similarly the line T–7 is connected between the projectile cradle pawl tripping cylinder control valve and these same flanges.

The line T–31 provides a connection between the storage tank ST and the cut-off valve V–C. The line T–32 runs from this cut-off valve line to the pump P. Line T–33 connects the dual oil filter with the storage tank and the left lower manifold LLM through the junction with the respective flanges of T–34 and T–35, wherein T–34 is the line from the storage tank, and line T–35 completes the junction of this flange with the lower manifold LLM. The pump control valve block line T–36 is connected to the left upper manifold LUM. Line T–37 connects the lines T–4 and T–5 to the flanges of T–2, T–38 and T–40 as hereinabove stated. This flange is connected by line T–38 to the flanges of T–3 and T–42. Line T–39 is a line connecting the projectile cradle latching cylinder PRLC to the hereinabove recited flange of T–1, T–42 and T–43. The line connecting the powder cradle latching cylinder POLC to flanges of T–2, T–37 and T–38 is the line T–40. Line T–41 is a line from the projectile buffer PB to the empty case drive unit ECD. Line T–42 connects the flange of T–1, T–39 and T–43 to the flange of lines T–3 and T–38.

The drain lines running to the expansion tank ET include the line D–1 from the rammer drive unit RDU to the flange of lines D–10, D–12 and D–35, the line D–2, which is connected from the empty case drive unit line to flanges of lines D–5, D–11, D–36 and D–37, and line D–3 which connects the accumulator with the flange connections of D–6 and D–37. Additionally, the line D–4 is a line from the sliding joints to the flanges of D–9, D–13, D–34 and D–35 while the line D–5 is a line from the sequence valve to the above recited flanges of lines D–2, D–11, D–36 and D–37. The transfer tray control valve V–TC is connected by line D–6 with the above recited flange connection of D–3 and D–37. The projectile cradle pawl tripping cylinder PCC is connected to the cylinder control valve V–PCC through lines D–7 and D–8 by means of flange connections with D–31, D–34 and D–36. A powder cradle pawl tripping cylinder control valve line D–9 is connected with the flange connection of D–4, D–13, D–34 and D–35. The powder cradle pawl tripping cylinder is also connected by means of the line D–10 with the flange into which D–1 is connected. Line D–11 of this system connects the projectile transfer tray operating cylinder with the flanges of D–2, D–5, D–36 and D–37 hereinabove referred to with reference to line D–2. Line D–12 is a line connecting the powder transfer tray operating cylinder to the flange of D–1 etc. Line D–13 connects the breech closing valve operating cylinder with the flange of D–4. Line D–31 runs from the flange of D–7, D–8 and D–34 to the right lower manifold RLM to the expansion tank. Line D–33 is a line from the expansion tank to the storage tank. Additional lines include line D–34 which connects the flange of D–4 to flange of D–7, and line D–35 which connects the flange of D–1, D–10 and D–12 to the flange D–4. Line D–36 connects the flange of D–5 to the flange of D–7 and line D–37 connects the flange of D–3 to the flange of D–2.

The air system associated with the accumulator A and hydraulic assemblies for the slide includes line A–1–A which runs from the accumulator to the air flask AF–1, line A–1–B which similarly connects the accumulator with a second air flask AF–2 and a line A–2 which runs from the accumulator line to air gage A–8.

The air lines designated A–3 through A–7 in this system are a part of the gas ejector system of the copending application to Frank Warlick, Serial No. 185,899, filed September 20, 1950, which matured into U. S. Patent 2,798,412 on July 9, 1957. Line A–3 is a line from the gas ejector air supply line to the air cut-off valve A–6. Line R–4 is a gas ejector supply line which runs to the air strainer A–7, while the line connecting the gas ejector supply line A–4 to the right lower manifold RLM is the line A–5. The gas ejector air supply cut-off valve is shown at A–6 and the above mentioned gas ejector air strainer is shown at A–7. The accumulator air pressure gage as above mentioned is shown at A–8 of this drawing. The air system forms no part of the instant invention but is shown for purposes of illustration, and as a showing of an air source suitable for the charging of the air flasks AF–1 and AF–2.

The pump unit P which supplies fluid under pressure to the accumulator of this hydraulic system is a rotary, multiple vane, constant displacement type unit mounted in direct coupled relationship with the electric motor EM and in the preferred embodiment is vertically arranged for mounting on the turret structure proper. The interior details of the direct drive motor, coupling, and mounting arrangements are generally of a conventional nature and are not shown as they form no part of the instant invention. The electric motor housing and the pump mounting adaptor which extends from the motor housing to the pump housing completely encloses the pump and drive coupling units connected therebetween.

The cut-off valve VC of the system is a standard commercial gate valve and is installed in the supply line between the storage tank and the pump inlet. It is provided as a normally open arrangement, which is closable to isolate the tank system when it is necessary to make pump and motor repairs. The details thereof form no part of the instant invention.

The storage tank ST of the instant system is the main reservoir for hydraulic fluid. In a preferred embodiment thereof, it is a rectangular sheet metal box, preferably mounted near the top of the wall of the circular turret bulkhead. The cover of this tank is fitted with two flanged pipe connections, one of which is the return system line from the slide unit, while the other provides a connection with the expansion tank pipe. The tank bottom is provided with two port openings, one is a flanged pipe connection for a line running to the cut-off valve VC while the other is a drain line which is connected to the purifier sump tank and to the pump filter.

The expansion tank of the system shown at ET in Fig. 1 is a vented hydraulic fluid container of less capacity than that of the large tank. It is of sheet metal construction, and is provided with a sealed cover plate. The fittings installed in the tank cover comprise a filter-strainer type vent cap and a flanged connection for pipe D-32 of the slide drain line system. The tank bottom is fitted with a single flanged pipe connection of line D-32 which is connected to the storage tank ST. A pair of trycocks as illustrated in Fig. 2 are mounted on the side of the expansion tank and serve as fluid level checking points. The trycocks while not essential to the system, are shown as a means of indicating maximum system fluid level or tank capacity. Interior arrangements, not shown, include fixed baffles which are positioned adjacent the storage tank line D-33. Each tank is arranged in the system to permit free expansion of the hydraulic fluid and to provide self-venting of the trapped air throughout the system. The only exceptions to this self-venting of the system, is in the case of the accumulator and the cylinder spaces, each of which is separately vented at suitable vent points thereon.

The dual oil filter DOF of the system as shown in Fig. 1 is of a commercial duplex type and the design details thereof form no part of the instant invention. It has two filter chambers, Fig. 4, each of which is provided with a removable filter element. The conventional design arrangements for the selector and relief valves permit three-way selection, i. e. that of filtering through both elements, or that of filtering through either of the two elements selectively. The relief valve by-passes choked or clogged filter elements. The arrangement of the filter in the system is such that the filter DOF is in the pump high pressure outlet line, and is a full flow arrangement wherein all fluid is filtered before delivery to the accumulator and the slide operating units. The storage of fluid under high pressure is accomplished on the gun slide by the accumulator which consists of the accumulator proper and the two large air flasks AF-1 and AF-2 associated therewith and arrange as shown in Fig. 3, with interior arrangement and connection details as shown in Fig. 4. The unit functions to provide a sufficient quantity of fluid under pressure and serves to provide a reserve of power sufficiently adequate to complete a cycle of gun operation in the event of motor or pump failure. The accumulator control valve ACV, Fig. 7, permits the pump to run idle, during any interval when the accumulator A is full, by by-passing fluid received therein back to the storage tank.

Figure 7:
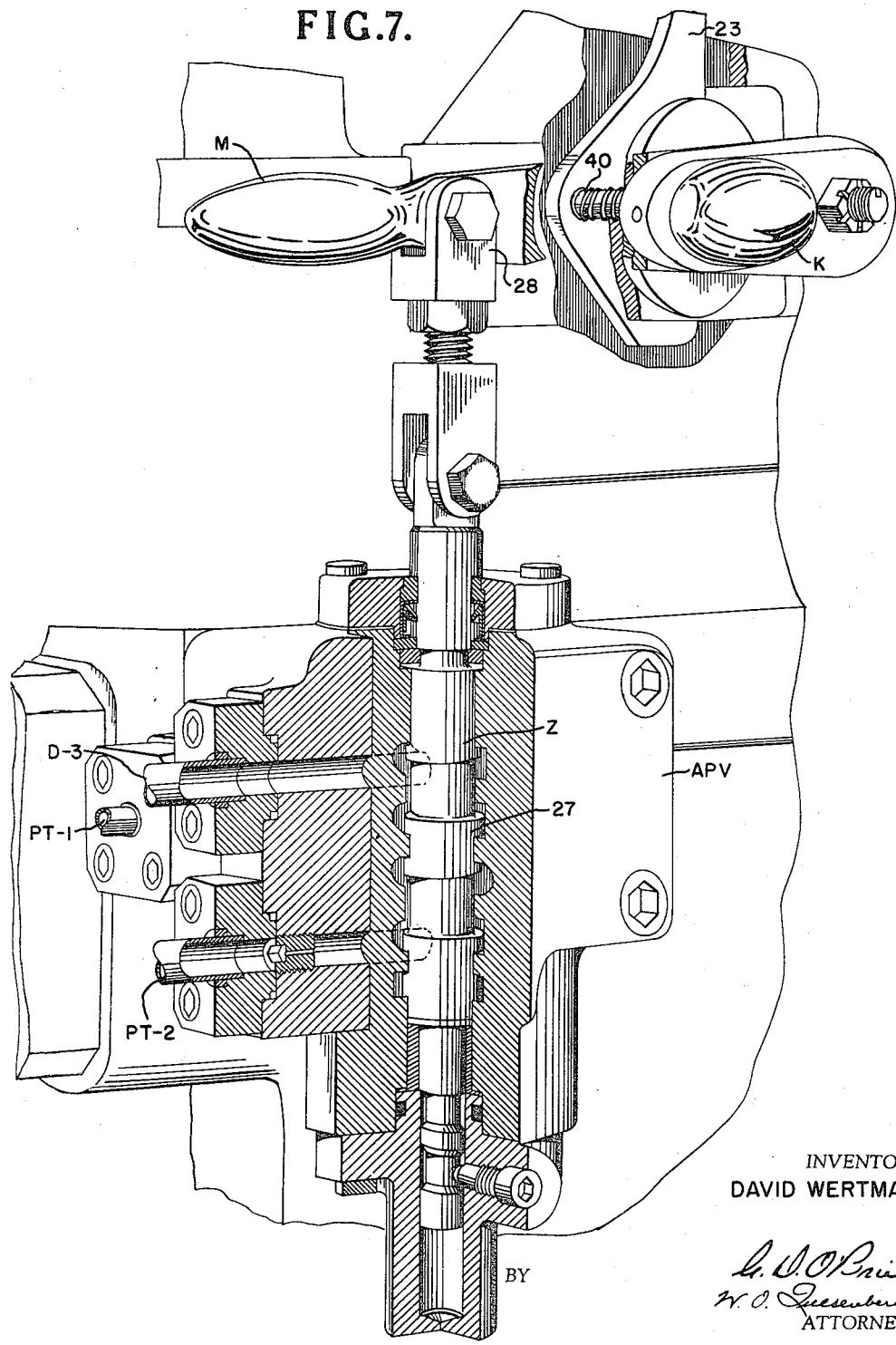
Fig. 7 is a fragmentary pictorial view partly in section of the accumulator pilot valve in the installed arrangement with the manual control lever therefore on the accumulator.
Figure 8:
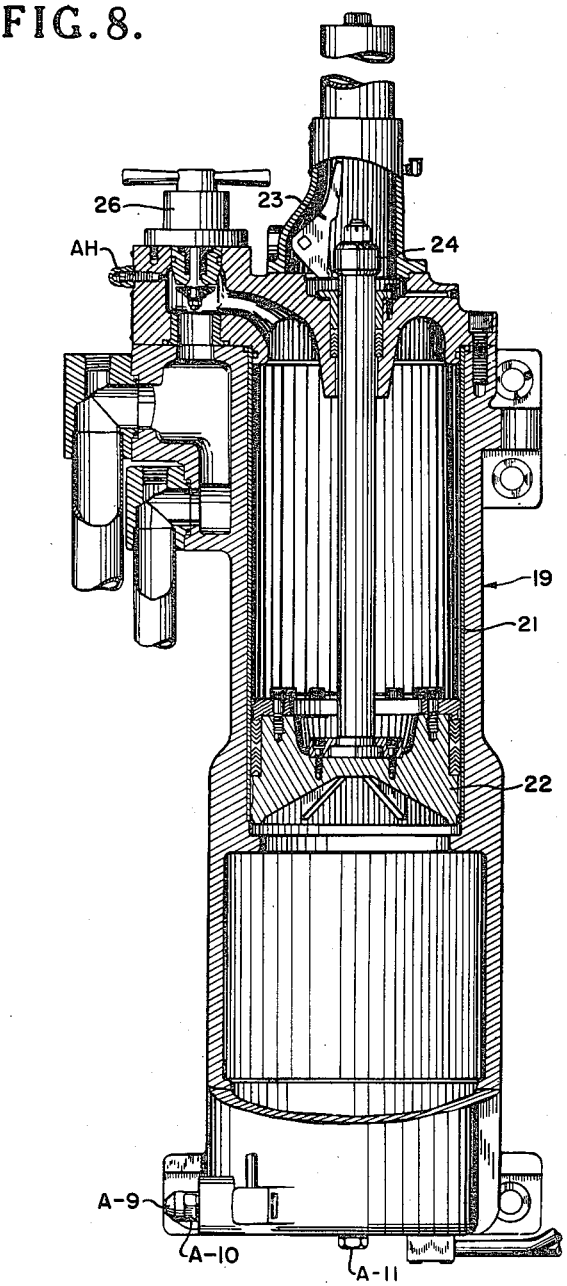
Fig. 8 is a fragmentary elevation view of the accumulator and its shut-off valve with portions thereof being shown in section.

The accumulator of Figs. 4 and 8 consists of a fixed cylinder 21, and a piston 22 therein, with a timing mechanism 23 associated therewith. The timing mechanism 23 is adapted for actuation by a cam surfaced portion 24 at the outer end of the piston rod 25. The accessories also include a shut-off valve at 26, a pilot valve at 27, and connecting linkage therefor at 28, Fig. 7 together with the detent and knob assembly at 40. The upper chamber, or rod side of the piston, stores under pressure, hydraulic fluid received from the pump. The chamber on the opposite side of the piston is the storage space for compressed air. This space is in pneumatic communication with the two air flasks. The air chamber and the air flask are initially charged with compressed air from suitable turret high pressure air supply lines such, for example, as at A-3, Fig. 2. The action of the compressed air against the movable piston maintains an approximately constant pressure in the fluid chamber. The fluid thus stored is connected to all cylinders and drive units when the shut-off valve is open. When the chamber is full, pump delivery is cut off by the position of the pilot valve, and all pump displacement is by-passed back to the storage tank or permitted to flow direct to meet the demands of the operating units. When the chamber discharges to supply operating demands, the piston rises and the pilot valve is tripped by cam 24 to actuate timing element 23 to move linkage 28 to move valve stem 27 to a position that pours pump delivery to the fluid chamber.

An air gage A-8, an air filling valve A-9, and an air charging inlet A-10 are provided at the bottom of the accumulator. These accessories are normally closed to the air pressure, and provide air replenishing and air pressure checking facilities for convenient checkup on the condition of the unit and maintenance theerof for operation.

The valve units of the accumulator include two hydraulic and five air valve units which comprise the shutoff valve T at 26 and a pilot valve Z at 27, an air vent arrangement A-H of the hydraulic side, a charging inlet A-10, filling valve A-9, gage A-8 and a drain A-11 in the air chamber side.

The shut-off valve T is a poppet type having a valve disc which is manually opened and closed in operation. When in closed position it cuts off the hydraulic chamber from the operating and power plant system. It is always closed when equipment is secured after operation.

The pilot valve Z at 27 of Fig. 7 is a spool type cylindrical valve which is internally linked to a lever means M, by which it is normally shifted by the accumulator piston in automatic cam action thereof. It is a two position valve and is held in each position by a spring detent at 40. In its upper detent position to which it is tripped when the accumulator hydraulic chamber is full, it controls by-passing of pump displacement back to the storage tank. This is the condition when operating and at pump idling. In its lower detent position it cuts delivery to the accumulator.

The valve lever device M is provided with a manually latching knob arrangement at K to permit uncoupling from the cam action. This device provides a means of manual control for shifting the pilot when testing or inspecting any of the operating equipment or in the event air pressure is lost. Additionally, it provides a means of controlling the speed and of stopping operating equipment action in mid-cycle. The air filling valve A-9, of Fig. 8, of the accumulator is a needle type valve which is arranged in special packing elements and is secured under the accumulator cover. It is in a normally closed arrangement with the air system and when closed cuts off the air leads to the air charging inlet A-10 and the air pressure gage A-8. A pressure reading may be made by opening this valve, while maintaining the charging inlet closed.

The two air flasks AF-1 and AF-2 are identical steel bottle assemblies separately connected to screened inlet ports in the bottom of the accumulator, and are charged simultaneously with the charging of the accumulator air chamber. The system is arranged to maintain 950 to 1000 lbs. air pressure per square inch, which pressure is sufficient to maintain the hydraulic fluid at a pressure for operation of the hydraulic control and drive assemblies.

Figure 15:
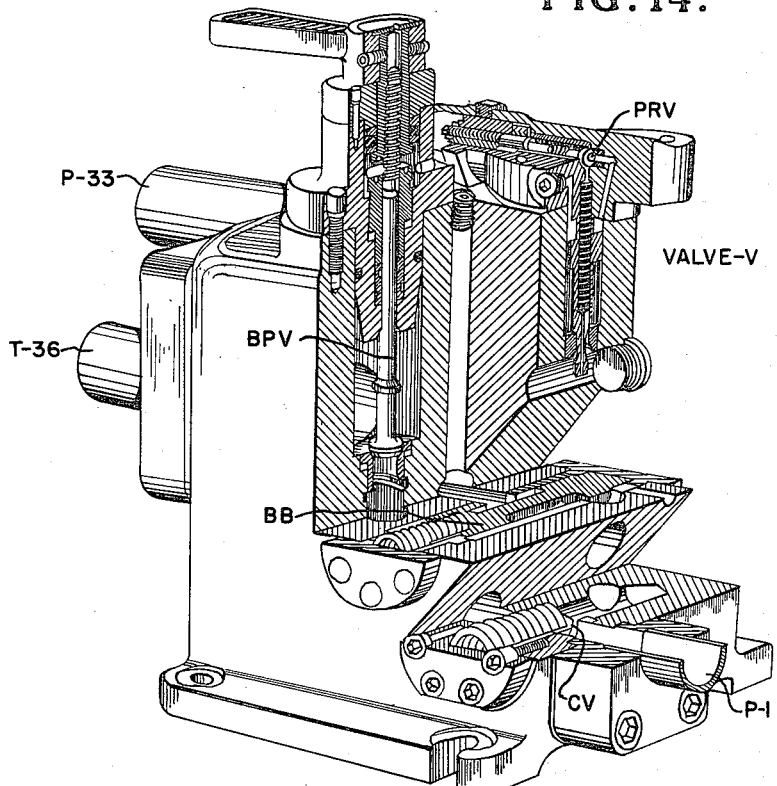
Fig. 15 is a pictorial view substantially in quarter section of the pump control valve block.

The pump control valve block PVB, Figs. 15 and 53, is a multiple valve assembly arranged in the lines running between the pump and accumulator and is mounted on top of the slide, preferably in front of the recoil cylinder as indicated in Fig. 1. The general arrangement of the valves and pipe connections thereof is shown in Fig. 2 and the diagrammatic arrangement in Fig. 4. All pump delivery to the accumulator and all exhaust fluid returned from the operating equipment by way of the tank system flows through the block assembly. It houses five valve elements which function to control system pressure, pump unloading and fluid by-passing actions. These valves are a relief valve V, a pilot relief valve PRV, an unloading valve BB, a check valve CV and the by-pass valve BPV.

The relief valve V and its pilot relief PRV unit of Fig. 15 are of conventional design wherein the pilot valve is an adjustable spring seated ball check which is set to relieve at a pressure somewhat higher than the operating pressure maintained by the accumulator. It controls the balancing pressure in the upper chamber of the valve. The relief valve V is a piston and cone type unit located in the pump delivery line in an arrangement for closing of a tank line port. It operates under a light spring-load in a manner to balance the pressure on the opposed equal piston areas, when high pressure fluid is dumped in the tank system.

Figure 35:
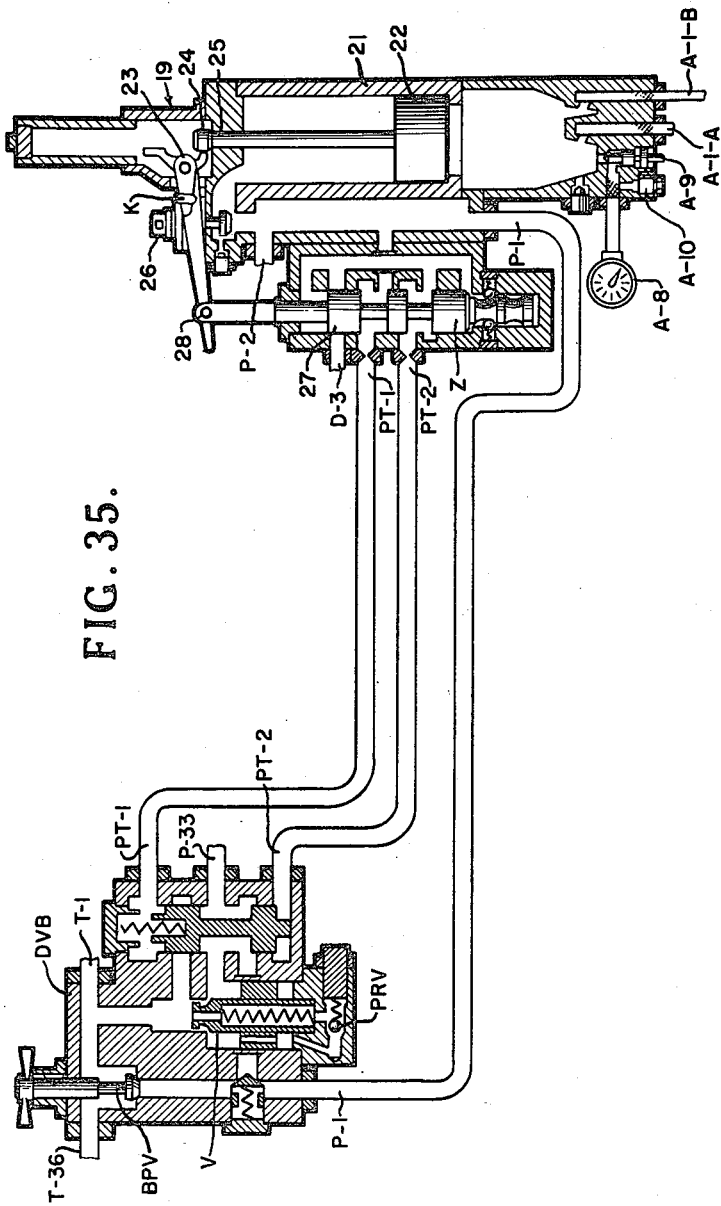
Fig. 35 is an operational hydraulic schematic diagram wherein the showing is of the pump control valve block and shows flow conditions when the system is being relieved through a valve of the pump control valve block.
Figure 36:
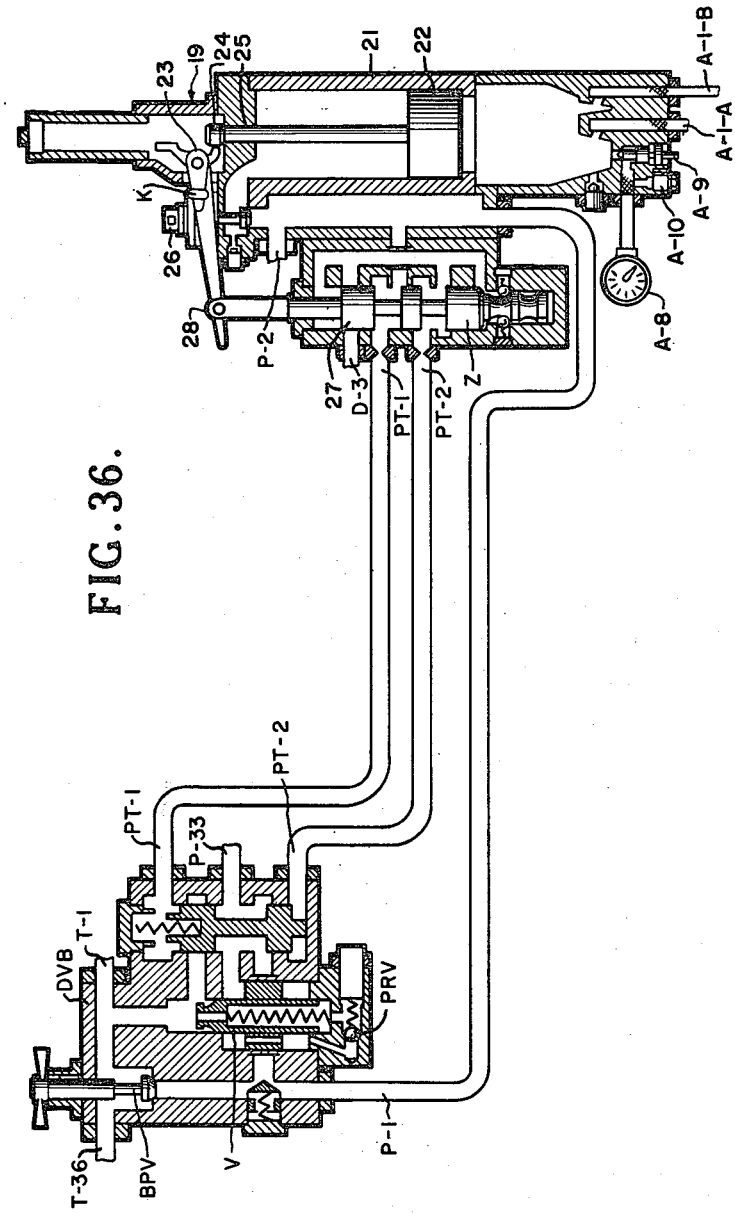
Fig. 36 is an operational diagram similar to Fig. 35 but differing therefrom in that the showing is of the valve and system conditions which result when the accumulator is cut off and the operation of the system is from the pump only.

The unloading valve BB is a spring-loaded spool type valve, which is pressure operated to shift in response to the movement of the accumulator pilot valve Z, Figs. 35, 36 and 53. In one position it acts to port pump delivery to the accumulator and in its opposite position acts to dump all pump displacement back to the tanks.

The check valve CV of the pump block is a conventional pressure operated spring loaded check valve. It is located in the line P–1 between the unloading valve BB and the accumulator. When lifted it functions to pass pump displacement during accumulator charging. However, it is seated by accumulator pressure when the unloading valve is in pump idling position and when the relief valve opens. It is seated by the spring thereof when the motor and pump are not operating. The by-pass valve B–PV is a manually operated, screw and yoke, disc-seating type similar to a globe type valve. It is a normally closed valve located at a port between the high-pressure and tank leads of the block, lines P–1 and T–1. Its purpose is to permit by-pass of fluid for manual operation of the breech mechanism in the event of power failure. When open it provides free flow of hydraulic fluid upon manual movement of the various hydraulic assemblies, from one side of the breech operating cylinder, extracting cylinder or other unit to its opposing side. When open it also provides for discharge of high-pressure fluid in the accumulator. The exception to the latter condition occurs when the shut-off valve T is closed.

Figure 9:
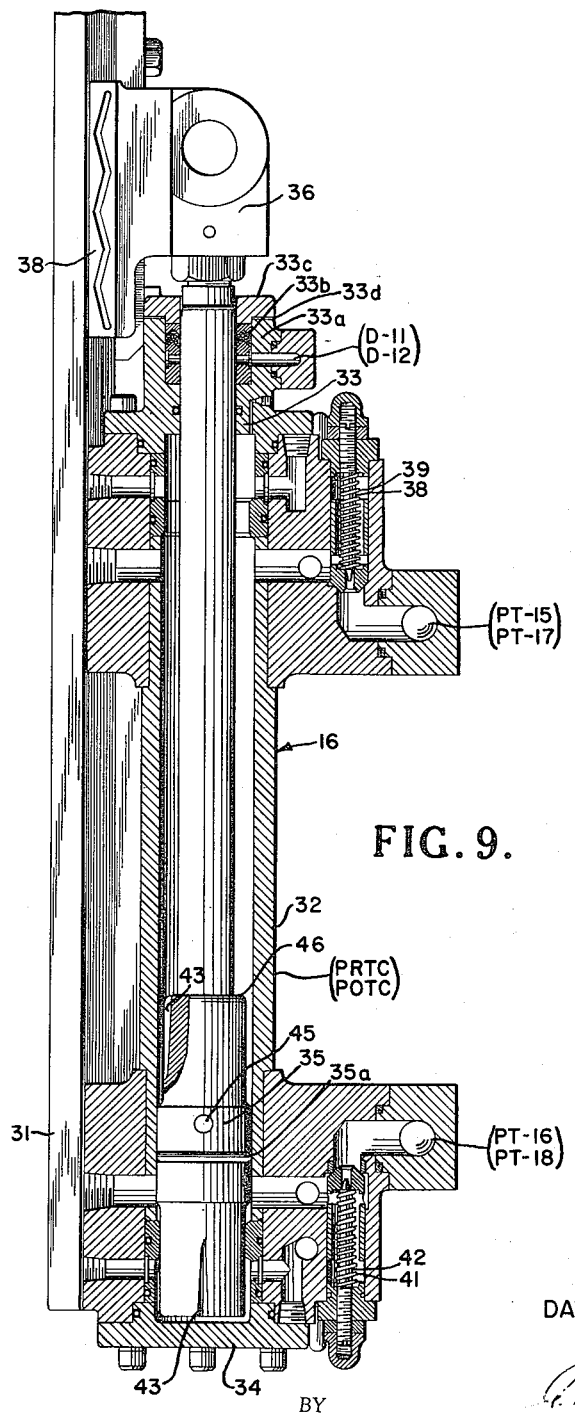
Fig. 9 is a vertical sectional view of the transfer tray operating cylinders.

The hydraulic units of the transfer tray operating equipment section of the system are located on the slide as shown in Fig. 1. The position of the units for both the projectile and powder case transfer trays are shown as to location in Fig. 6. All of these units have pipe system connections with the accumulator, the tank and the drain systems, and with each other as identified by the piping general arrangement of Fig. 2. The two tray operating cylinders PRTC and POTC respectively located at 16 and 2 are alike with the following exceptions. Each is an assembly of a hydraulic cylinder unit fixed to the gun slide. Referring to Fig. 9, the cylinder units are of the double-acting piston type wherein the principal parts are a mounting plate 31, a cylinder 32, upper and lower cylinder heads 33 and 34 respectively, a piston 35 and a crosshead 36. The installed unit is coupled to its tray by means of a link and pin assembly 37, which assembly provides a push-pull column for shifting the tray to either its ramming or its firing positions. The arrangement of this unit with the transfer tray elements of the mechanical handling system is shown in greater detail in the hereinbefore recited application to Girouard et al. The mounting plates differ in accordance with differences in the powder and projectile tray arrangements. Each plate includes details for attachment to both the slide and the cylinder. The upper portion provides guide ways for the piston crosshead 36 and a manually operated latch device not shown. This device is a crosshead blocking unit which can be positioned in the way of the crosshead when the tray and piston are in firing position. It serves as a safety device to prevent movement of the tray to ramming position when personnel are working in the slide of the gun.

The cylinder 32 of Fig. 9 is a tube unit having upper and lower cylinder head units 33 and 34 attached thereto. The head 33 is mounted on the top of the upper cylinder along with a packing retainer 33a which contains the piston rod packing 33b. It comprises a set of chevron type elements which are held in place by the retainer cover 33c, and are bolted in place by means of laminated shims 33d to seal and adjust the packing. The upper cylinder head is also provided with two speed controlling needle valves 38 and 39 for adjusting the stroke, speed and deceleration of the piston during firing-to-ramming action. The lower cylinder head is similarly provided with two speed control needle valves 41 and 42 for adjusting the speed and deceleration of the piston during the ramming-to-firing action. The decelerating force and valve restrictions of both heads are elements which cooperate to provide a dash pot action which functions in conjunction with grooves 43 embodied in the piston. The piston of this unit is a double acting dash pot type unit having a single piston ring 35a thereon. It is of one piece construction and is attached to the rod 44 by a screw thread and a pin connection at 45. The pin passes through the piston and rod and is countersunk at both ends.

The piston includes a pair of plunger elements 46, axially arranged on opposite sides of the cylinder wall engaging portion 35 thereof. These plungers incorporate a set of V-shaped stroke-buffing or throttling grooves 43, which gradually decelerate the piston as it approaches the respective cylinder heads at the upper and lower end of the piston stroke.

Figure 10:
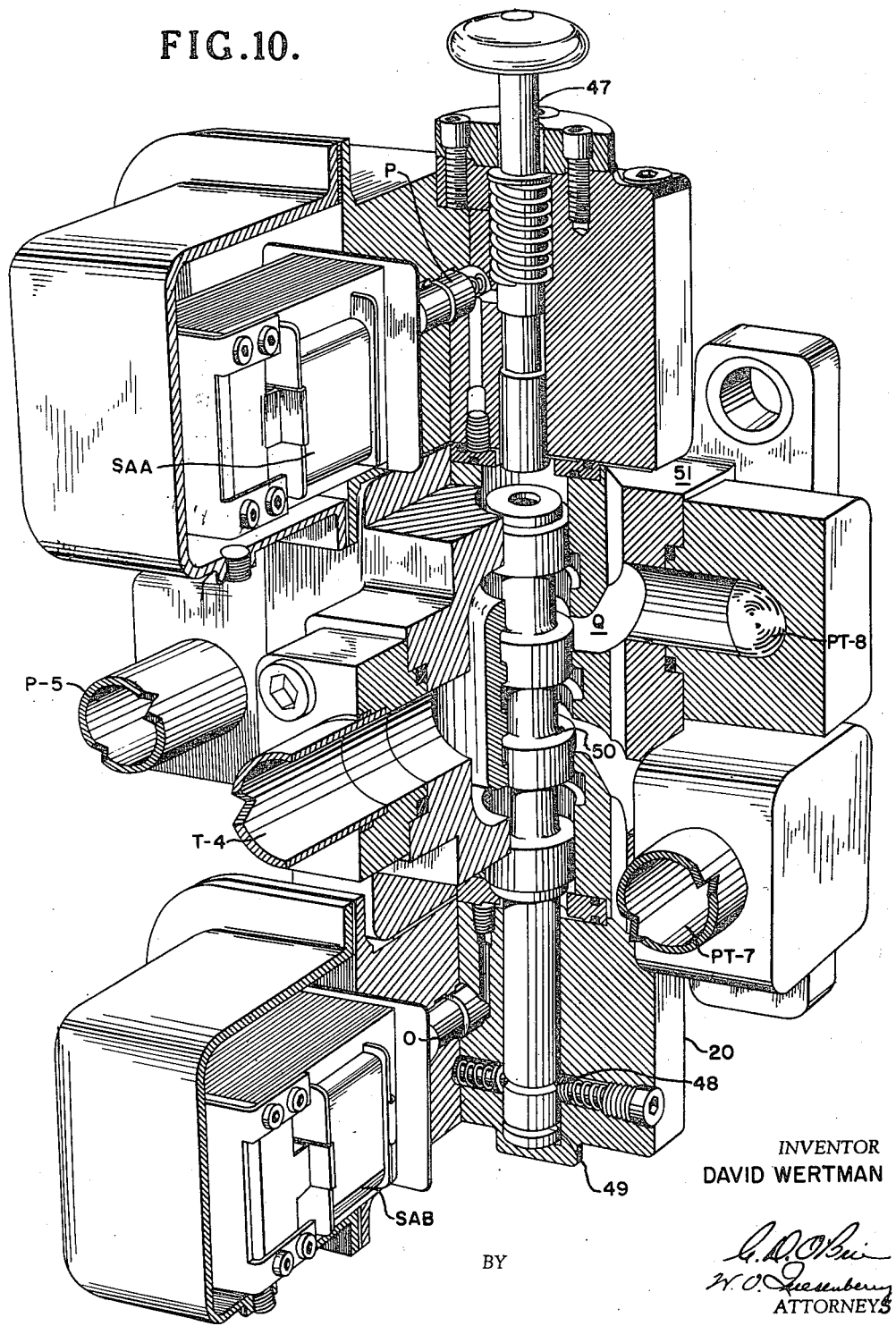
Fig. 10 is a pictorial view having parts broken away to show the internal details of the transfer tray control valve.
Figure 11:
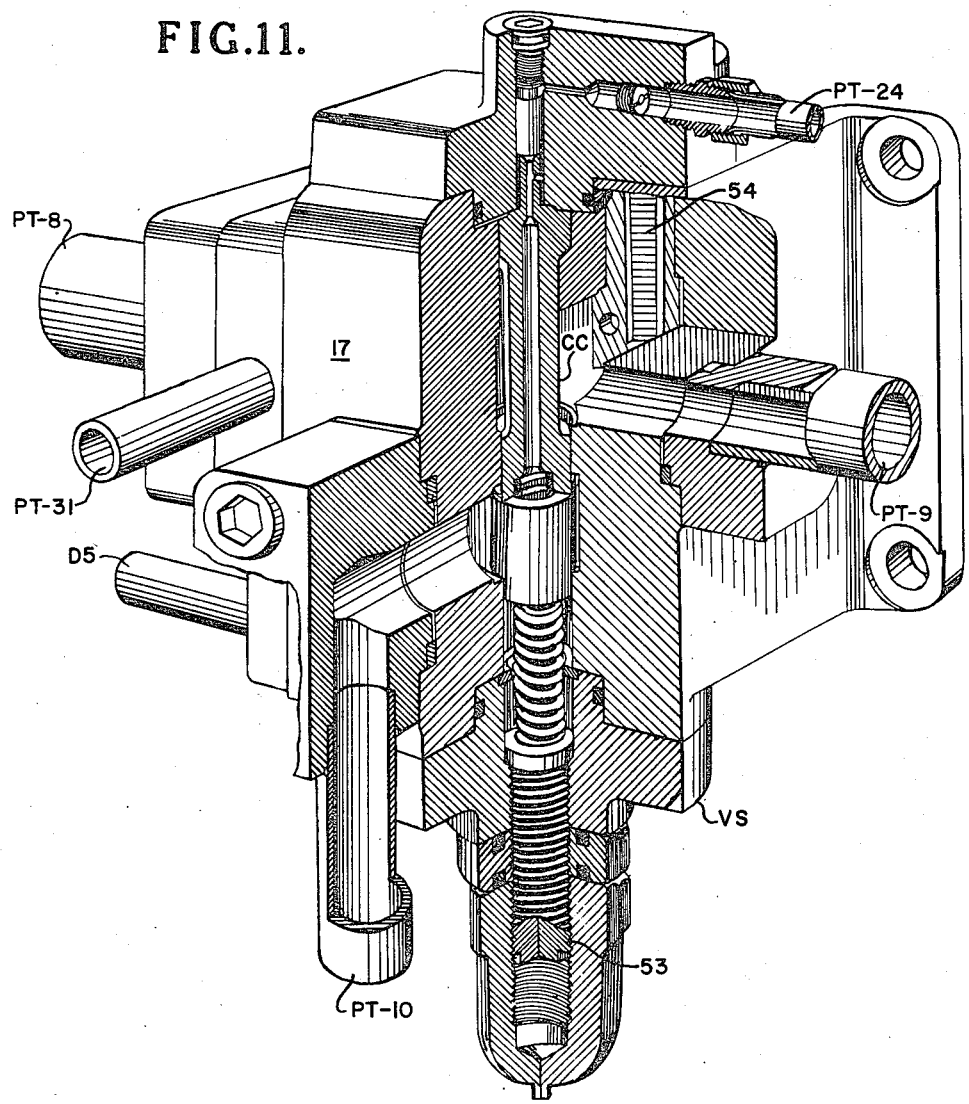
Fig. 11 is a pictorial view in section of the sequence valve.

The transfer tray control valve V–TC of Fig. 10, at 20 of Fig. 3 is mounted on the rear of the gun slide and is hydraulically connected to the top and bottom cylinder heads 33 and 34 of the operating cylinders 32 for each of the transfer trays and is connected through the sequence valve 17 of Fig. 11, to one of these transfer trays. The block assembly of Fig. 10 houses three valves and provides mounting for two solenoids SAA and SAB. The valves are designated by the symbols Q, O, and P, respectively for the directional valve, and the two pilot valves. Directional valve Q is a two position spool type shuttle valve which is normally shifted by pressure acting through the controlling action of the two pilots, and further by means of high pressure flow directed to the upper and lower cylinder heads. This valve is alternately shifted between two operative positions, in one direction shifting action is by a manually operated plunger 47, which controls fluid flow for movement of the transfer trays from ramming position to a position external of the slide, or to gun firing position. Spring detents at 48 hold the directional valve spool 50 in position at 48 and 49. The spring-retracted spool-type pilot valves O and P are actuated by the solenoid assemblies. The valve O is actuated by the solenoid SAB to port pressure into the lower end chamber of the directional valve. This control action provides stroking action for the cylinders to stroke toward the ramming position of the trays. The valve P is actuated by the solenoid SAA similarly as solenoid SAB to control cylinder action in stroking in the opposite direction, i. e., in a direction towards firing position of the trays. Fluid under pressure as ported by both valves thereafter passes through restrictions in the fluid passages between the valve port and the end chambers of the directional valve to limit the speed of the shuttle action, and to provide proper functioning of the detents.

The sequence valve V–S at 17, Figs. 3 and 11, of the hydraulic system is a unit mounted on the right side of the gun slide at a position to the rear of the projectile-transfer tray operating cylinder. This unit of Fig. 11 is hydraulically connected to the transfer tray control valve V–TC, the projectile buffer PB, the pressure and return lines thereof and to the drain system. It consists of a valve block body 17, a spring loaded spool like valve CC, a spring adjustment 53, and a check valve at 54 and schematically arranged as shown in Fig. 5a. The unit functions following delivery of a projectile through the transfer tray, to insure projectile buffer action and further to thrust the projectile forward, and to position it in the projectile tray prior to transfer action by the piston movement of the hydraulic cylinder. The valve CC, Fig. 11, accomplishes this action by delaying porting of pressure to the two cylinders until the pressure build-up has reached a sufficient predetermined value, and return stroke movement of the buffer function to open the port to the end chamber of the top of the valve CC. The line PT–10 which runs to the cylinders is blocked until this action moves the valve to a downward position.

The check valve at 54, Figs. 38 to 40 of this sequence valve block 19 is provided for the purpose of receiving fluid displacement out of the bottom of the operating cylinders and returning it to the tanks when the cylinders are stroked from ramming position to firing position.

Figure 12:
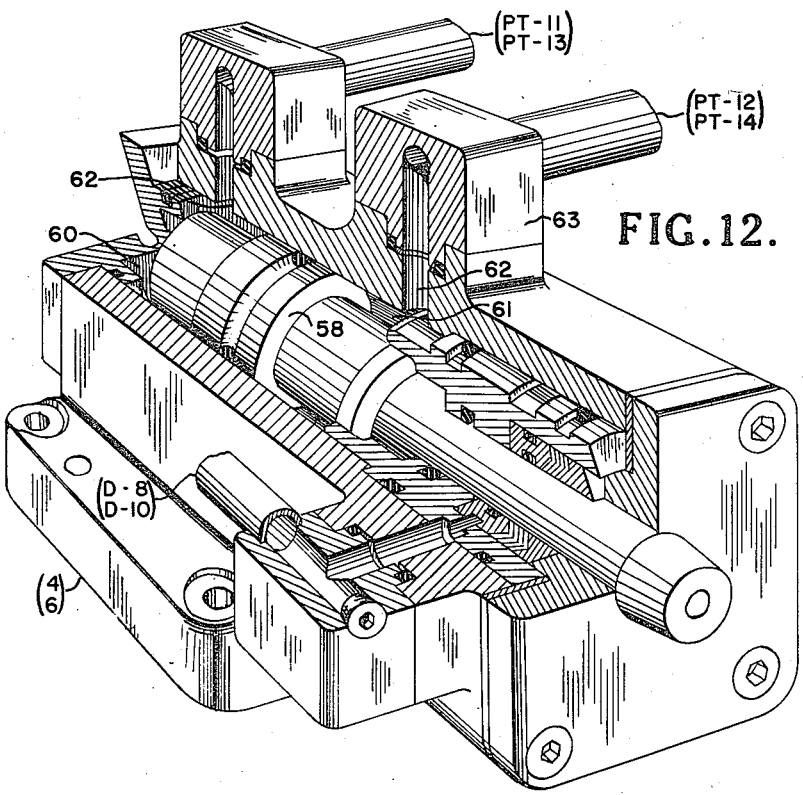
Fig. 12 is a pictorial view partially in quarter sections showing the projectile- and powder-cradle pawl tripping cylinder assemblies.
Figure 13:
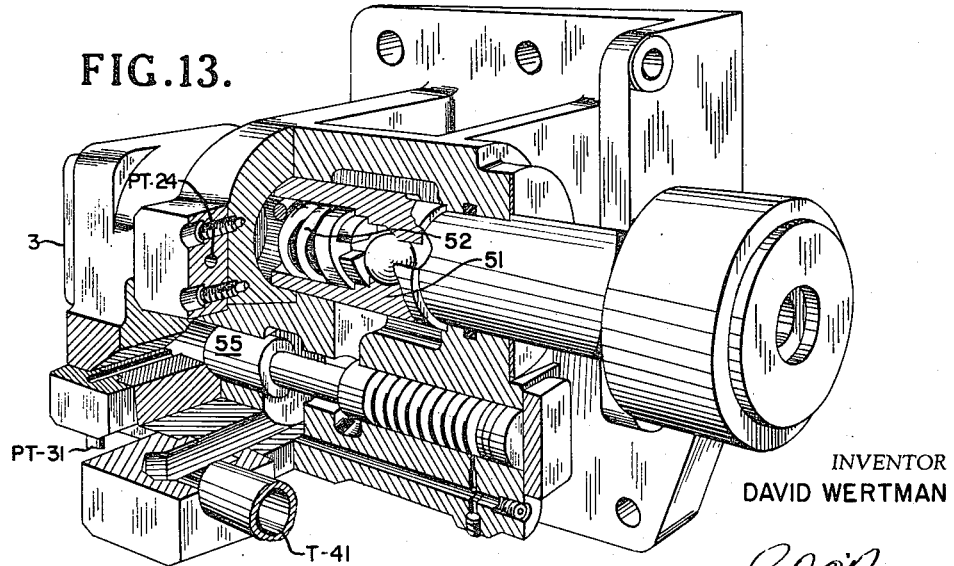
Fig. 13 is a fragmentary pictorial view of the projectile buffer.

The projectile buffer PB is mounted at 3 as shown in Fig. 3, with the internal details thereof shown in Figs. 5a and 12. The specific details of this device form no part of the instant invention. They are set forth in greater detail in the copending application to Frank Warlick, Serial No. 187,340, filed Sept. 28, 1950. The positioning function provided by this device is in addition to the buffing function of receiving the impact of a projectile rammed into the projectile transfer tray. The positioning function is that of returning the received projectile to a position in the transfer tray wherein it will not be in interference with other structural members during the subsequent transfer of the projectile to ramming position. The buffing action is such as to retard and decelerate to a stop the movement of the projectile as it is delivered from the hoist cradle to the transfer tray by the spring ram action of the cradle. It is a specially designed unit consisting of the cylinder body at 32 a spring 52 therein and a pressure operated piston 51 which is controlled in its action by a spring loaded control valve 55. It is in hydraulic fluid communication with the sequence valve block V–S in such an arrangement that it is maintained full of hydraulic fluid at tank pressure when the trays are in firing position. In the transfer tray ram position it receives a higher pressure. This pressure flow is throttled by a restriction 56 therein and controlled by the buffer control valve 55 to cause combined power and spring-return stroking of the piston 51. The control valve 55 of the buffer is a spring loaded spool type shuttle which is fluid pressure-operated at the start of and during the transfer-tray ramming position movement to close a tank line port T–41 in the buffer.

The projectile cradle and powder cradle latching cylinders designated respectively POLC and PRLC are flange mounted to the sides of the slide just ahead of their respective transfer trays as shown at 5 and 11 of Fig. 3. Each cradle latching cylinder is hydraulically connected to the accumulator pressure and return pipe system of Figs. 2 and 6 as well as to the drain sytem of the slide power equipment.

Figure 27:
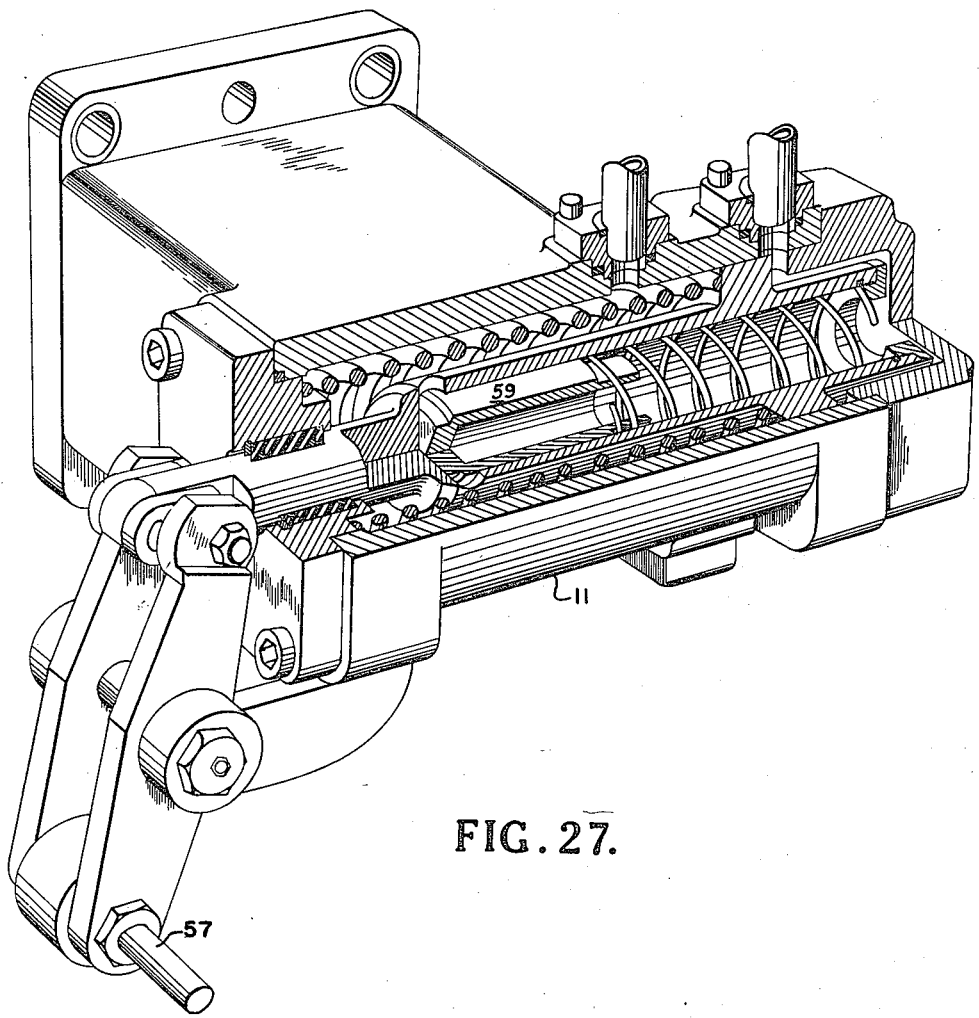
Fig. 27 is a cutaway pictorial view of the cradle-to-slide latch cylinder.
Figure 28:
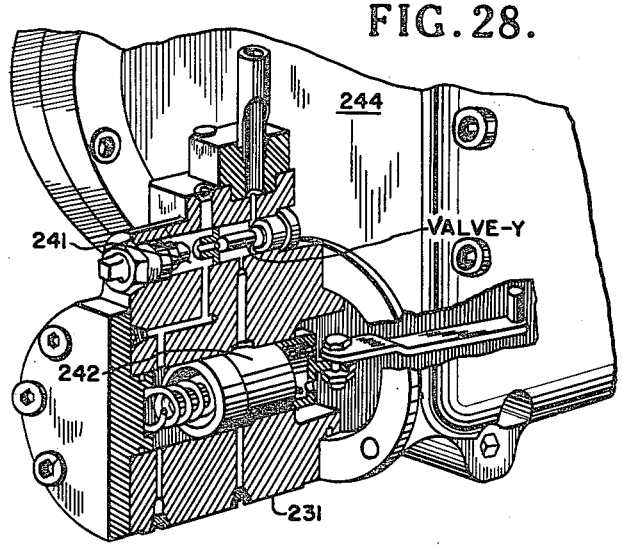
Fig. 28 is a fragmentary view with parts thereof broken away and showing details of the compensator control for the empty case extractor motor.
Figure 29:
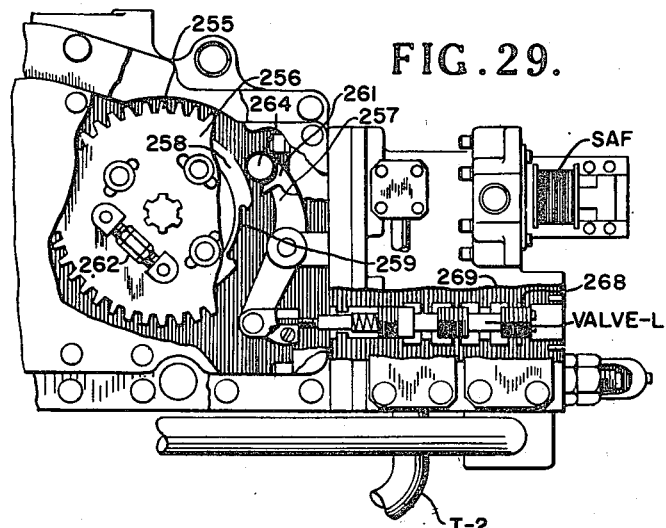
Fig. 29 is a fragmentary sectional view of a part of the empty case drive control showing the interior details of the solenoid and the valve arrangement thereof.
Figure 30:
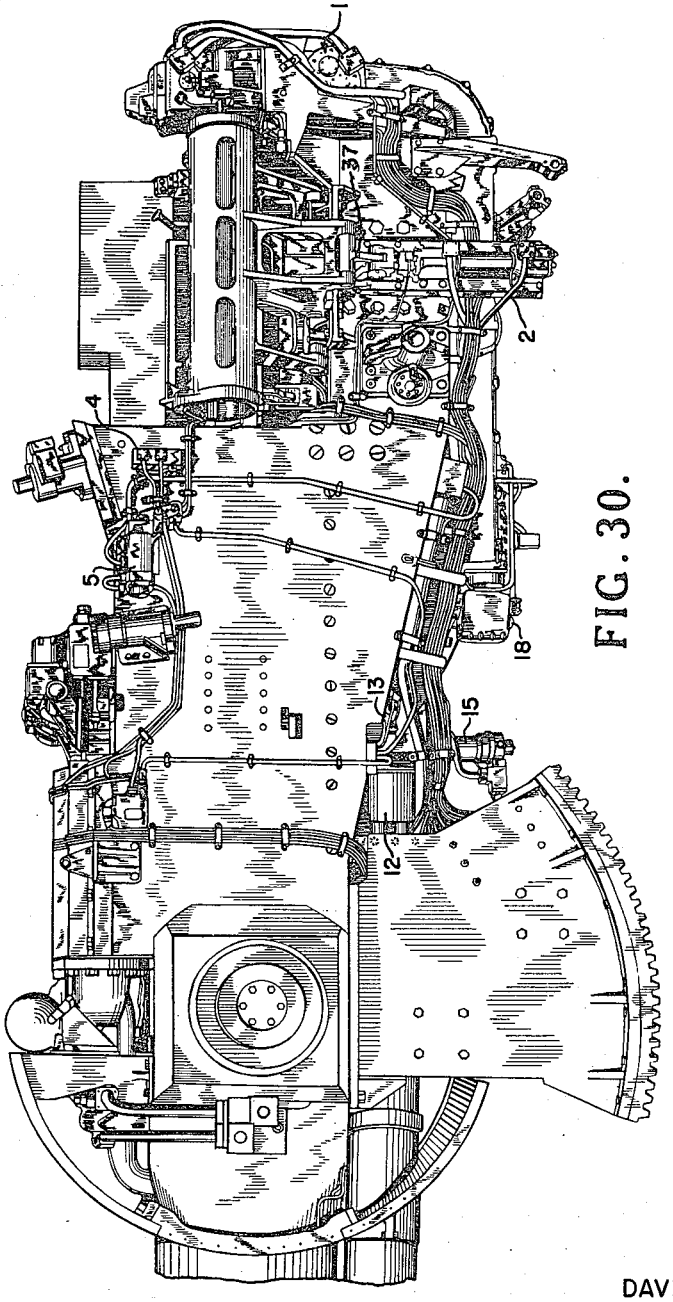
Fig. 30 is a pictorial fragmentary view of the left hand side of a gun slide showing the location of the hydraulic system components.

These two cylinder units 5 and 11 are right and left hand units. The unit 5 of Fig. 3 and 11 of Fig. 27 are similar in design. In addition to their function in the slide hydraulic system these units serve as parts of the gun hoist assembly in that they act with the respective mating elements of the cradles to latch them at their discharge positions on the gun slide. The hydraulic cylinder piston units 59 are spring-loaded for actuation. A roller-shaft arrangement 57 serves as a latch lever for making connection with the hook-shaped bracket of the cradle.

The latch cylinder operates mechanically to latch the cradle to the slide when the cradle is raised from the hoist. After the ammunition has been spring ejected from the cradle, the cradle is unlatched from the slide by hydraulic action of the plunger of 59. This action is controlled by the valve Z in the transfer-tray control valve unit, and valve CC in the sequence valve unit.

Additional units of the equipment associated with the cradle include the pair of cradle pawl operating cylinders PTC and PCC, shown at 4 and 6 of Fig. 3 which operate after the cradles have been latched by mechanical action of these latch assemblies. The projectile and powder cradle ram units are maintained in spring loaded condition and are prevented from acting in this ejection action by a large pivotally mounted pawl which is normally spring-loaded in a ram spring engaging position. The pawl element of each of the cradles is located at the outer end of the tubular portion thereof in a manner to be automatically tripped by action of the piston 58 of the pawl tripping cylinder 4, 6 of Fig. 12 which is connected in the slide hydraulic system. This cylinder is hydraulically controlled by fluid flow from the tripping cylinder control valve 10 of Figs. 3 and 12. The arrangements for the cylinders which operate these pawls are similar one to another but of opposite hand relationship. Their location is as shown diagrammatically on Fig. 2.

These hydraulic plunger units comprise a cylinder block assembly 4, 6 with a double acting pressure-operated piston 58 therein. Opposing piston chambers 60 have ports 62 and pipeline connections 63 to the pawl tripping cylinder control valve.

Figure 14:
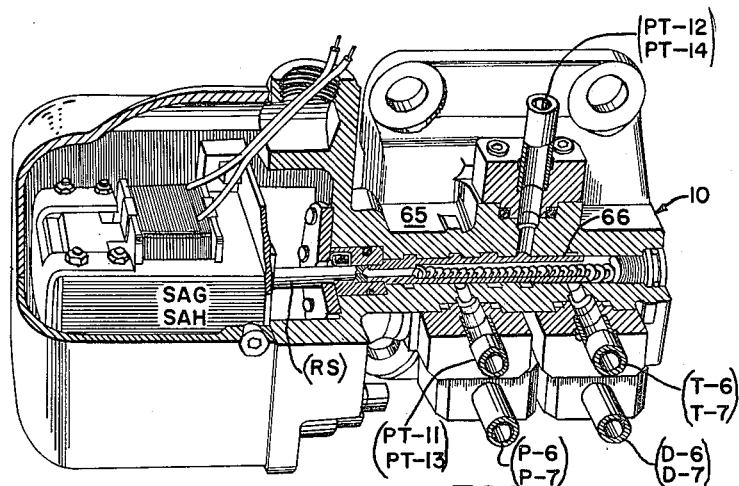
Fig. 14 is a sectional pictorial view of the cradle pawl tripping cylinder control valve.

The two pawl tripping cylinder control valve units 10, Fig. 3 and 5 in the cradle pawl cylinder hydraulic circuit equipment are identical and each consists of a valve block 65, a two-piston, spring-loaded, spool type valve 66, and an attached solenoid SAG or SAH arranged as shown in Fig. 14.

The unit has pipeline connections to the accumulator and tank pressure systems as well as to the two chambers of the tripping cylinder which they control. The valves are actuated to cause pawl tripping when the respective solenoids are energized. Each unit is controlled by an electric switch circuit arrangement respectively for the powder and projectile pawl tripping controls.

The powder system solenoid SAH is energized when a control switch on the cradle is closed at completion of cradle latch action. The projectile solenoid SAG is not energized until a cradle latch switch and a breech open switch are both closed. An additional switch actuator delays pawl tripping in the case when fuze set ammunition is being used. This delay is maintained until fuze setting is completed.

Figure 17:
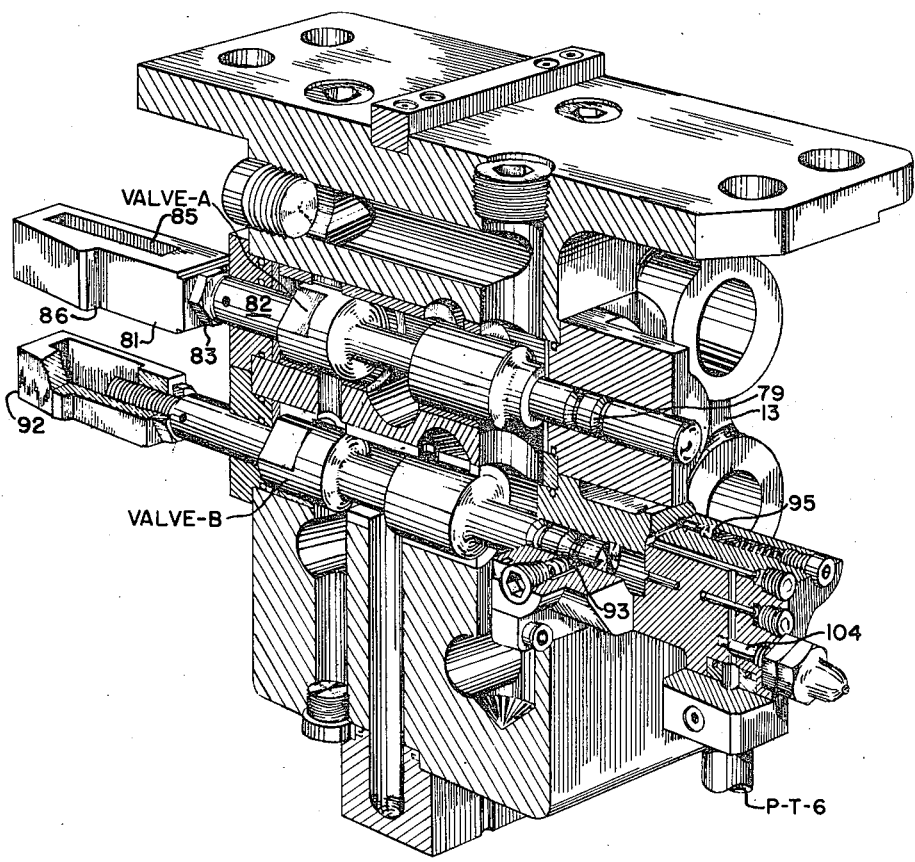
Fig. 17 is a sectional pictorial view of the breech operating valve showing a section through the breech opening and breech closing valve members.
Figure 18:
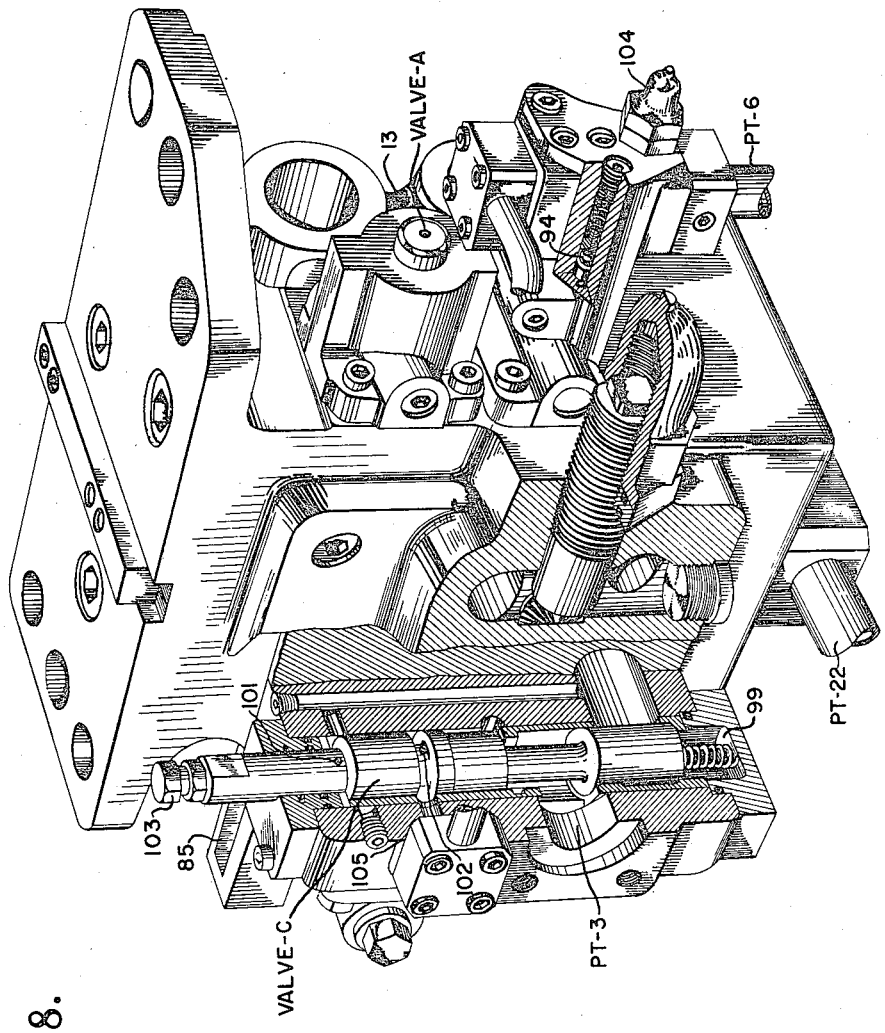
Fig. 18 is a picotorial fragmentary view of the breech operating valve block showing in section details of the extractor control valve.

The six hydraulic assemblies which comprise the breech mechanism operating equipment include the two extractor cylinders EC; a valve block BVB, the cylinder BOC for hydraulic action, and the sliding pipe joint unit SLJ mounted on the gun housing and slide and the breech closing operating cylinder BCC. These elements have pipe system connections with the accumulator, the tank system and each other as identified in the piping general arrangement of the drawings. These connections include drilled lead chambers within the breech valve block as illustrated in Figs. 17 and 18.

Figure 16:
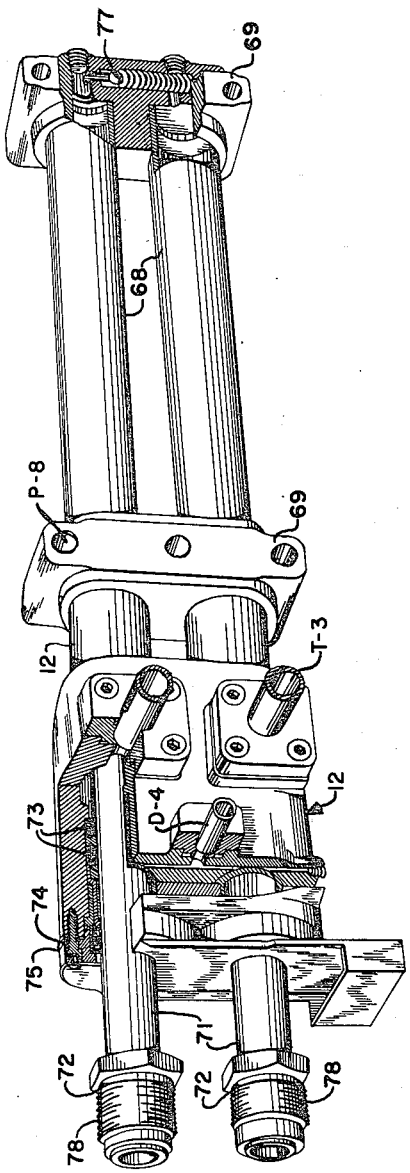
Fig. 16 is a pictorial view partially in section showing interior details of the sliding joint.

The sliding joint of Fig. 16 is a sub-assembly which provides the hydraulic pressure and return-line pipe connections between the equipment on the slide and the recoiling equipment on the housing. It consists of two telescoping tube assemblies each attached to port connections in the breech operating valve block and supporting brackets therefor which are bolted to the slide in a manner according to the showing of Fig. 31. The design provides a telescoping pipe connecting action of adequate travel, and of sufficient sealing effect to maintain a pressure tight connection throughout maximum gun recoil-counterrecoil movement. Each installation is accurately fitted to give alignment parallel with the recoil line of travel of the housing assembly in the slide.

The sliding joint comprises a fixed unit and a movable unit. The fixed unit consists of a cylinder head 67, a pair of cylinders 68 and two mounting brackets 69 which are assembled into a unitary assemblage. A pair of sliding tube elements 71 are telescopically received within the cylinders of the fixed units and are maintained in fluid-tight relationship therewith by a pair of gland nut compressed neoprene rings at 72 which seal the ends of the tubes to the housing assembly. The one piece housing unit is provided with two groups of chevron type packing rings 73 assembled in an opposed arrangement in the cylinder head to provide fluid seal for the tubes. These are separately retained by cover glands 74 each of which is adjustably seated with a laminated shim-gasket 75. This provides an arrangement which permits take-up adjustment of the chevron packings. A ball-and-spring type check by-pass valve 77 is installed in the closed end of the housing of Fig. 16 and prevents overloads in the pressure side of the assemblage during counterrecoil. This valve is arranged to open and allow fluid to flow from the pressure tube into the return tube as the sliding tubes return into the housing.

Special pipe union couplings 78 provide the attachment of the two sliding tubes to the breech operating valve as hereinabove stated.

The breech operating valve block BVB is assembled as shown at 13 of Fig. 3 on the gun housing, below, and to one side of the breech block. It is a housing for the three principal valves A, B, and C of Figs. 17 and 18. Additionally it houses the supplementary hydraulic elements associated therewith which control opening and closing of the breech, and extracting action of the cartridge-case extractors E. C. The unit is in fluid communication hydraulically with the slide equipment as hereinabove indicated and with the breech operating cylinder and the two extractor cylinders. It is mechanically connected with the breech bolt and breech hand mechanisms as shown in greater detail in the drawings of the copending application to Girouard et al.

Figure 31:
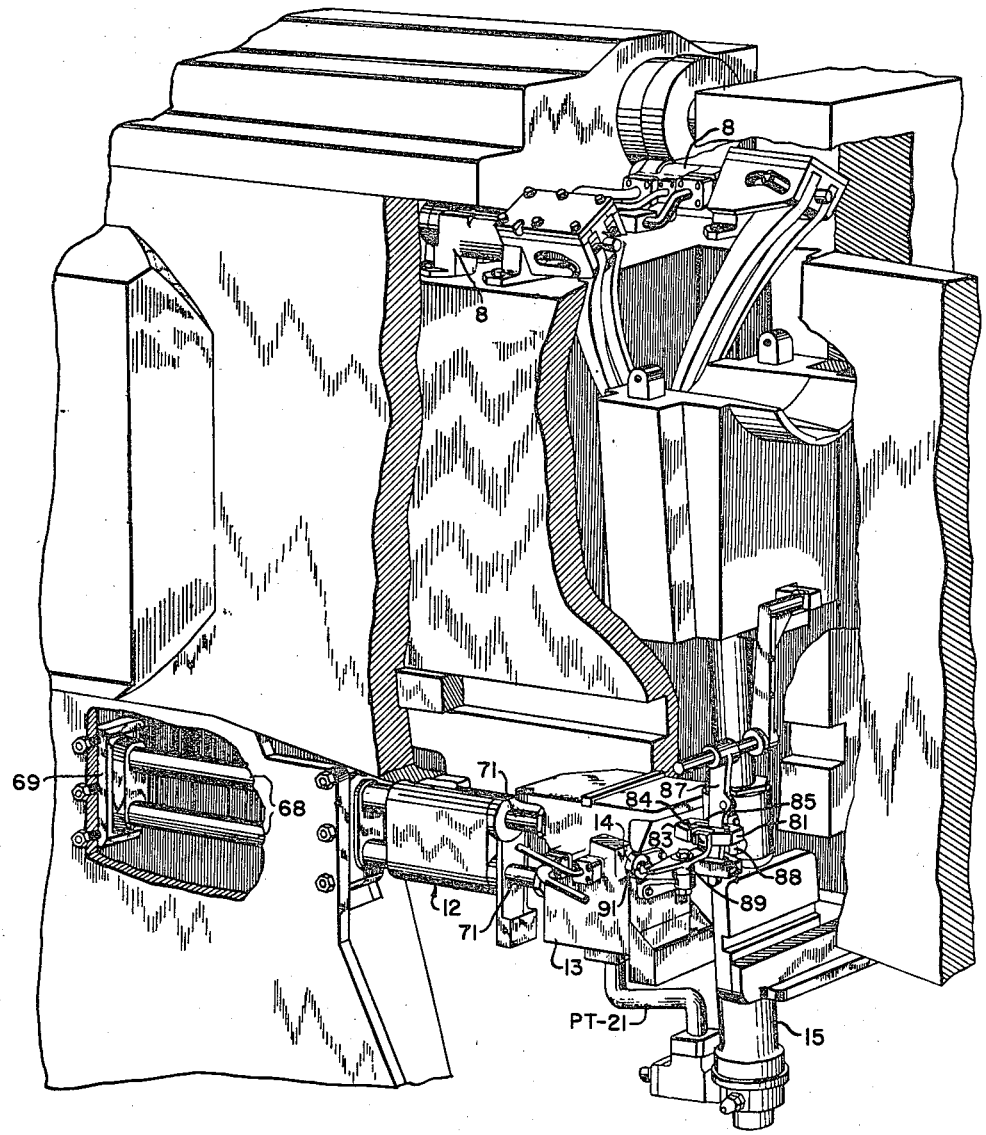
Fig. 31 is a fragmentary view with certain parts broken away and shows the assembled relationship of the breech system components.
Figure 32:
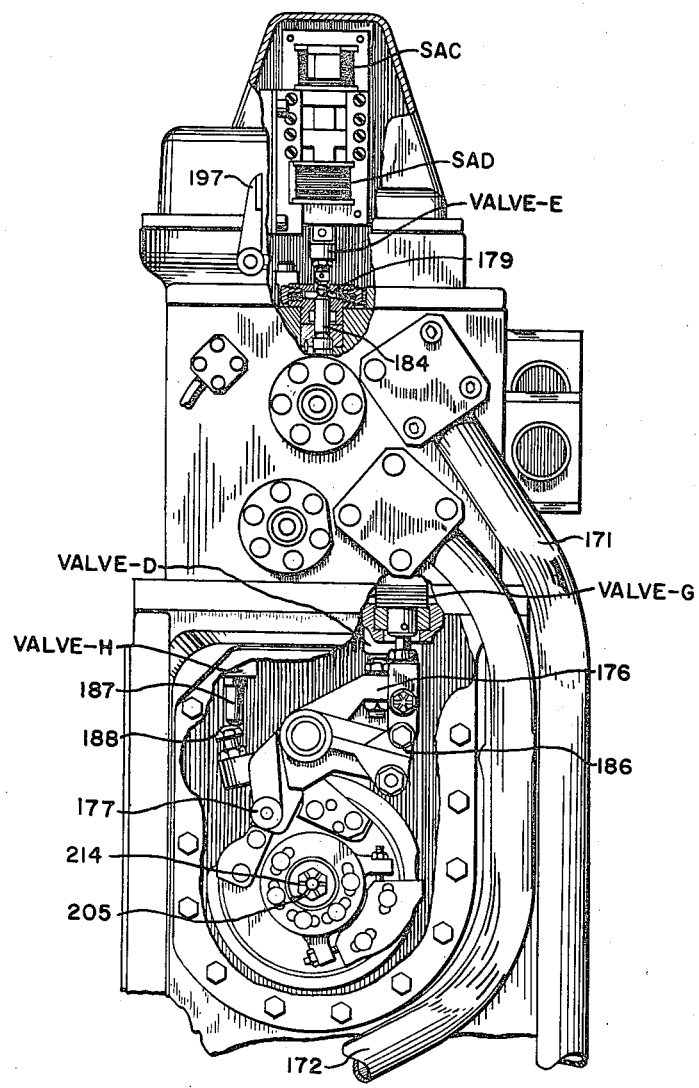
Fig. 32 is a fragmentary view of the rammer controls with parts thereof broken away to show the internal details thereof.

The valve block components comprise a system of valves and lever mechanisms identified in Figs. 17 and 31 of drawings. Their controlling actions are related so as to control details and operating features of the breech operating cylinder BOC, the extractor cylinders EC and the rammer drive unit RDU.

Figure 19:
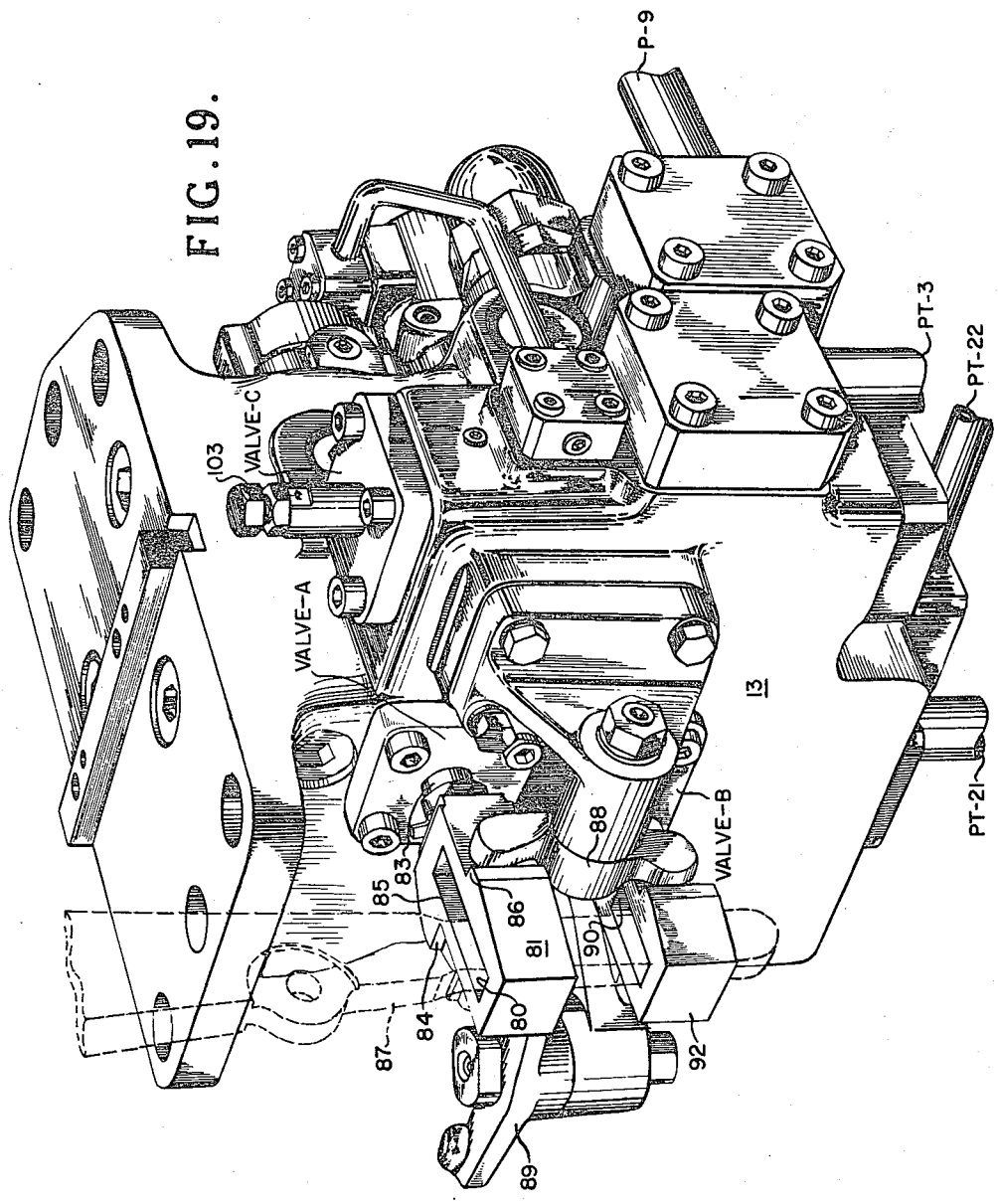
Fig. 19 is a pictorial sectional view of the breech operating valve block showing details of the several actuators for control thereof.

Breech closing action is controlled by the valve A of Fig. 17. In addition to the breech closing function, this valve when at porting position at breech opening, functions to supplement the control action of the valve B. The valve A is a two position mechanically actuated spool type unit which is held by spring-detent 79 in either of the two positions. The arrangement of this valve A is such that the stem 82 passes through the block and has a threaded extension for the valve guide 81 which is adjustably threaded at 83 onto the exposed rear end thereof. The mechanical linkage assembly of Fig. 19 which is shown diagrammatically in Fig. 5, includes a loop shaped piece 81 with surfaces at 80, 84 and 85 of Fig. 19 and 86 of Fig. 17 for engagement with three levers 87, 88 and 89.

The lever 87 which engages at 85 is actuated by the breech bolt, while the other two levers comprise the rocker-arm lever 88, which actuates the valve at the surface 86, and the closing valve operating lever 89, which engae lugs in opposite sides of the loop as shown at 84 of Fig. 31.

The breech bolt lever is provided with operating clearance within the loop of the valve guide 81 for the lever 87 which does not directly actuate the valve. This lever does however function indirectly to move valve A through action of the rocker arm lever 88. The arrangement of this lever is such as to operate to move the valve A when valve B is mechanically actuated. It does not however move valve A when valve B is hydraulically operated.

The closing valve operating lever 89 engages the surface 84 and actuates valve A in an inward direction, when it is pushed by the plunger 91 of the valve operating cylinder at 14 of Fig. 31. The valve A, when tripped inward or towards the gun muzzle, is in breech closing position. This position ports pressure through pipe PT–21 to the bottom chamber of the breech operating cylinder. In the other position, the valve vents the upper chamber of the cylinder.

Breech opening action is controlled by valve B, the action of which is in addition to two supplementary control actions thereof. The additional action at breech closing supplements the control action of valve A, while the other function is that of controlling the upward movement of the lowered breech-block to the ramming position thereof. Valve B is a two-position, spool-type valve unit of similar type to valve A with substantially similar valve guide and detent arrangements at 92 and 93 respectively. The forward end however, does not pass through the valve block. Moreover it differs additionally as to the actuating arrangement whereby it is actuated by lever 89 for mechanical positioning which is in addition to the hydraulic control for operation.

Mechanical movement of the valve B occurs in correlation with the breech bolt unlocking action. The action of operating lever 87 with breech bolt unlocking is transmitted through the loops of the valve guide 81 of valve A without actuation thereof as it passes the movement to valve B. The forward end of the lever engages the valve guide 92 at surface 90 to thrust the valve B inward to its inner detent position.

Hydraulic movement of valve B is accomplished by the end chamber arrangement shown in Fig. 17 by control features of the extractor cylinders 8 of Fig. 31 and the extractor control valve C, Fig. 18. The end chamber arrangements include two ball-check valves 94 and 95, an adjustable restriction 104, and the pipe connection for line PT–6 which runs to the rear or piston rod chamber of both extractor cylinders. The two check valves 94 and 95 are located to have opposed positions in the lead passages which connect this pipe with valve C and the end of valve B. These details provided control actions the purpose of which is that of positioning valve B after the breech is fully opened in a manner whereby the breechblock is permitted to move upward from the lowermost or fully open position to the ammunition ramming position with the ammunition guide surface in alignment with the gun bore.

As valve B moves under action of a hydraulic fluid flow, valve A is in the outer detent position thereof which permits venting of the bottom chamber of the breech operating cylinder. As a consequence thereof valve B is hydraulically positioned without mechanical action of the rocker arm lever 87. Since the rocker arm lever 87 is not actuated the valve A remains in the outer detent position.

Figure 20:
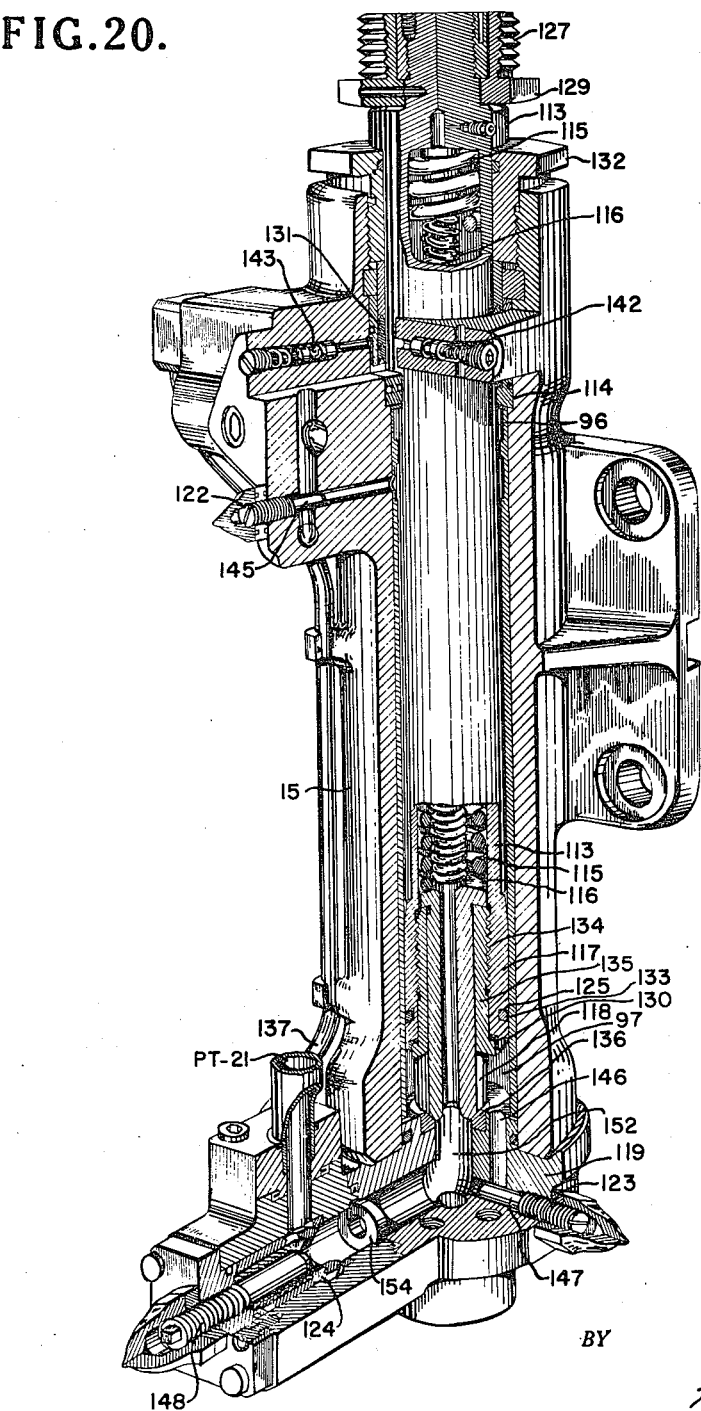
Fig. 20 is a pictorial sectional view of the breech operating cylinder.

Valve B at the inward or forward detent position ports pressure to the upper end chamber 96, Fig. 20, of the breech operating cylinder through line PT–22 and external piping 137. When positioned for engagement by the outward detent it vents the chamber of the tanks. It is thus apparent that at the hydraulic movement of valve B both end chambers 96 and 97 of the breech operating cylinder 15 are vented to the tank.

The spring-loaded mechanically actuated spool-type valve C controls breech-mechanism extracting action. This valve functions in conjunction with valve B and the extractor cylinders 8 to control the slight upward movement of the breechblock when the block moves to ramming position. It is vertically positioned as shown in Fig. 18 with the upper end thereof located in the path of travel of the bottom of the breechblock. The valve has an internal passage 98 thereof, Fig. 46, connecting its spring chamber 99 with two vent holes 101 and 102 located as indicated in Fig. 18. An adjustment screw 103 is provided in the upper end of the valve to vary the stroke action of the valve. The critical position of this element is the completely "up" position when the breechblock is at ramming position.

Valve C when depressed, vents the spring chambers of the extractor cylinder to the tank. When in the upward position thereof it ports fluid under pressure to both end chambers of both extractor cylinders 8.

The internal passage 98 of valve C functions at all times to vent the spring chamber 99 through fluid communication with the upper vent hole. The lower of the two vent holes is at an intermediate port 105 whereby the end chamber of valve B is vented when valve C is at the "up" position. Venting action of valve B occurs through ball-check 94 of the operating cylinder. This vent is closed when the breechblock is down and valve B is depressed. This is an arrangement which permits pressure to be ported from the extractor cylinders at the end of the extracting action as well as to be throttled through the restriction of adjustments 104 and the other ball-check 95 to the end chamber of valve B. The function of valves C and B in controlling fluid flow provides hydraulic power actuation of the breech operating cylinder for movement of the breechblock to ramming position, as well as release of valve C, and the porting of fluid pressure from the forward chambers 107 of the extractor cylinders for retracting action of the extractor spades.

Figure 26:
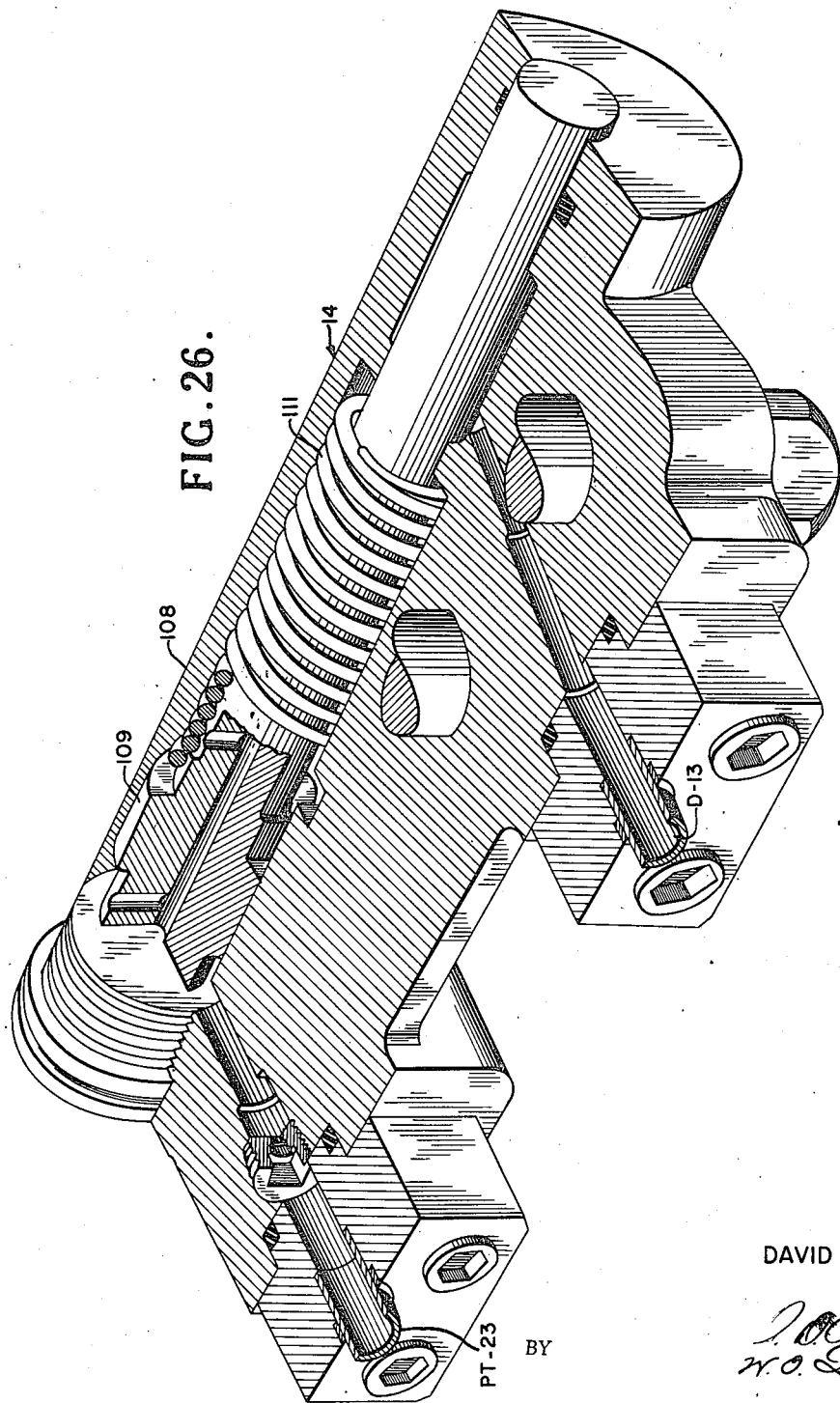
Fig. 26 is a pictorial sectional view of the breech closing valve operating cylinder.

The breech closing valve operating cylinder 14 of Fig. 26 comprises the small cylinder block unit 108, and plunger assembly 109. The unit is mounted on the slide in a manner to provide thrust actuation of the closing valve operating lever 89 for movement of valve A to the inward detent position thereof. It is pressure-operated, by fluid flow from connection PT-23 of the piping system and is provided with a spring 111 for plunger return positioning of the valve guide 81 shown diagrammatically in Fig. 5. The cylinder as mounted on the slide does not recoil with the gun housing assembly and the breech operating valve block attached thereto.

It is located as shown in Fig. 31 with the plunger thereof in a normally spaced relationship with the valve guide 81 in a manner to provide a small gap therebetween when the gun is at battery position. It is in assembled alignment with the valve operating lever 89 in a manner whereby this lever is in an inoperative association with the plunger until after the gun has completely returned to the in-battery position.

The pressure-porting pipe connection for this operating cylinder 14 is that of line PT-23 which is in fluid communication with the control valve block or pressure regulator 112 of the rammer guide unit as shown in Fig. 44. The valve porting arrangement of this connection provides an interlock control function to delay tripping of valve A until after the ammunition has been rammed by the chain rammer and the chain head has regressed sufficiently to clear the top of the breechblock.

Figure 21:
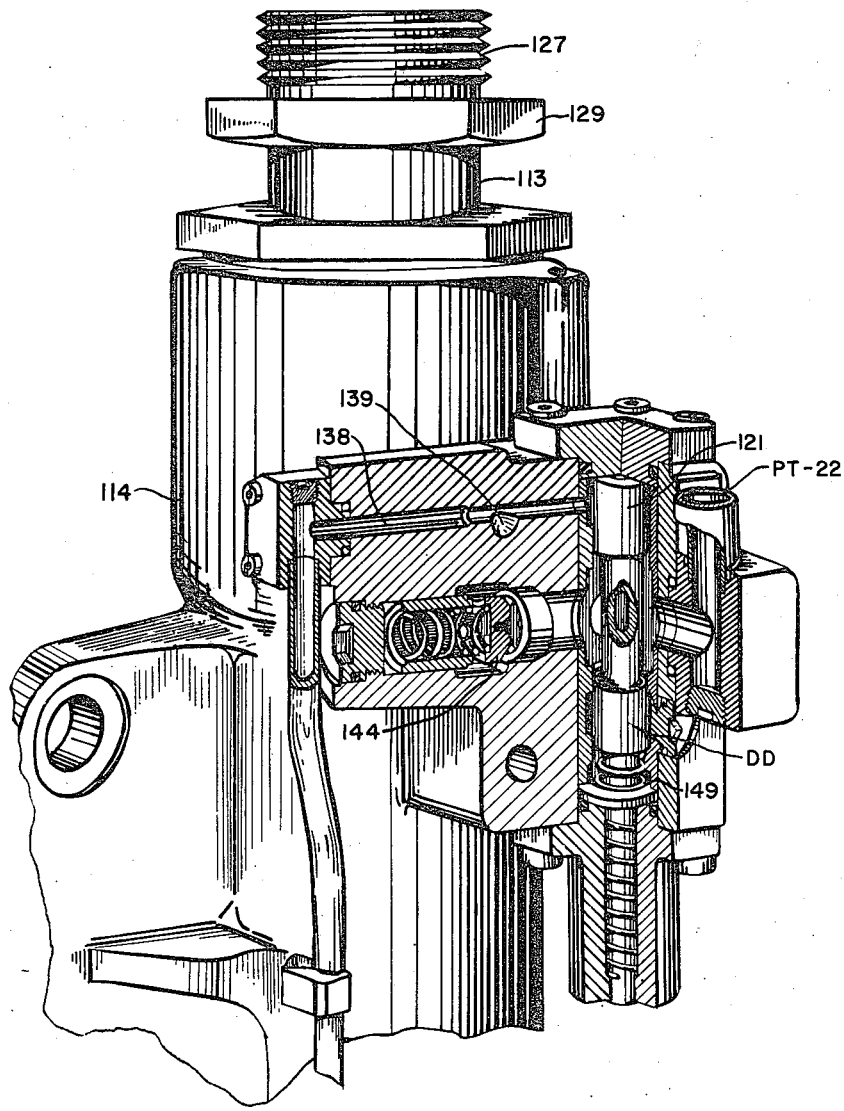
Fig. 21 is a fragmentary view with parts thereof shown in section of the upper breech operating valve block of the breech operating cylinder of Fig. 20.

The breech operating cylinder 15 of Figs. 20 and 21 is keyed and bolted in the breechway of the gun housing with the piston rod 113 thereof threadedly attached to the bottom of the breechblock. The cylinder assembly operates to open and close the breech upon application of hydraulic fluid pressure through the valve and pipe connections thereof.

The assembly comprises the cylinder 15, the cylinder heads 114 and 119, two large coil springs 115 and 116, piston 117 buffer pin 118, valve assembly DD or 121 and the adjustable restrictions 122, 123 and 124 for controlling or regulating the piston stroke. The normal opening or breechblock lowering stroke is performed in two stages such that upon closing of the breech, a small initial movement takes place to move the breech to ramming position. Thereafter a powder case wedging stroke of considerably longer travel follows to fully close the breech.

The main element of this unit is a cylindrical tube piston rod element 113 fitted internally with the linear element 125 and externally shaped with an integral upper piston head portion at 126, and mounting flange at 127. The lower cylinder head thereof while not integral therewith is flange bolted to the cylinder with appropriate packing 130 in sealing relationship therebetween.

The piston unit 117 which moves therein is integral with the rod element 113 thereof. It is of hollow form for internal reception of the spring 115. The fittings at the upper end 127 thereof include special nut arrangements 129 which provide flexibility at the attachment connection between the coupled breechblock and this piston rod 113. The rod end thereof slides through the chevron type packing 131 which is secured thereagainst at the cylinder upper end by packing nut 132. The rod is substantially cylindrical to the lower or piston end which is tapered outwardly therefrom to engage the inside cylinder bore at the piston head portion thereof. It is fitted with a single O-ring seal 133 and is internally threaded at 134 for fitted reception of the flange sleeve type nut 135. A hollow buffer pin 118 is slidably retained within the sleeve nut 135 to compress the two large springs 115 and 116, as the piston head approaches the end of the breech opening movement thereof. These springs are compressed when the lower end of the buffer pin registers with the hollow seat 136 of the lower cylinder head. Although these springs help to check breech opening movement, their primary purpose is that of storing sufficient energy under compression conditions at the end of the stroke to raise the block to the ramming position thereof.

The valves of the cylinder head permit the application of pressure to the piston at each cylinder head for the purpose of by-passing and throttling displaced fluid at the opposite side of the piston. An external pipeline 137 connects the port 138 of the lower cylinder head 119 to the top chamber 139 of the spool type spring-loaded differential valve stem of DD at 141 which is in the upper head 114. Two ball checks 142 and 143, a piston-type check 144 and an adjustable restriction element 145 of adjustment 122 are also arranged in the upper cylinder head 114. The lower cylinder head 119 is provided with a dashpot hole 146 which has an adjustable restriction element of adjustment 123 at 147. It also includes the sleeve type adjustable check valve adjustment at 148.

The valve stem 141 of valve DD functions in the arrangement of Fig. 20 to control piston movement in a manner as will be apparent from Fig. 5. It is initially positioned at the upper position thereof as a result of biasing action of the spring 149 by which it is maintained at all times except when the breech is closing. It is depressed for breech closing action by fluid pressure applied at the upper end chamber of the valve DD. When in this depressed condition it permits free flow to the tank lines of all exhaust fluid displaced by the rising piston rod 113. This displaced flow is exhausted through the port 151, Figs. 44 and 46 to 48, which while closed when the valve DD is up, has unrestricted passage to the tank line through the adjustable restriction element 145 and thence around valve DD at a reduced stem portion thereof. This passage controls the rate of spring raising movement of the piston and breechblock, by throttling fluid flow from the upper side of the piston in a manner to decelerate and ease the block to the ramming position thereof without appreciable oscillation.

The piston-type check valve 144 in the upper cylinder head 114 opens to permit unrestricted high-pressure flow for breech opening action. At all other periods, it is spring-seated to securely close the port thereof. Fluid displaced during piston upward movement is thus compelled to flow past the valve DD and adjustable restriction element 145 of 122 through the same passage routes as for the precedingly described conditions.

The dashpot hole 146 and the restriction element 147 of adjustment 123 in the lower cylinder head 119 function to throttle the fluid displaced by the descending piston, in the breech opening action, following closure by the buffer pin 118 of the main port 152 in the cylinder head 119. Fig. 20 shows these ports in the position at which dashpot action starts.

The sleeve-type check valve in the lower cylinder head acts in cooperation with the restriction 154 and the adjustment 148 associated therewith as an arrangement for controlling the breech closing speed. They act to restrict high-pressure flow to the interior and bottom of the piston.

Figure 22:
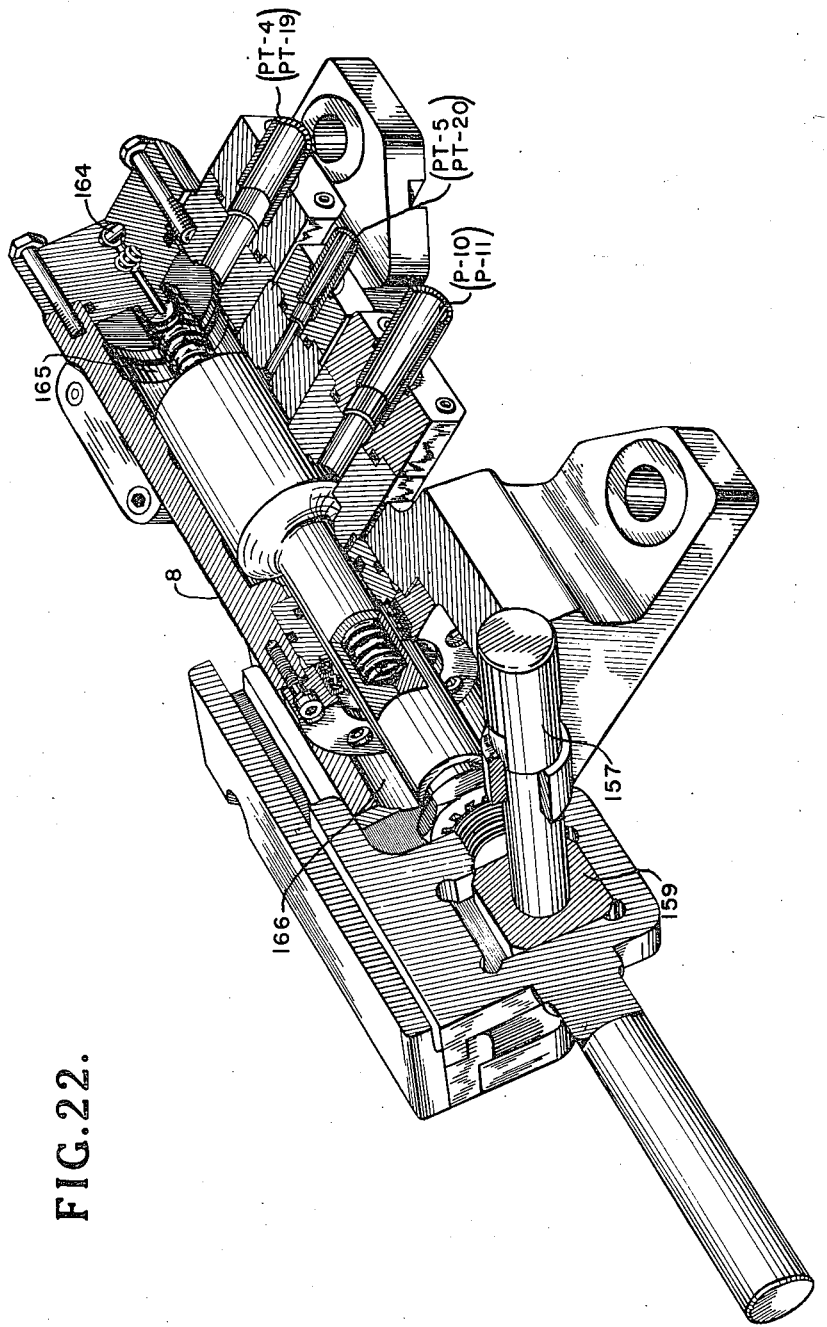
Fig. 22 is a sectional pictorial view of the extractor cylinder.

The extractor cylinders EC, Fig. 22, which are mounted on the top of the gun housing as shown in Fig. 31 are of similar design as to port connections. Each unit is provided with a pivoted extractor spade 156 mounted on the cam roller shaft 157 thereof. The extractor cylinder assemblies 8 are spring-loaded differential-plunger type hydraulic units which perform the extraction stroke function as a result of initial hydraulic pressure preloading of both sides of the piston. They operate at the desired instant of extraction by controlled opening action of the spring chamber to permit fluid in that chamber to flow to the tank lines.

The cam slide 158, the block 159, and cam roller shaft arrangement 161 at the rear end of the cylinder are constructed and arranged to provide that the stroking movement thereof, which when mechanically translated to the toe of the extractor spade 156, produces movement at this point which is in an approximate straight line from the breech to the end of travel to extract the empty case. It will thus be apparent that the pivotal movement of the spade at the roller is changed into a linear movement at the toe as a result of cam slot action.

This extracting stroke occurs when the spring chamber is opened by the action of valve C as hereinbefore described. The middle port and the pipe connection through lines PT-5, PT-20 of the cylinder provide flow to line PT-6 for hydraulic shifting of the valve B. At this position the port 162 is uncovered by plunger 163 near the end of the extracting stroke at which position the plunger covers the spring chamber exhaust line except through the restriction 164 located in the forward end cover. This restriction serves to decelerate plunger movement.

The return stroke movement of the plunger and extractors is pressure-actuated when hydraulic power is on. Pressure is ported to spring chamber 165 in correlation with rising movement of the breechblock to the ramming position thereof, this position permits valve C to rise. The porting of high fluid pressure to this chamber functions to move the plunger against the constant high pressure which is maintained in the rod chamber 166 at all times. The movement of the plunger by application of an equivalent pressure to chamber 166 occurs as a result of the differential area construction thereof, whereby total pressure for plunger movement is less. At the full forward position of the plunger, the initial application of pressure is through ball check passage 167 in the forward end cover. This porting arrangement is required since the piston or plunger is at a position to block fluid flow to the spring chamber and forward face of the plunger. When hydraulic power is off and it is desired to operate the extractors by the manual arrangement provided therefor, the plunger springs 168 return the extractor spades to the sealed recesses provided in the gun breech.

Figure 23:
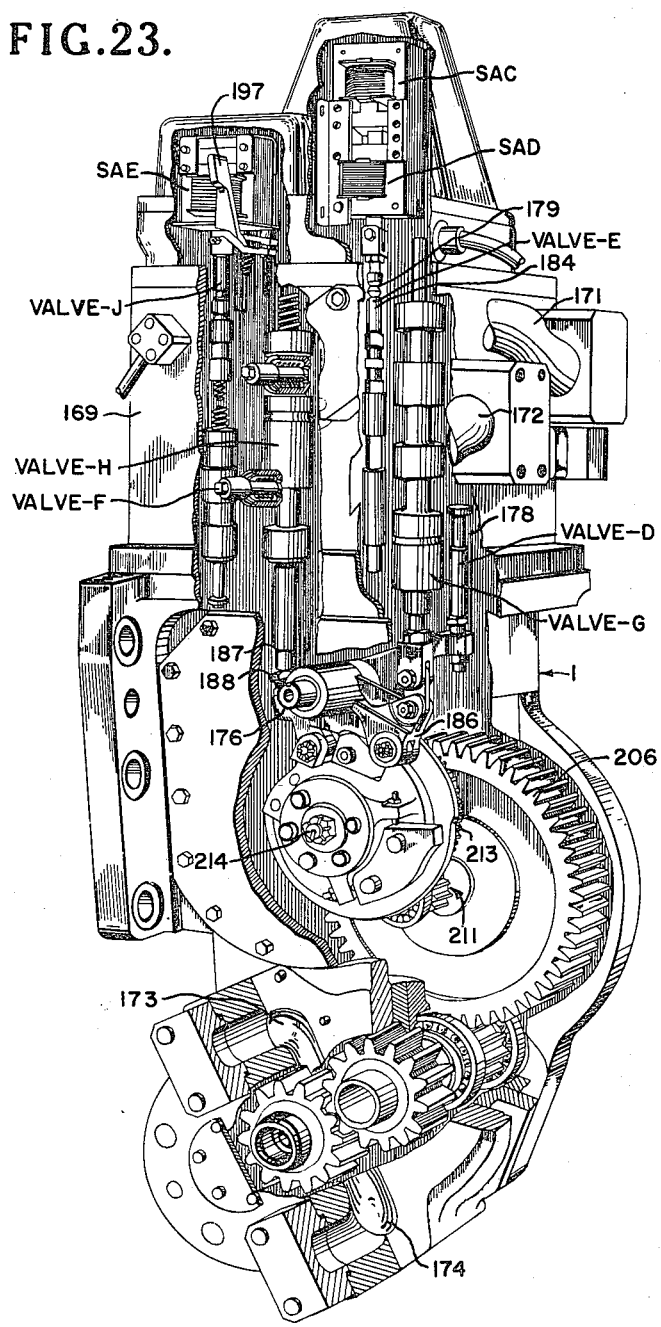
Fig. 23 is a pictorial view in phantom relationship showing internal details of the rammer drive unit.

The rammer drive unit operating equipment f, as claimed in the copending application of David Wertman et al., Serial No. 439,939, filed June 28, 1954 and which matured into U. S. Patent 2,779,246 on January 29, 1957, is mounted as a single subassembly on the rear plate of the slide as shown generally on Fig. 3. This equipment has pipe connections with the accumulator, the tank and the drain systems as shown in the piping general arrangement of Fig. 5 and has provisions for a direct drive coupling connection with the rammer chain sprocket of the rammer described in the copending application to Girouard et al. supra. The rammer drive unit proper comprises a valve block, a timing mechanism and a gear type hydraulic motor as the three main elements thereof. The unitary assembly of these main elements forms an enclosed unit as shown in Fig. 23. It provides a shaft driving function for the chain type rammer which automatically runs the ram chain head to a limit-stop position at the breech face, and reverses rotation thereof to withdraw the chain to the normal retracted position. The timing action of this assembly is controlled by electrical arrangements of the gun electrical control system and by the valves and timing mechanism hereinafter described in greater detail.

The control arrangement for the rammer drive assembly is such as to provide chain operation at a low rate creeping speed, for example approximately three feet per second until the chain contacts the ammunition. It then accelerates the movement to a full ram speed of ten feet per second. The controls thereof additionally function to control retracting movement of the ram chain to withdraw it from contact with the ammunition in the gun breech at a greater rate of speed than that of the full ram speed.

The valve block 169 of this assembly serves as an enclosed housing for the three solenoids, the six principle valves and the supplementary hydraulic parts associated therewith as shown in Fig. 23. The six principle valves incorporate spool-type plungers with mechanical connections therefrom to the solenoids and timing mechanism elements. Two large external pipe lines 171 and 172 connect the hydraulic passages of the valve block with the fluid pressure inlet and exhaust ports 173, and 174 respectively, of the hydraulic motor.

The valve D of the valve block is a pressure-operated plunger arrangement which extends into the timing mechanism case 175 for actuation of the lever arm 176 of the cam follower 177. It operates at the start of and during the ramming action of the operation cycle to unlatch the drive and to shaft the valve H. The valve chamber 178 is arranged to apply pressure simultaneously to both the reduced cross section or rod side and to the upper end thereof. The downward movement of the plunger is accomplished as a result of the differential pressure area provided by the reduced cross section at the piston rod.

Pilot valve E is a two position, solenoid operated spool type valve, which is restrained in either of two positions by the detent 179. The chamber 187 in which it is located extends through the block 182, and is adapted at the lower end thereof for reception of a valve stop 183. This valve stop is provided with a vent hole which runs to the timing-mechanism case. The upper end of the valve is coupled to the push-pull plunger 184 of the tandem arranged pair of solenoids SAC and SAD. These solenoids are encased in isolated relationship with respect to the hydraulic system. The solenoid SAC functions to raise valve E to port pressure to the directional valve G and thus initiate the ram stroke. The solenoid SAD functions in a similar manner to depress valve E to control the retracting movement of the chain.

The blocking valve F is a spring and pressure operated spool type valve. It is arranged in a valve passage of the block at a position below the valve J. The differential pressure-operated plunger located therebeneath operates in conjunction therewith to hydraulically shift it from the spring-operated or blocking position thereof. This shifting action is controlled by the pilot valve E, whereby valve F moves upward as pressure is applied to the plunger thereof at the initiation of ramming action. The shifting of valve E in this action is controlled by solenoid SAC. The movement of the valve F in this action controls the unlatching of valve D. In the other position thereof it blocks pressure from the valve D chamber and opens this chamber to the tank line.

The action of the hydraulic motor in accelerating, decelerating, stopping and reversing the rammer drive mechanism in ramming and retraction action is controlled by the position of the valve G, which with valve H controls the speed of chain movement. This valve comprises a variable-position spool type element arranged to be shifted in each direction under hydraulic fluid action thereof. The function of throttling motor exhaust through the metering grooves 185 at critical periods of the cycle is accomplished by mechanical cam action. The valve is adjustably coupled to the rocker arm 186 of the cam follower 177 and arranged with the lower end thereof extending into the timing-mechanism case. The plunger portion at the upper end of the valve receives hydraulic pressure in a manner to move the valve downward to start the ramming action as the solenoid SAC shifts the valve E. The valve is shifted upwardly by hydraulic pressure acting on the differential area thereof at the lower spool land. The action of this valve functions to reverse the drive direction. It is controlled by the shifting of pilots E and J when solenoids SAD and SAE are energized.

The valve H controls the critical action of porting accumulator pressure to valve G and to the hydraulic motor for control of the functions of initial ramming, ram-creeping and accelerating movements as well as speed deceleration and latch action at the end of the operation cycle. Further it functions with other valves in a breech interlock and closing control action hereinafter described in greater detail with respect to the valve J. This valve has a plunger 187 at the lower end thereof which extends into the timing mechanism case 175 in contacting relationship with the cam follower arm 188 therein. This valve is depressed against the arm 188 by loading applied by spring 189 at the top and by hydraulic pressure acting on the differential area thereof at the lower land 191. The valve is mechanically positioned at the upward position thereof by the action of valve D, combined with the action of the timing cam mechanism 192.

The pilot and interlock actions are controlled by the valve J of the retraction-stroke control arrangement in which it is normally actuated by the gun control system. Alternative provisions are included for manual shifting. It functions to insure hydraulic interlock action in holding the retraction-control settings until the chain is retracted. This valve also functions in cooperation with valve H to control automatic closing of the breech. These functions are accomplished by an arrangement wherein valve J is spring-loaded by spring 193 at the bottom thereof and is operated downwardly upon energization of solenoid SAE at the end of the ram stroke. This energizing action is effected in correlation with the gun control circuiting which also energizes solenoids SAD to shift the valve E downwardly. The valve J is held down by hydraulic pressure applied at the differential area of the upper land 194 thereof. In this position it ports pressure in a manner to hold valve E, and open the port connection 195 to the breech closing valve operating cylinder BCC. When valves E and J move in this manner they cause shifting of valve G to reverse the direction of the drive 195. The position of valve H at this time, in conjunction with the cam-control movement thereof functions to delay porting of pressure for breech closing control until after the reverse travel movement of the rammer chain to a point whereby the chain head clears the top of the breechblock.

The valve J is controlled manually by the lever device 197 which is located as shown in Fig. 23. This lever, when operated, accomplishes the same valve porting control functions as are accomplished in automatic action, whereby the breech closing is delayed during retraction of the chain until the breechway is clear for closing movement of the breechblock.

In addition to the hereinabove described principle valve elements of the valve block, the assembly additionally comprises five spring-loaded piston-type check valves which are either attached or enclosed in the block and which are hereinafter described in greater detail. The assembly includes two adjustable spring check valves 198 and 199 which are located in the rear face of the block as shown in Fig. 23. These check valves are located at each of the connection ports on the motor. The lower check valve 198 is a combination restriction and check which functions to control the maximum speed of the retracting movement by restricting the flow of exhaust fluid from the motor. This check lifts to permit unrestricted flow in the ramming-stroke movement.

The second adjustable check valve 199 is of the same general design and arrangement as the above described adjustment 198. It is located in the other motor-port connection to control the maximum speed of the ramming movement by restricting exhaust flow from the motor. It lifts to permit unrestricted flow in the retracting movement.

A conventional check valve arrangement 201 is located at the restriction 202 at the bottom chamber port of valve H. This restriction functions to decelerate the drive at the end of the retracting movement. The check valve seats to oppose flow to the port when the drive is starting in the opposite direction for ram stroke operation. It compels high pressure therein to throttle through the metering grooves 185 on valve H to provide creeping-control action.

The special type check valve and pressure regulating device 203 is assembled in the outlet port for line PT–23 which connects the valve block to the breech closing valve cylinder BCC and the pipe line PT–23 connection thereof. This valve prevents possible faulty breech closing action due to any pressure surge in the line. It lifts it under fluid action to permit unrestricted flow when valve A is actuated as hereinabove described with respect to valve J.

A conventional check valve 204 is located at the drain line outlet connection D–1 to prevent pressure variations in the drain leads of the valve block. This valve opens to allow free passage of the accumulated seepage of the valve block and closes to block external back pressure.

The drive gearing and timing mechanism enclosed in the case 175 beneath the valve block, as shown in Fig. 23, comprises the shaft-mounted assembly 205 of a spur gear 206, and pinion 207 therefor, a cam shaft assemblage 208, and the cam follower assembly 209. This assembly 205 also includes the rocker arm assembly 186. These elements provide a motor-driven gear train and valve actuating-drive latching mechanism for the maintenance of an exact positional relationship of the several valve elements with respect to the position of the rammer chain in the travel movement thereof. This correlated relationship as provided by the assembled and adjusted details of the entire mechanism assembly which comprises as the three major units thereof, the drive gear and pinion, the cam shaft assembly and the rocker arm and follower, is more readily understandable when consideration thereof is taken with respect to the hereinafter described element details.

The gear and pinion assembly 211 is of a conventional design arrangement wherein the elements comprise a 54 tooth spur gear 206 and a 12 tooth spur pinion 207. The assembly is ball bearing mounted at the side and bottom of the timing gear case with the 54 tooth spur gear connected in driven relationship with the 14 tooth output spur pinion 212 of the hydraulic drive motor 196 and the 12 tooth driven pinion thereof in driving engagement with the 44 tooth spur type timing gear 213 on shaft 214 of the cam assembly 205. The arrangement is therefore such as to provide a single rotation of the cam timing gear 213 for one complete stroke of the rammer drive chain. The 54 tooth driven gear 206 is preferably adapted at the hub thereof for connected reception of the rammer chain sprocket shaft whereby demountable assembly is provided therewith.

The cam shaft assembly comprises the cam timing gear 213, the timer cam 215, and three cam segments hereinafter designated as the latching cam segment 216, valve G positioning cam segment 217 and ram decelerating cam segment 218. They are adjustably bolted to the timer cam. The final adjusted position of the first two cams is secured by dowel pins not shown.

The timer cam and the three cam segments provide the side-by-side circular cam contours 219 and 221 wherein segment contour 219 is aligned beneath the rocker arm 186 which is attached to valve G, and the other segment contour 221 is located beneath the cam follower 171. The arrangement is such that both cam units function to control the variable, cam-actuated movement of valves G and H and additionally the latching function for the drive at the end of the retracting stroke.

The rocker arm and cam follower assembly 215 comprises the cam follower and the rocker arm which are adjacently mounted in independent free bearing relationship on the auxiliary shaft 216 as shown in Fig. 23.

The rocker arm 186 has a cam-roller 217 and valve-link clevis elements at 218 thereon, the latter including adjustable screw details at 219 for setting the attached position of valve G.

The cam follower assembly 209 has three arms or lugs 176, 187 and 177 respectively for action of valve D, valve H and the latch 221. The valve arm includes an adjustable screw type contact bearing 222, 223 and 224 for the respective lugs 176, 187 and 177. The setting adjustments are provided to vary the engagement position of their respective valves. The latch lug is fitted with a pivoted latch 221.

The hydraulic gear type motor for driving the gear train is a separately housed unit which is bolt and dowel mounted at the bottom of the timing gear case with the interior details and port arrangements as shown in Fig. 23. The motor is of the reversible gear type design comprising conventional drive and driven gears whereon the driven gear extends through the housing into the bottom of the timing case to engage the 14 tooth pinion of the gear train in spline-coupled relationship. The pinion of the shaft is preferably ball-bearing mounted in the gear case rather than in the motor housing to facilitate a drive-output coupling feature wherein the motor is removable without disturbing the drive proper.

The case ejector drive assembly which operates to move the empty case forwardly from a position at rear of the slide to a position forwardly of the gun shield is constructed as a single assembly and located in the bottom of the slide as shown at 18 in Fig. 3. This empty case drive unit is mounted with the output shaft thereof coupled to the forward sprocket of the conveyor chain mechanism. It has pipe connections with the accumulator, the tank, and the drain system as identified in the drawing of the piping general arrangement of Figs. 4 and 6.

Figure 24:
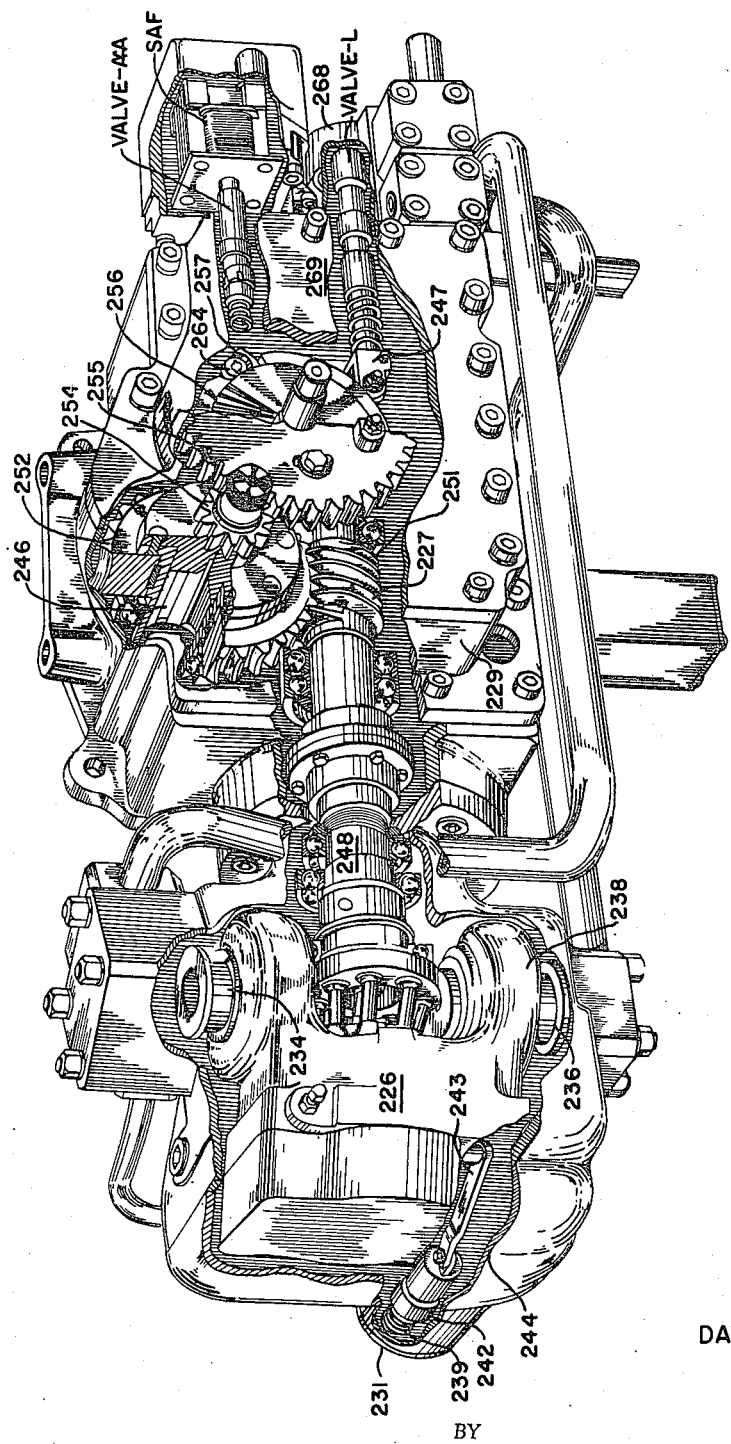
Fig. 24 is a phantom pictorial view of the empty case drive unit.

The empty case drive unit ECD operates in one direction only and in an automatic cycle which starts when an empty case is dumped into the case ejector compartment. The drive of the chain is such as to move the empty case and all empty cases in the ejection tube beneath the gun, forwardly therefrom. It additionally functions to accelerate and thereafter stop when the case ejector-compartment has been cleared. The drive elements which perform this action comprise the motor 226, the drive gearing assembly 227 and the control valve unit 228 illustrated in Fig. 24, and hereinafter described in greater detail. The actions are controlled by the electric switch circuitry of the slide electrical system.

Figure 25:
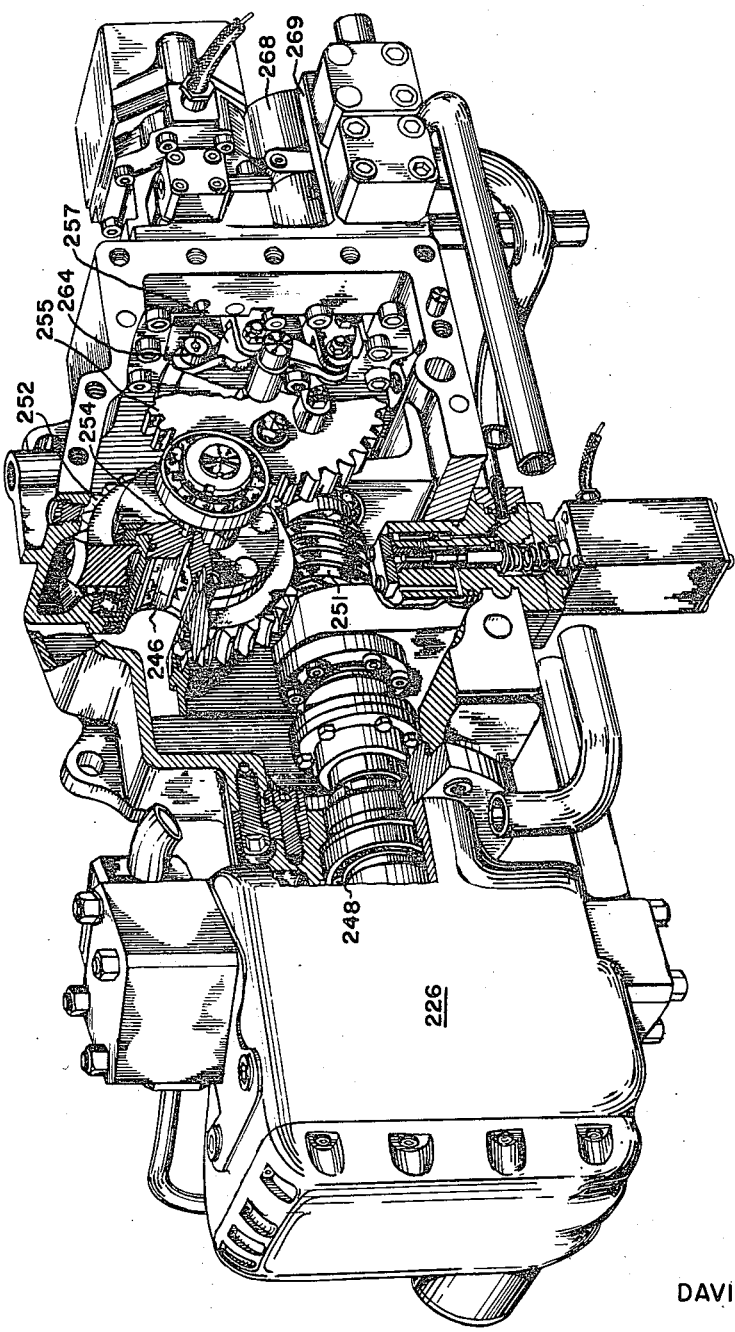
Fig. 25 is a pictorial sectional view of the interior details of the empty case drive mechanism.

The hydraulic drive motor of Fig. 25 is a multiple-piston type, pintle mounted, swivel-yoke variable-displacement type unit of conventional design. It is flange mounted on the rear face of the gear case 229. The motor system also includes an attached compensator 231 which is shown diagrammatically in Fig. 5a. The external pipe lines 232 and 233 connect the upper pintle 234 and the compensator 231 with a high pressure port 235 at the control valve block. The swivel yoke 238 is positioned and limited in its movement so that the motor can drive in one direction only. The arrangement is such that the motor does not return to neutral when the drive stops but is at an offset of approximately 15°. At this offset position it can swing to a position of 30° yoke offset to increase piston stroke and drive power. The action of this shifting as hereinafter described in greater detail is controlled by the compensator assembly 231.

This compensator assembly functions to increase the drive power as the load increases. The load varies to a maximum as the gun elevates to the upper limit thereof. The compensator normally does not alter the 15° offset position of the swivel yoke. If, however, the load and drive shaft torque increases with added loading to demand power above the equivalent setting of the spring 239 of the compensator control valve 241 or Y in the schematic drawings, the valve lifts to port high-pressure fluid to the piston 242 and yoke control link 243 to increase the offset position thereof. When the power demand decreases, the control valve seats and vents the piston to the spring chamber thereof in the motor housing 244. When this drive is in idling condition the piston spring holds the yoke in its normal starting and driving position.

The rectangular box-shaped housing 245 at the middle of the drive unit provides a mounting for securing the drive to the shaft 246 and encloses the mechanism which comprises the output drive 227, a cam and latch mechanism 247, and an interlock-switch operating device.

The hydraulic motor drive shaft 248 extends into the gear case 249 and has direct drive coupling to the worm 251 of a worm and worm wheel drive 252. The worm wheel 253 is a hub and pinion assembly the interior of which is provided with a spline-bore in a manner to provide close-coupling for the driven chain sprocket shaft not shown.

In the cam and latch mechanism the 11 tooth pinion 254 of the worm wheel 253 is meshed with a 41 tooth spur gear 255. The cam gear combination 256 includes spur gear 255 as an element thereof while the cam and latch mechanism 247 comprises this gear and attached cam, and the valve L operated latch lever 257.

The cam 258 which is adjustably mounted on the gear 255 is a nearly circular disc with a notch 259 therein which receives the latch 261 at the end of the cycle of operation. It is adjustably mounted on the gear 255 in an arrangement therewith which includes a turnbuckle-type adjustment 262 on the side of the gear for providing a fine adjustment for setting the stopping position of the drive. The cam makes one revolution for each cycle of conveyor-chain movement to provide an equivalent linear movement of the chain of 82 inches.

The latch lever device 263 which latches with the cam comprises the pivoted lever 257 located in the case and arranged with one end attached to the valve L of the valve block and a roller 264 at the other end which is in the path of the cam and the notch thereof. The lever 257 is moved at the start of a cycle by action of the valve L in releasing the cam. During the run, the roller 264 rides on the high surface of the cam in a manner to hold the valve at the run position thereof.

The assembly also includes an interlock switch 265 which is mounted in the gear case beneath the worm as shown in Fig. 25. It is a normally closed switch of the gun electrical control system. This switch is opened by action of the hydraulic piston and plunger device 266 to provide an interlock function which prevents powder transfer tray and empty-case tray movement to firing position while the drive is conveying an empty case from the compartment at the bottom of the slide into the ejecting tube. The piston 267 thereof moves to open the switch when the unlatching action occurs. This is a control valve action which operates to control valve block 268 which is mounted on the forward face of the gear case.

The control valve block 268 comprises the housing 269 for two valves AA and L and a mounting for solenoid SAF which is arranged with port connections, adjustment, and mounting details as shown in Fig. 26. This unit control the porting of high pressure to the motor, and additionally controls the return flow from the motor. Also the unlatching and interlock piston action is controlled through the pilot valve AA thereof.

The pilot valve AA at 271 is a two-position, spool-type valve which controls the action of valve L at 272. It is located at the top of the block 268 in aligned relationship with the plunger 273 of solenoid SAF. This plunger extends through the valve cover in an oil seal 274 of the housing to bear on the end of the valve. The other end of the valve is spring-loaded by spring 275.

The valve AA shifts to the run position thereof when the solenoid is energized by the closing of a switch at 276 of the electrical control circuit. This switch closes when an empty case is dumped into the rear chute compartment.

In the run position thereof valve AA ports accumulator pressure to the chamber 277 of Fig. 26. This chamber is vented when switch 276 opens and the spring 275 shifts valve AA to its stop position. Valve L, however, is not shifted at this time due to the mechanical arrangement provided therefor.

The cam-unlatching action is performed by the spring loaded variable-position, spool-type valve L which extends into the gear case in coupled relationship with the cam latch lever 257. This valve has high pressure and tank-line ports to the piston motor as shown in Fig. 26 and is hydraulically shifted to the run position thereof by action of valve AA as hereinabove set forth. In this position the spring cannot return to its stop position when the end chamber is vented, until the end of the cycle as controlled by the contour forms.

When valve L shifts to the run position thereof high pressure is simultaneously ported to the interlock switch piston 266 and to the inlet port 236 of the motor. Flow to the motor however is partially blocked by an adjustable-pin type restrictor 278 located in the valve block outlet port, which controls the maximum drive speed at a normal time setting of approximately 2 seconds for the cycle.

The land which is at the spring-end of the valve has metering grooves therein which throttle exhaust flow from the motor at the start and end of the operation cycle. These grooves function as the result of the cam form at the side of the latch notch. Opening and closing actions of the valve are thus varied to provide slight acceleration and deceleration control. The clevice attachment of valve L with the cam latch lever is adjustable in a manner to permit setting of the latch for insurance of proper cam clearance and to adjust the decelerating action.

*Operation*

The slide power equipment assemblies are connected for operation by hydraulic fluid pressure generated by the pump and stored in the accumulator. Flow between the pump and the accumulator passes through the filter to a manifold mounted on a gun girder near the gun trunnion. This manifold is connected to a similar manifold on the moving slide by a flexible swing-joint connection. From this manifold, fluid is delivered to the pump control valve block on the slide, and thereafter to the accumulator. Fluid flow continues with the accumulator receiving the full pump output until it reaches a fully charged condition. When the accumulator is completely charged, the control valve block associated therewith, automatically dumps the constant displacement of the pump through a return line and the swing joint to the storage tank. The storage tank is a closed-system tank unit which is maintained full at all times after initial filling and is relieved from excessive pressure, when fluid heats up through pump action, by an expansion line connected to the high level expansion tank mounted on the gun house roof. The function of this system arrangement is to replace accumulator-fluid constantly during cycling action of the gun in operation and during gun-laying and gun-firing movement of the gun slide and housing.

Each operating cylinder and hydraulic motor unit of the slide equipment has a pressure line connection to the accumulator and an exhaust line and drain line connection to the swing-joint return pipe which runs via the storage tank to the pump suction line.

As hereinabove set forth in greater detail the system includes a special arrangement of a pair of telescoping joints between the slide and housing for power connection from, and return line connection to the accumulator. These power and return lines connect the valves and operating cylinders mounted on the recoiling breech assembly with the accumulator and slide system. It also includes connections to these valve block units which control porting of pressure to the cylinders and drive units.

Valves of these blocks are actuated by solenoids of the electrical control system and by the timing mechanisms and interlock devices thereof so that all actions are synchronized in a continuous, rapid, and automatic cycle.

Figure 6:
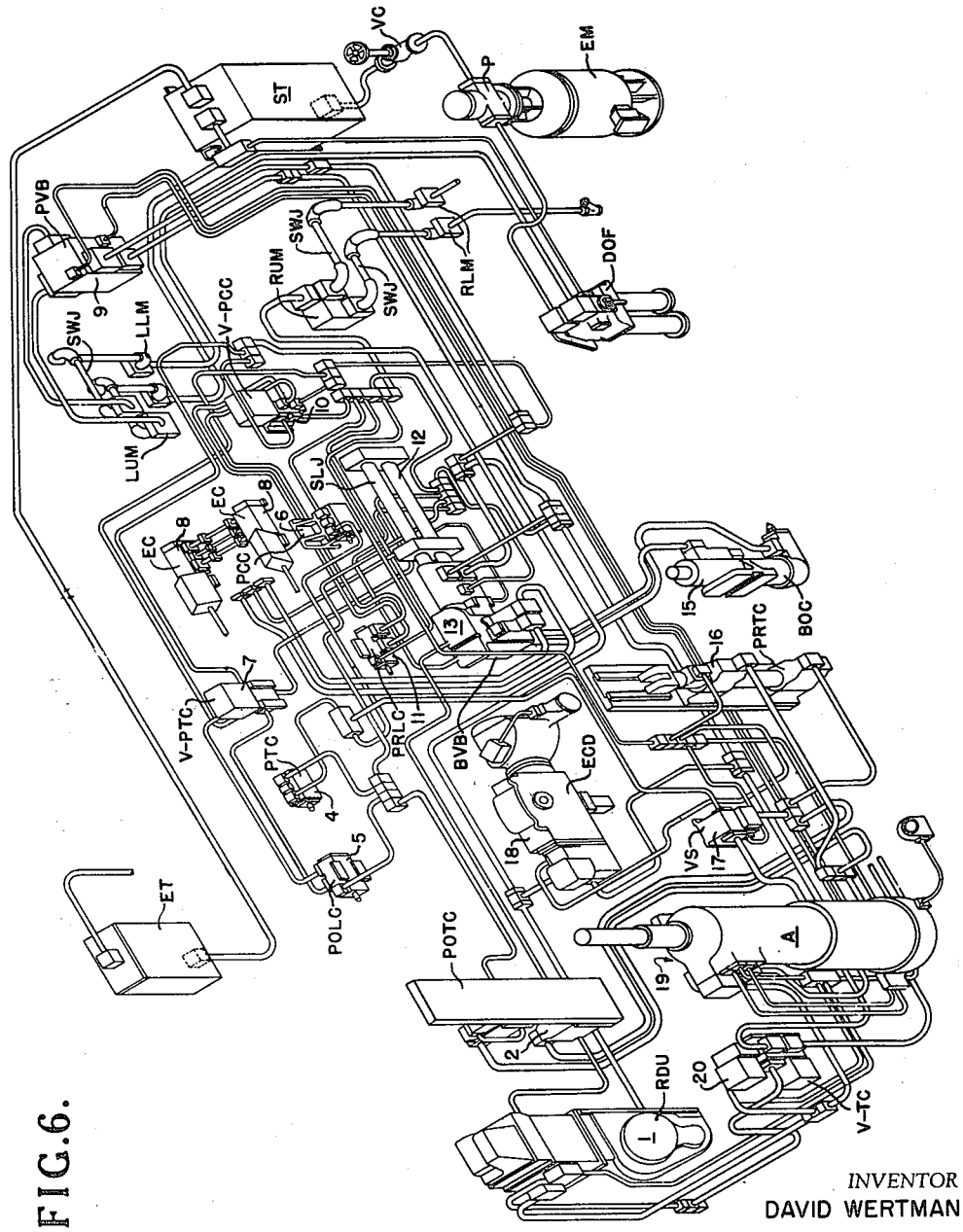
Fig. 6 is a three dimensional schematic illustration of a modification of the hydraulic system of Fig. 2, being generally similar thereto with the exception that the hydraulic projectile buffer is not included therein.

Operational arrangements of the hydraulic system of the slide power equipment as shown in Figs. 4 and 6 and all of the operational drawings include parallel control action arrangements with the electric control systems shown in the elementary wiring system diagrams of the copending application to Girouard et al. The illustrations of the drawings show system conditions when operating the equipment automatically and when performing manually controlled operations. The sequences of actions in automatic cycle operation are shown as are control positions and equipment response conditions when performing emergency stop control operations or at instances of misfiring and cease firing.

The power plant for the operation of the hydraulic units is by means of the electric motor driven hydraulic pump which is operated at constant speed with a single direction of rotation. Hydraulic fluid is delivered from the tank through the pump to the air-charged accumulator until until the oil chamber is filled to capacity. Oil at an operating pressure of, for example, 1000 pounds per square inch is then available to actuate the various operating cylinders and drive units of the power system.

The action of the accumulator assembly charging is shown in Fig. 4 wherein the system is approaching the end of its charging stroke. During this stroke the valve Z ports pressure to the top of valve BB of the control valve block PVB, holding valve BB down, closing the line port and opening up delivery to the accumulator by way of line P–1.

At the end of the accumulator charging stroke, the cam on the piston rod engages the cam follower and lever M and moves to shift valve Z to the upper stroke position shown in Fig. 53.

This positioning of the accumulator valve Z for pump idling action after the completion of the accumulator charging phase is in ports pressure to the valve BB by a reversed path. The pressure as initially applied through line PT–1 is relieved at the top of valve BB and applied at the bottom of the chamber by line PT–2. This action holds the valve BB up, opens the port for line P–33 to permit fluid flow above valve V to the tank line T–1 and thus relieve the load on the pump.

The action of the accumulator when it is discharging under demands of the operating equipment is such that as the equipment withdraws stored fluid from line P–2 of the accumulator, the accumulator piston moves up under the compressed air action, as indicated in Fig. 53 to maintain constant the pressure of the fluid being discharged. Pump delivery to the accumulator is restored after approximately 10 percent of the volume thereof has been discharged. In this change from discharge to charging action the cam on the piston rod and cam follower reverse the position of the lever M and valve Z associated therewith. This action of valve Z shifts valve BB by relief of pressure on line PT–2 and restoration of pressure in line PT–1. This changes delivery from line P–33 through porting passages to line P–1 and ultimately to the accumulator. This delivery continues during any period of the operating equipment when the demand exceeds accumulator capacity. Automatic idling of the pump occurs only when the accumulator is fully charged.

If, any condition occurs such that the valve BB does not shift to idle pump when the accumulator is fully charged relief of fluid pressure in the system return flow to the tank is accomplished by the hydrocone valve for by-pass between line P-33 and T-36 of the pump control valve block. Such a condition results when as shown in Fig. 35 the lever end associated with the lever M has been uncoupled from the cam follower and valve Z which is connected with lever M has been shifted to its charging position. In this instance the valve BB cannot rise; consequently excessive pressure unseats the pilot relief valve and opens the piston chamber of the valve to its spring chamber. In this action the valve V lifts, thus dumping all pump displacement to the tank lines.

In the event the accumulator is cut out in its action or if air pressure stored in the flask is lost and the accumulator piston is at the bottom of its stroke, the equipment can be operated by pump delivery alone. This condition is shown in Fig. 36 wherein the valve T is manually seated by rotation of its handle and the lever M disconnected from the cam follower in order to shift valve Z to E position which blocks line PT-Z and ports fluid through line PT-1. This loads the top chamber of valve BB, places the pump under load and delivers high pressure fluid through lines P-1, and P-2 to all of the hydraulic operating units. Under this condition of non-automatic shifting of valve Z, the system is relieved by valve V as shown in Fig. 35 whenever operating demands cease. Actuation of valve V is by pump pressure build-up, which functions to move valve V downwardly against the spring therein and port fluid into the passage between line T-1 and line T-36.

In the power operation of the system the accumulator is initially charged before the equipment operation cycles are started. The projectile transfer tray operates in a loading cycle wherein the movement thereof is such that with empty transfer trays in the firing position and the loaded cradles latched to the slide, the gun is in a condition for loading and firing of the initial round. In order to permit ramming of the projectile and powder case, the breech is retracted or withdrawn to open the gun breech block. When the breech has dropped to its open position, the valve R in the projectile-cradle pawl tripping cylinder control valve V-PCC is shifted by action of solenoid SAG as shown in Fig. 37. In this shifted position valve R ports the fluid entering through line P-6 to the exhaust port for line PT-11. Fluid flowing through PT-11, the head end of the pawl tripping cylinder, acts against the piston surface to provide plunger movement in PCC. The rod end of the tripping cylinder piston is at this time connected through the line PT-12 to port fluid through valve R and to exhaust it out tank line T-7. The piston rod stroking movement then rotates the projectile-cradle pawl about the pivotal mounting thereof and disengages the pawl from the engaging position behind the projectile. The cradle ramspring thereupon ejects the projectile from the cradle into the transfer tray. Solenoid SAG is deenergized as the cradle is unlatched from the slide and valve R of control valve V-PCC is returned to its normal position as shown in Fig. 5. This action reverses the fluid pressure conditions in the line PT-11 and the tank line PT-12 connections to the tripping cylinder. Pressure reversal through valve R causes the piston of PCC to return to its normal or retracted position.

In powder transfer tray loading movement the ejection of the powder case from the powder cradle to the powder transfer tray is controlled by the solenoid SAH located in the powder-cradle pawl tripping cylinder control valve unit V-PTC. The action, as shown in Fig. 37, is the same as is that of the projectile-cradle latch control valve except that it takes place as soon as the powder-cradle is raised and latched to the slide. This action occurs without regard to the position of the breech-block. When the solenoid SAH is energized, it causes valve S to shift and permit fluid entering through line P-7 to be ported through line PT-13 to the head end of the pawl tripping cylinder piston. The rod end of the tripping cylinder is then connected through line PT-14 and valve S to the outlet port thereof and out the tank connected line T-6. The piston rod then rotates the powder cradle pawl out of the way of the powder case, allowing the cradle ramspring to eject the powder case from the cradle into the transfer tray.

The hydraulic actions of the control system and actuating elements for movement of the transfer trays to gun loading or ramming position are such that when both transfer trays are loaded from their cradles and empty case is in the empty case, tray, of the electrical system associated with these hydraulic and mechanical system elements and the breech-block is in its nearly open position for the solenoid SAB which is located on the transfer-tray control valve V-TC. When the solenoid SAB is energized it shifts pilot valve O, Fig. 10, causing differential valve Q to shift, as indicated in Fig. 38, and port fluid in line P-5 through ports on valve Q, to the port of line PT-8. Fluid in line PT-8 is directed simultaneously through line PT-31 to the projectile buffer, and through line PT-9 by porting action of valve CC to the powder and projectile cradle latching cylinders. Fluid entering the projectile buffer from PT-31 shifts the control valve thereof against the spring to close the buffer-chamber return line T-41. The buffer control valve is not shifted until the buffer has brought the projectile to rest in the projectile tray. This delay in shifting of the buffer control valve results because of the time required to shift valves O and Q. Pressure ported by this control causes the projectile-buffer piston to move the projectile forward to its proper position in the projectile transfer tray for subsequent transfer therewith, as shown in Fig. 39.

As the fluid from line PT-8 of the transfer tray control valve divides for flow through one path to the projectile buffer, it enters the sequence valve for flow through a second path to the powder and projectile hoist cradle latching cylinders. This flow is directed from valve CC through line PT-9 to cause the cylinders to stroke and and unlatch the cradles from the slide, as indicated in Fig. 38. This frees the cradles for movement to their respective hoist positions.

At the completion of the buffer return stroke which pushes the projectile forward to its transfer position in the tray, fluid is ported from the buffer through the previously blocked port thereof through line PT-24 to the plunger at the end of valve CC in the sequence valve unit causing valve CC to shift to a downward position, shown in Fig. 40.

Downward operational movement of valve CC after projectile positioning opens ports through the sequence valve to allow fluid in line PT-8 to flow through lines PT-10, PT-16, and PT-18 to the head ends of powder and projectile transfer tray operating cylinders. This flow to the cylinders causes the pistons thereof to shift the transfer trays to ramming position.

Fluid from the ends of the tray cylinder piston is ported through the maximum speed control restrictions at the exhaust ports for lines PT-15 and PT-17 which connect with line PT-7. Flow from the port of PT-7 is by porting action of valve Q of the transfer-tray control valve which provides a path therethrough into tank line T-4. As each piston nears the end of the transfer stroke the upper buffer thereof closes off the main passage. All fluid displaced by the piston in this action must then pass either through the grooves in the buffer or out through the upper stopping-speed restriction, respectively, for the powder-and-projectile transfer tray.

The operating cycle of the rammer drive unit consists of the ram stroke which forces the ammunition into the gun, the ram retracting stroke which immediately follows the ramming stroke, and the actuation of the operating cylinder for the breech closing valve A, operating cylinder actuation occurs during the retracting stroke of the rammer.

The ram stroke of the hydraulically driven chain rammer occurs when the transfer trays reach their respective mutually aligned ramming positions. As the transfer tray comes to rest in the slide switches of the electric circuit close and solenoid SAC on the rammer drive unit is energized by the electrical control system. Automatic control of the entire gun system is initiated and maintained by the rammer switch on the gun captain's control panel which is manually held in the ram position whenever fully automatic cyclical operation is desired. As this switch is closed the solenoid SAC of the rammer drive unit RDU is energized to an upward position, as shown in Fig. 41, for engagement at the lower detent position. Solenoid SAC thus shifts the rammer pilot valve E.

This action of valve E allows fluid from line P-3 to flow across the lower porting portion of valve E and through the passages immediately above this inlet path. From this upper port fluid is directed downwardly, as shown in Fig. 41, to the lower end of an actuating plunger associated with the end of valve F. Action of this plunger shifts valve F to an upward position. Simultaneously with flow through the downward path, fluid is directed upwardly through the uppermost passage of Fig. 41, across to the top surface of an actuating plunger on the upper end of valve G to cause it to shift all the way in a downward direction. Hydraulic pressure at all times acts on a differential area at the bottom of valve G. The downward movement of valve G allows fluid entering from line T-3 to move through this inlet port of valve G through the intermediate porting portion of the valve to an exit port thereof and thence through a speed control orifice in the block to an inlet port on valve F. The fluid then flows directly around a lower porting portion on valve F, and downwardly out through a passage in the block to the end of the unlatching plunger, for valve D, causing it to move downwardly.

This action lifts the rocker arm and latch assembly to unlatch the rammer cam and move valve H to an upward position. Movement of this valve opens the lower port of valve H, allowing fluid to flow directly from the outlet port on valve G which is associated with inlet port P-3.

This flow from the outlet of the intermediate porting portion of valve G, is through a path parallel to the speed control orifice flow path to valve D. Fluid flow from the outlet port on valve H is directed past the check valve and adjustment to the ram side of the hydraulic motor. This pressure fluid flow actuates the motor to rotate and move the rammer chain toward its ram position. The discharge from the motor is ported through an adjustable restriction orifice to the upper porting portion of valve G to an outlet port thereof and thence out to tank line T-5 through the lower porting portion of valve G.

The design of the timer cam is such as to provide a slow movement rate creep speed, as for example 3.3 feet per second, during the initial five inches of movement of the ram. This action is effected by controlling through valve movement the area of the grooves in valve H. This action is as shown in Fig. 41. After the rammer chain has completed this initial travel, valve H is shifted to the fully open position through contact of the roller with the cam segment. This lifting of valve H through cam action fully opens the passage between the lower porting portion of this valve and the outlet port thereof, which is connected with the rammer drive motor. At the same time valve G is allowed to move down through rotation of the timer cam associated therewith. This action as illustrated in Fig. 42 permits the rammer to accelerate to its maximum speed under control of the speed control orifice in the motor outlet line adjustment.

The rammer continues to move toward its ram position at this speed until it nears the end of its ram stroke. Thereafter the rocker arm attached to valve G forces the valve to more toward its neutral position through contact with the deceleration cam segment. This action of the rocker arm against valve G produces chain deceleration by throttling rammer motor discharge through the throttling grooves in the spool of valve G, in a manner to gradually restrict motor exhaust flow. During this decelerating action the chain continues to move through the transfer trays toward the rammed ammunition position in the gun breech. As the rammer chain moves the head thereof across the breechblock, valve H is moved upwardly by the cam segment to close off the lowermost port of the upper porting portion of the valve spool. This port is blocked by movement of valve H to the position shown in Fig. 43. The breechblock is, in this manner, prevented from rising while the rammer chain is across its path. As the chain reaches the end of its forward stroke, it moves a switch of the electrical interlock system to activate solenoid SAE, for return stroke action of the rammer.

Immediately following the shifting of pilot valves E and J by their respective solenoids from the position of Fig. 42 to a position shown in Fig. 43 an interlock action takes place thereby, wherein both valves are hydraulically blocked to prevent any tendency to shift in an upward direction. This interlock arrangement of these two pilot valves is provided as a precautionary measure to insure chain retraction and additionally, to prevent casualty, in the event of electrical control system failure or faulty switch action.

As the solenoid SAE moves valve J downwardly, oil under pressure from line P-3 flows through the lowermost porting path of valve E to the inlet of valve H. Fluid entering this port of valve H is directed through a porting portion of this valve to a port shown immediately above the inlet. One path of flow from this port on valve H is blocked by valve F. A second path from this block provides for flow to an inlet port on valve J. This port is blocked as long as valve J is in its up position. With the valve J in a position to block this port, the upper porting section of the valve spool, connects the port immediately above the inlet in a manner to open it to the drain.

As at the time valve J moves downwardly under action of solenoid SAE, this port which previously had been connected to drain is closed off therefrom and connected to the inlet port of this valve. A differential area at this porting portion of the spool of valve J acts under applied fluid pressure to hold the valve in its down position. This hydraulic holding action is unaffected by any movement of the solenoid, such for example, as accidental electrical control action thereof.

The fluid under pressure is ported as shown in Fig. 43 from valve J directly across to a port of valve E, which when valve E has been depressed by solenoid action, presents a differential area at the upper porting portion thereof to the port in communication with valve J, the differential fluid pressure on this spool surface serves to hold valve E in its downward position. Pressure is also ported through this upper porting passage of valve E to a blocked port of valve H. The flow path through this port is blocked throughout the hereinafter described ram retracting stroke and until valve H reaches its lowest position at the end of the ram retraction, this action is responsive to cam movement of valve H. Simultaneously, with the completion of the ram retracting stroke this port of valve H is vented to the tank to thus terminate the innerlock relationship. Cessation of the application of differential pressure to the valve spool by connection of this flow passage with the tank line port, terminates the valve holding action and permits valve J to shift upwardly under spring action.

The preceding actions take place after the completion of the ram stroke and are initiated when the tail link cam of the chain engages and closes the hereinbefore recited rammer drive electrical interlock switch.

This switch action causes the solenoid actuated downward shifting of the valves E and J, and the subsequent initiation of valve action for the rammer retract-run.

Valves G, F, and H, control the retracting stroke action wherein pressure on the valve actuating plungers as applied at the upper end of valve G and at the lower end of the valve F is released by movement of valve E to the down position of Fig. 43. Valve G is moved to its extreme up position by fluid pressure application to the differential pressure area of the intermediate porting section at inlet P-3. Thereupon valve F moves under a springload to the lowermost position thereof. Valve D is, by this action, connected through the lowermost ports of valve F to the tank line port of valve at T-5. Valve D is thus free to be moved upward by the cam follower arm when the end of the retracting stroke is reached. Valve G in its up position, directs fluid from line P-3 to the speed control adjustment, as shown in Fig. 45 and out port, past the check valve at this adjustment to the retract side of the motor. This causes the motor to rotate in a reverse direction to start the ram retracting stroke. Return flow from the motor is ported through the adjustable speed control orifice at valve H through the lowermost porting section thereof, thence through the same port as the flow from valve D and out a port on valve G to tank line T-5. The rammer accelerates until it reaches the maximum speed allowed by the adjustment of the speed control orifice.

As soon as the rammer chain head retracts to a position which is clear of the path of movement of the breechblock, the contoured timer cam allows valve H to move downward. This action of valve H, as shown in Fig. 44, allows fluid to flow from the inlet port thereof through valve H, to the port immediately therebelow and thence through the lower porting path of valve J. From this port on valve J, fluid flows to the outlet port thereof and out through the pressure regulator in line PT-23 to the forward chamber of the breech closing valve operating cylinder in a manner as shown in Fig. 44. Action of this operating cylinder shifts valve A of the breech operating valve block and results in porting fluid to the lower end of the breech operating cylinder. As the rammer chain approaches the end of the retraction stroke, the valve positioning cam segment of valve G in the rammer drive unit acts on the rocker arm associated therewith to pull valve G toward its center or neutral position. This action is as shown in Fig. 45. Discharge from the hydraulic motor passes through the lower porting chamber of valve H, and an intermediate port in valve G to the outlet port for T-5. Fluid flow is throttled in the intermediate port of valve G, wherein it is caused to pass throttling grooves in the valve spool to provide deceleration of the rammer. Simultaneously therewith, the valve H is acted upon by spring action to move it downwardly. Hydraulic pressure acts on the differential area thereof to aid in this action. This movement is limited by the sloping surface of the timer cam. Additionally, some decelerational action takes place as at valve H as motor discharge is throttled through grooves in the upper spool edge of the lower porting passage of valve H.

A portion of the motor discharge fluid also passes the orifice and check valve connecting ports adjacent to and associated with valve H. As the rammer motor continues to rotate, valve G continues to move downward to completely block off all passage of oil from line P-3 through the intermediate porting passage thereof. Fluid can then reach the inside of the motor only by passing from line P-3 through a port of the intermediate inlet passage of the upper spool section to the upper port associated therewith and of valve H, through the upper ports of valve F, and around the check valve at the speed control adjustment.

As the chain reaches its fully retracted position, the latch end of the cam follower arm is over the latching cam segment and valve H is caused to snap down to its extreme lower position. This action cuts off porting through the upper section of port valve H, cuts all flow to the inlet side of the motor and causes the rammer to stop. Return of valve H to its lower position also opens the inlet flow passages of the upper port of this valve to the drain pressure connection at the center of the valve. This releases the pressure on the differential areas at the upper ends of valves E and J. Valve J is then free to be returned by spring force to its upper position. Valve E, being arranged in a detent manner and having no spring beneath it, remains in its lower position until solenoid SAC is energized at the start of the next ramming operation.

The action of the transfer trays in movement to firing position is such that as the rammer completes its retracting stroke, and the breech has begun to close along with the completion of the empty-case drive-units operating cycle the control system energizes solenoid SAA and deenergizes solenoid SAB on the transfer tray control valve. Thereupon all units move to their firing positions as shown in Fig. 5 When solenoid SAB of the transfer tray control valve is deenergized, pilot valve O associated therewith is spring-returned to its neutral position and pilot valve P is shifted. This action reverses the pressure on valve Q, which shifts to its opposite position. Valve Q reverses the route of the fluid to the transfer tray cylinders whereupon fluid entering line P-5 on the transfer tray control valve flows through the adjacent ports on valve P as shown in Fig. 5, thence out to the end of valve Q. The pressure ported to the upper end of this valve shifts it to cause fluid entering from line P-5 to flow from the inlet port on valve Q thence through the valve porting passage of line PT-7 and subsequently to lines PT-15 and PT-17 at the upper end of the respective transfer tray operating cylinders. The empty transfer trays are moved to their firing position by the fluid acting on the top of the cylinder pistons. Fluid displaced at the lower end of each cylinder is ported through the adjustable speed control restrictions to lines PT-16 and PT-18 respectively, and ultimately to a junction with line PT-10 at the return port of valve CC in the sequence valve unit. This port passes the fluid past a check valve into line PT-8 thence to the port thereof on valve Q. Flow through valve Q is as shown in Fig. 5 from an upper intermediate port to a lower intermediate port and thence into tank line T-4.

As each piston enters the buffing range, the fluid below the piston must pass through the buffing grooves in the piston or through the speed control restrictions which are located in the fluid flow path just prior to the point of passage through the spring-loaded restrictions adjacent thereto.

As the powder-transfer tray reaches firing position, solenoids SAD and SAE of the rammer drive unit control block are de-energized simultaneously with the opening action of switch AS of the electrical circuit.

In the closing action of the breech assembly the breech closing valve operating cylinder shifts valve A in the breech operating valve block when fluid under pressure is ported to the cylinder through line PT-23. This action is as hereinbefore described with respect to the retracting action of the rammer. As valve A shifts, it allows fluid entering line P-8 on the sliding joint to flow through the intermediate port on valve B, for flow division into two paths, one of which runs to the intermediate port on valve A, and the other out to the intermediate port on valve C as shown in Fig. 44. From the port of valve A it flows through line PT-21 through the adjustable flow restriction into the bottom of the breech operating cylinder. Fluid is also ported at the flow restriction through the upper end of valve DD to shift the valve DD downwardly. The fluid pressure which acts against the under surfaces of the breech operating piston causes the breech block to move to the upward position thereof. Fluid displaced from the upper end of the cylinder with upward piston travel, flows through the intermediate pair of ports on valve DD, into line PT-22 to the outermost port on valve B and thence through the sliding joint to tank line T-3. When the breech is nearly closed, the fluid above the piston passes through buffing grooves in the piston, to buff breechblock final movement. When completely closed, the breech is locked by the breech bolt which is moved by spring action. Valve A remains detented in the closed position thereof, in order to maintain fluid beneath the piston until the breech is again unlocked.

The firing movement of the breech bolt and firing pin occurs after the ammunition is rammed, the rammer retracted, the breech closed and following movement of the transfer trays to the firing positions thereof. The breech bolt and the firing pin assembly are not elements of the instant hydraulic system. The mention thereof is merely for the purpose of providing for a better understanding the gun operation cycle. At this stage of operation the firing pin moves with the breech bolt to close the firing circuit, and produce gun firing. Thereafter the gun recoils and counterrecoils under controlled hydraulic and air action of the recoil and counterrecoil cylinders assemblies. These assemblies as hereinbefore stated are not elements of the hydraulic system of the instant invention.

As the gun moves in recoil and counterrecoil the sliding joints operate in a telescoping, oiltight manner to provide connections between the slide hydraulic system and the hydraulic unit elements of the gun housing. The ball-and-spring type check valve in the sliding joint housing serves to prevent over-load pressure in the system during the recoil and counterrecoil of the gun and is preset to a safe setting value for the equipment, while still maintaining a sufficiently high value of operating pressure such for example as 1,500 lbs. per square inch.

The breech opening action occurs during counterrecoil wherein the breech bolt is retracted by the cam actuated mechanism of the gun mechanical equipment which is located in the gun housing. This retraction of the breech bolt actuates the valve operating lever to shift valve B to the inner detented position thereof as shown in Fig. 46. The simultaneous movement of valve B in this action moves valve A to the outer detent position thereof under action of the rocker-arm lever connection between the two valves. This outer position of valve A prevents high pressure from passing through the intermediate port thereof. It does however open the outer port thereof to relieve pressure in the bottom of the breech operating cylinder. This porting action through the outer and outer-intermediate porting sections of valve A permits flow through the intermost porting passage to the intermost passage portion of valve B and thence to tank line T-3 by way of the sliding joint-to-tank connection.

Shifting action of valve B causes fluid entering line P-8 on the sliding joint to be ported through the intermediate port on valve B into line PT-22, to the intermediate port on valve DD, over the check valve into the top of the upper cylinder.

This application of fluid pressure to the top chamber of the breechblock cylinder causes the breechblock to start the downward movement thereof. As the breechblock is lowered under this action fluid in the lower cylinder chamber is returned by piston stroking pressure to the tank through the restriction in the lower cylinder and line PT-21 to the outer intermediate port of valve A. The flow is then through the outer porting portion of the valve spool to the outermost port and thence through intermost ports of valves A and B. The fluid thereupon flows to the sliding joint and out tank lines T-3. Near the end of the lowering stroke of the piston, the return flow to the tank is reduced with movement of the buffer pin to close the inside passage thereof, as the pin seats in the main port at the bottom of the cylinder. Further displacement with additional piston stroking passes the fluid which is under piston pressure, through the adjustable restriction 147 in the lower cylinder chamber. The downward movement of the breech block is thus hydraulically checked in a manner as illustrated in Fig. 47.

The actions of the empty case extractors which extract the case, from the gun breech after firing to a position rearwardly thereof for disposal by the empty case ejector mechanism, occur when the breech block has been lowered to the position shown in Fig. 47. At this position the breechblock contacts the stem of the extractor valve C and moves the valving element to a downward position thereof. The movement of valve C to this downward position opens the inlet side of the lowermost porting portion of this valve from the case extractor cylinder line PT-3 to the lower porting passage of the spool to provide fluid communication through the sliding joint with the tank line T-3. This action vents the forward end of both extractor cylinders through lines PT-4 and PT-19 to line PT-3. High pressure on the opposite end chambers of each of the extractor cylinders acts on the rod ends of the pistons thereof to provide forward movement for operational action of the two extractor spades. This spade action which is mechanically arranged to provide substantially linear tip end movement extracts the empty case rearwardly and ejects it into the empty-case tray of the gun mechanical handling and ejecting system. As the pistons near their position of maximum extraction stroke, the center ports of the cylinders are covered, whereupon the fluid remaining therein is displaced through a restriction in the end of the cylinder in an action which buffs the final movement thereof. During the piston stroke, the fluid is ported into lines PT-5 and PT-20 through line PT-6 and the spring-loaded check valve in the valve block cylinder housing to the end of valve B. This action, as shown in Fig. 48 shifts valve B to the outer position thereof. This shifting action vents the upper end of the breech operating cylinder. The breech block is then raised to the loading position of the cycle thereof, which is 12 inches, for example, below its closed position. This action is accomplished by the energy stored in the springs of the breech operating cylinder piston. During this movement, flow from the upper side of the piston is restricted as a result of action of valve DD which has been shifted by spring action to an upward blocking position for the lowermost port thereof, in order that all fluids from the upper side of the breech operating cylinder piston flow through the adjustable restriction 145. The flow therefrom is through the intermediate and upper ports on valve DD into line PT-22. Flow through line PT-22 is to the outermost port on valve B and thence into the return line T-3 of the sliding joints.

The short upward movement of the breech block brings the upper surface thereof into alignment with the transfer trays, and simultaneous therewith allows the extractor valve C to be returned to the normal position shown in Fig. 49. This occurs by spring action and by pressure acting on the differential areas above and below the intermediate port of this valve. Return of this valve to the normal position thereof restores pressure to the forward ends of the extractor piston. This action produces extractor piston return to the normal or gun loading position thereof. It occurs as an effect of the differential area between the forward and rear surfaces of the piston.

The actions of the empty-case drive unit occur as the powder transfer tray moves to ramming position. The empty case tray is coupled therewith and is lowered to dump the empty case received therein by extractor spade action into the empty case chute below the ramming position of the powder tray. This empty case tray dumps the empty case on the chain conveyor of the drive unit and the pawl thereof operates an electrical interlock switch of the electrical system to energize solenoid SAF of the empty-case drive unit. This action, as illustrated in Fig.

50a, shifts the pilot valve AA to a position to port fluid from line P-4 through the intermediate and inner ports of valve AA to the outer end of the spool stem of latch valve L. This application of pressure shifts valve L, causing it to move the cam lever out of the notch in the drive cam. Valve L opens the intermediate port for fluid communication across the spool portion of the valve stem to the outer intermediate port located therebelow in the showing of Fig. 51, and thereafter allows fluid to flow past the adjustable restriction thereadjacent on to the motor. This flow starts the motor unit in the driving action for the chain. Fluid from the motor returns to the tank line through line T-2 from the inner port across the forward spool section to the adjacent intermediate port on valve L. During this operation, the switch AO of the control circuit is opened by pressure from fluid which bypasses the restriction for the motor connection and flows from this port of valve L to the piston chamber of the switch operating mechanism to function in interlocking the transfer tray control thereo. As the conveyor moves under motor drive action the previously extracted case is pushed ahead by the pawl of the chain. The chain travel moves the empty case away from the switch AN of the electrical circuit which opens to de-energize the solenoid SAF. This de-energization action permits valve AA to return to the neutral position thereof and provides venting action at the end of latch valve L in a manner permitting fluid to drain therefrom to line D-2 as shown in Fig. 51. The cam surface functions to prevent the return of valve L to the latch position thereof prior to completion of the cycle. The engagement control action of the cam which occurs nears the end of the rotation thereof, functions to move the stem spool of valve L rearwardly to decelerate the motor through restriction of fluid flow at the intermost port of valve L to the tank line port for T-2 as shown in Fig. 51.

The final cam rotation action allows the lever latch to engage the cam notch and move valve L in a manner to return to the original position thereof and lock the drive. This repositioning of valve L closes the port of P-4 to the outer intermediate port to thus shut off the pressure to the motor. This action opens the motor lines to the drain line D-2. Valve L also closes the pressure connection to the switch operating piston, which vents to the drive case. The switch AO which was previously opened by pressure from P-4 and ported through valve L is closed to discontinue transfer-tray interlock action.

If excessive loads prevail during the run, control valve Y and piston N of the compensator associated therewith function automatically in a manner as indicated in Fig. 51 to compensate for any over-load applied thereto. Their function is that of regulating the movement of the swivel yoke in the piston motor. This overload condition may occur in such events as the case when the empty cases in the chute become partially filled with water washed therein during gun firing engagements in heavy sea conditions. In the condition wherein the trays are partially filled, they are moved at a lower rate of speed than that of normal empty case tray handling; however, the power applied thereto is increased. Movement of the swivel yoke changes the angle between the cylinder block and output drive shaft, which, in turn, increases or decreases the power output. As the fluid pressure reaches a predetermined point, it overcomes the resistance offered by the spring of valve Y to allow fluid pressure to be ported to piston N. Movement of piston N and the yoke control link pulls the swivel yoke away from its normal offset position in a manner to increase the power output thereof. When the power demand decreases, the spring returns valve Y to the neutral position therefor. This action dumps fluid flow from the piston chamber into the drain system.

After the breech bolt is manually retracted and the breech is open for loading the first round, and after switch AB has been operated to start the transfer trays in their movement to ramming positions, normal operation of the system is automatic as long as the rammer control switch on the gun captain's control panel is held in RAM position.

In emergency loading control conditions such as may occur in the event of electric power failures during or after the loading of ammunition into the gun, it is necessary to complete the firing cycle to avoid possibility of damage to the gun and injury to personnel by cook-off of the projectile in the gun. The capacity of the accumulator A is sufficient to complete the ramming and retracting strokes of the rammer, provide operation of the empty-case ejector drive for one cycle, close the breech, and return of the transfer trays to the respective firing positions thereof externally of the slide.

If the electric motor fails to operate or if electric power in the slide control is lost at any time after a round of ammunition has been fired but energization action of solenoid SAC the gun will cease to operate without damage. However, if the electric power fails after solenoid SAC is energized the rammer will complete its ramming stroke and stop.

Upon occurrence of a failure, whereby the empty case drive unit has rotated sufficiently for the actuated latch drive unit to be on the raised portion of the cam, the drive unit will complete the cycle thereof. However, the empty-case drive will not move the empty case if the power failure occurs while the latch is in the notch in the cam.

In order to allow the stored fluid under pressure in the accumulator to perform the above function, it is necessary for the gun crew to manually operate the valves which normally would be operated by the solenoids. Valve J, which controls the rammer, and valve Q, which controls the transfer tray, are provided with levers for manual operation.

If the electric power failure occurs at the start of the ramming stroke, the rammer will complete the ramming stroke and stop. Retraction of the rammer is accomplished by shifting valve J by means of the manual lever on the valve block on the rammer drive unit.

After the rammer is retracted the personnal must check to see if the empty case has been ejected. If it has not fully entered the empty case tube, it must be removed manually. Return of the transfer trays to the respective firing positions thereof is then accomplished by manually shifting transfer-tray control valve Q to the firing position by means of the manual plunger. The trays move to their firing position and the gun may be fired.

In order to manually open and close the breech and manually operate the extractor spades, the hydraulic cylinders must be unblocked to permit free displacement of fluid. This action is accomplished by opening the manually operated by-pass valve in the pump control valve block. When the by-pass is open, the fluid displaced by the breech operating cylinder has unrestricted connection to the tank lines, through the by-pass, as illustrated in Fig. 52. Similar unrestricted flow is provided for manual extracting action.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination with a rapid fire turret gun and a trunnion mounted slide assembly of a type including a projectile transfer tray and a powder case transfer tray for usage of semi-fixed cased ammunition of major bore and for movement of said ammunition as separate increments from a receiving position external to the gun slide to mutually aligned positions for ramming in alignment with the gun breech, a hydraulic power and control system for said automatic gun assembly which comprises pump means for supplying a source of pressure energy to said system, an accumulator type pressure regulator connected to receive the output of said pump means and to maintain available a constant supply of fluid under pressure for use by the system, a bi-directional breech operating cylinder assembly in said system, a sliding joint connecting means connected in interposed relationship between the said breech operating cylinder and the accumulator assembly whereby the breech operating cylinder functions to receive and dissipate fluid under recoil and counterrecoil conditions of the gun in its housing, a hydraulically operated empty case extraction means, a control valve means for said extraction means and disposed to be actuated by the breechblock on completion of the opening cycle thereof, the valve being connected between the operating device and the accumulator pressure regulator, a breechblock control valve connected in the breechblock operating lines of said hydraulic power and control system to control the cycle of movement of the breechblock operating cylinder, a rammer drive assembly in fluid communication with said accumulator, a control valve operatively connected with said rammer drive assembly for controlling ramming and ram retracting action thereof, a pair of transfer tray operating cylinders disposed on said slide respectively to move the projectile transfer tray and the powder transfer tray of said gunslide from their respective load increment receiving positions rearwardly of the gunslide trunnions to a position wherein the trays are aligned for simultaneous ramming, a transfer tray valve block assembly interposed between the transfer tray operating cylinders and the accumulator, and a sequence valve assembly in fluid communication with said tray control valve block assembly and in fluid communication with said pressure regulator to control the time functioning of the gun system.

2. A hydraulic power drive and control system of the character of claim 1 for use with a gun mechanical handling system of the character described, further including a case ejection conveyor assembly, drive means connected to operate said case ejection conveyor assembly, said assembly being connected in fluid communication with the accumulator type pressure regulator, and a control valve connected between said drive means and the accumulator type pressure regulator, said means being connected to be controlled in its operation by the functioning of the sequence valve.

3. A gun mechanical handling system control drive and power system of the character of claim 2 for use with a gun mechanical handling system of the character described which further includes a projectile cradle, a powder case cradle, a pair of hydraulically operated latch units each having separatable mating members disposed respectively on each side of said slide for engagement by the respective mating latch member disposed respectively on the projectile cradle and powder case cradle of the gun handling system, a powder cradle latch valve and a projectile cradle latch valve interposed in fluid communication with the accumulator system, a spring biased cradle pawl member in each of said cradles for normally retaining the respective load increments therein after loading thereof, and a pair of cylinder units for retracting the respective cradle pawl member of each of said cradles of the transfer tray loading systems prior to release of said latch units, said pawl retracting cylinder being in fluid communication with the valve unit for the projectile cradle latch valve and the powder cradle latch valve respectively for correlated control thereby.

4. The hydraulic power and control system of the preceding claim 3 which further includes a hydraulically controlled projectile buffer assembly disposed for engagement by a projectile in transfer movement from the projectile cradle of the gun mechanical handling system and received by the projectile transfer tray subsequent to said ramming action after pawl release by the pawl release cylinder, said projectile buffer assembly being operative to move in an opposite direction to its buffing movement at the end of said buffing stroke to position the projectile within the transfer tray in a manner to permit movement by the handling assembly during subsequent projectile transfer tray movement to gun ramming position.

5. The combination with a rapid fire turret gun and trunnion mounted slide assembly of a type for usage of semi-fixed cased ammunition of major bore and having mechanisms for moving said ammunition as separate powder case and projectile increments from a receiving position external to the gun slide to a position for ramming in alignment with the gun breech, a gun housing for slideably mounting said gun in said slide, of a hydraulic power and control system for said automatic gun assembly which comprises a fluid storage means, pump means for supplying hydraulic pressure energy to said system, a full flow oil filter in said system, an accumulator type pressure regulator connected to receive the output of said pump means and to maintain available a constant supply of fluid under predetermined pressure for use by the system, a slideable mounted breechblock in said gun housing, a bi-directional breech operating cylinder assembly mounted on said housing, connected in said system and coupled to said breechblock for movement thereof, a breech control valve block therefor, a sliding joint connecting means connected in interposed relationship between the said breech operating cylinder and the accumulator assembly whereby the breech operating cylinder is operative to receive and dissipate fluid under recoil and counterrecoil conditions of the gun in its housing, and to maintain closed pressure on the breechblock during gun firing, a normally locked hydraulically operated empty case extraction means connected to said breech control valve block for sequential pressure release actuation following breechblock opening by said breech operating cylinder, control means for initiating fluid flow through said breech control valve block for actuation thereof, said control means being disposed in the path of travel of the breechblock at the fully open position thereof whereby to be actuated by the breechblock on completion of the opening cycle thereof, the value being interposed in fluid communication between the operating device and the accumulator pressure regulator, breechblock control valve actuation means connected to the breechblock for control of the cycle of movement of the breechblock operating cylinder in response to movement of the gun in recoil and counterrecoil, a rammer drive assembly in fluid communication with said accumulator type regulator, said rammer drive assembly including a mechanical rammer, rammer drive means connected thereto and a control valve to control ramming and ram retracting action of the rammer drive means in driving the mechanical rammer of the gun assembly, a projectile transfer tray means, a powder case transfer tray means, a pair of transfer tray operating cylinders disposed respectively to move the projectile transfer tray means and the powder transfer tray means from their respective load increment receiving positions rearwardly of the gun trunnions to a position wherein the trays are aligned for simultaneous ramming by the rammer of the gun system, a transfer tray valve block assembly interposed in fluid communication between the transfer tray drive cylinders and said accumulator type regulator, and a sequence valve assembly in fluid communication with said tray control valve assembly and in fluid communication with accumulator to control the time functioning of the gun system.

6. A hydraulic power drive and control system of the character of claim 5 for use with a gun mechanical handling system of the character described, further including a case ejection conveyor assembly, drive means connected to operate the case ejection conveyor assembly, said conveyor assembly being in fluid communication with said accumulator type regulator, and a control valve interposed between this drive and said regulator and so connected as to be controlled in its operation by the functioning of the sequence valve.

7. A gun mechanical handling system control drive and power system of the character of claim 6 for use with a gun mechanical handling system of the character described having a projectile cradle and a powder case cradle for movement of ammunition increments to the respective transfer tray means of the gun slide, which further includes a pair of hydraulically operated latch units having separatable members mounted respectively on the gun slide and on the respective projectile cradle or powder case cradle in a manner to be engaged by the mating latch member of the respective projectile cradle or powder case cradle of the gun handling system at the discharge position thereof, each of said cradles being provided with a pivotally mounted spring biased cradle ram pawl for retaining an ammunition increment in the cradle during cradle movement, a powder cradle latch valve and a projectile cradle latch valve interposed respectively in fluid communication with the accumulator type regulator, and a pair of cylinder units disposed to retract the cradle ram pawl on each of the assemblies of the transfer tray loading systems, said pawl retracting cylinder being in fluid communication with the valve unit for the projectile cradle latch valve and the powder cradle latch valve respectively.

8. The hydraulic power and control system of the preceding claim 7 for usage with a gun of the character described which further includes a hydraulically controlled projectile buffer assembly disposed to be engaged by a projectile in transfer movement from the projectile cradle of the gun mechanical assembly and received by the transfer tray subsequent to ramming action by the cradle after pawl release by the pawl release cylinder, said projectile buffer assembly being further operative to move in a direction opposite to its buffing movement at the end of said buffing stroke to position the projectile within the transfer tray in a manner to permit movement by the handling assembly during subsequent projectile transfer tray movement to the gun ramming position thereof.

9. In a hydraulic power drive and control system of the character described for use in a gun mechanism handling system for rapid fire major caliber usage, comprising in combination, an accumulator type regulator, a source of hydraulic power including a case ejection conveyor, a pump means, a case ejection drive means connected to operate said case ejection conveyor, a swivel mounted piston type variable displacement hydraulic drive motor, an electrically actuated pilot valve, a control valve connected for actuation therefrom and connected in interposed mechanical and hydraulic relationship between the said drive means and said pilot valve for fluid communication between said accumulator type regulator and said drive motor, and an equalization control device in interposed fluid relationship with said control valve and the motor comprising means for shifting the angle of swivel of the piston of said drive motor for fluid displacement compensation with conditions of increased torque demand.

10. In combination with a gun slide hydraulic control system, an empty case ejection system of a character for use in major caliber rapid fire gun slide loading and handling mechanisms comprising an empty case ejection drive means, a case ejection conveyor means operatively connected to be driven by said drive means, a variable displacement hydraulic drive motor for said drive means, an electrically actuated pilot valve, a control valve for actuation therefrom and connected to operatively control said variable displacement motor for control regulation of said drive means, said conveyor means including a plurality of empty case engagement members for combined rotary and linear drive from said drive means, and control means for initiating and discontinuing operation of the drive means in cyclic relationship with other gun operating mechanisms wherein the drive is discontinued after the linear movement required to advance an empty case one case length, said conveyor means being further operable for engagement by a second of said plurality of engagement members with an additional empty case, following said initial empty case movement.

11. In combination with a hydraulic system for a rapid fire gun slide assembly, an empty case disposal control means comprising a variable displacement swivel mounted hydraulic prime mover, an empty case ejecting mechanism, an output drive means for coupled drive with said empty case ejecting mechanism, said drive means further including motor control means for varying the motor displacement with conditions of changed loading applied thereto, control means including an electrically actuated pilot valve, an electro-responsive actuator means therefor, a dual-flow control valve connected to said last mentioned control means to provide initiation of motor action in response to reception of an electrical signal by said electrical actuator means, and thereafter maintain rotation of said drive through an operative cycle therefor in the absence of a continuous electrical impulse, and a rotatable cam means operatively connected to the motor output whereby the pilot valve is maintained in flow communicative relationship between the input thereto and the valve output through the motor, until completion of a cycle of cam rotation.

12. In combination with a rapid fire gun slide, an ammunition handling system, a gun slide, hydraulic control system including an empty case ejection system, means for initiating actuation of said empty case ejection system with reception of an empty case from said gun handling system, means for ejection action of an empty case to a location external of said gun slide, which comprises a mechanical actuator disposed on the gun slide, a chain flight conveyor, drive means for driving said conveyor chain for engagement with a received empty case and for movement thereof to a position forwardly with respect thereto and external of the gun slide, drive control means operatively connected to said drive for termination of movement of said case correlative to a predetermined travel of said rotational elements for the conveyor, a variable displacement hydraulic motor in direct coupled driving relationship with said drive means, and motor displacement control means operatively connected thereto for automatically varying the displacement thereof in response to variations in the loading applied thereto.

References Cited in the file of this patent
UNITED STATES PATENTS

| | | |
|---|---|---|
| 2,473,711 | Kearns et al. | June 21, 1949 |
| 2,490,797 | Girouard et al. | Dec. 13, 1949 |
| 2,566,391 | Wertman et al. | Sept. 4, 1951 |
| 2,569,571 | Newell et al. | Oct. 2, 1951 |
| 2,592,790 | Brereton | Apr. 15, 1952 |
| 2,646,722 | Eastman | July 28, 1953 |
| 2,708,391 | Molins et al. | May 17, 1955 |
| 2,745,317 | Stanton et al. | May 15, 1956 |